United States Patent
Kessman et al.

(10) Patent No.: US 9,072,965 B2
(45) Date of Patent: *Jul. 7, 2015

(54) PRODUCTS AND PROCESSES FOR OPERATIONS MANAGEMENT OF CASINO, LEISURE AND HOSPITALITY INDUSTRY

(71) Applicant: Ameranth Inc., San Diego, CA (US)

(72) Inventors: Marc D. Kessman, Mahopac, NY (US); Sean P. McCauley, Las Vegas, NV (US)

(73) Assignee: Ameranth, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/551,893

(22) Filed: Nov. 24, 2014

(65) Prior Publication Data

US 2015/0080081 A1 Mar. 19, 2015

Related U.S. Application Data

(60) Continuation of application No. 13/759,203, filed on Feb. 5, 2013, now Pat. No. 9,005,031, which is a continuation of application No. 13/004,405, filed on Jan. 11, 2011, now Pat. No. 8,393,969, which is a continuation of application No. 12/043,829, filed on Mar. 6, 2008, now Pat. No. 7,878,909, which is a division of application No. 10/452,231, filed on May 30, 2003, now Pat. No. 7,431,650.

(60) Provisional application No. 60/429,383, filed on Nov. 25, 2002, provisional application No. 60/384,565, filed on May 30, 2002.

(51) Int. Cl.
- A63F 13/00 (2014.01)
- G07F 17/32 (2006.01)

(52) U.S. Cl.
CPC ............. *A63F 13/00* (2013.01); *G07F 17/32* (2013.01); *G07F 17/3234* (2013.01); *G07F 17/3237* (2013.01); *G07F 17/3225* (2013.01); *G07F 17/3293* (2013.01)

(58) Field of Classification Search
USPC ................................................ 463/25–42
See application file for complete search history.

(56) References Cited

U.S. PATENT DOCUMENTS

| | | | | | |
|---|---|---|---|---|---|
| 4,926,327 | A | * | 5/1990 | Sidley | 463/13 |
| 5,957,776 | A | * | 9/1999 | Hoehne | 463/25 |
| 6,093,100 | A | * | 7/2000 | Singer et al. | 463/13 |
| 6,174,237 | B1 | * | 1/2001 | Stephenson | 463/42 |
| 6,382,629 | B1 | * | 5/2002 | Hill | 273/303 |
| 6,672,589 | B1 | * | 1/2004 | Lemke et al. | 273/236 |
| 6,729,959 | B1 | * | 5/2004 | Moore et al. | 463/30 |
| 7,018,291 | B1 | * | 3/2006 | Lemke et al. | 463/12 |
| 7,255,642 | B2 | * | 8/2007 | Sines et al. | 463/13 |
| 7,306,516 | B2 | * | 12/2007 | Iosilevsky | 463/13 |
| 2002/0123377 | A1 | * | 9/2002 | Shulman | 463/13 |

* cited by examiner

*Primary Examiner* — Masud Ahmed
(74) *Attorney, Agent, or Firm* — John L. Rogitz

(57) ABSTRACT

In various embodiments of this invention, a suite of customized computer software applications, a linked or wireless computer network and accessory components cooperate to enhance and extend customer and employee resource management in the casino/gaming environment.

19 Claims, 95 Drawing Sheets

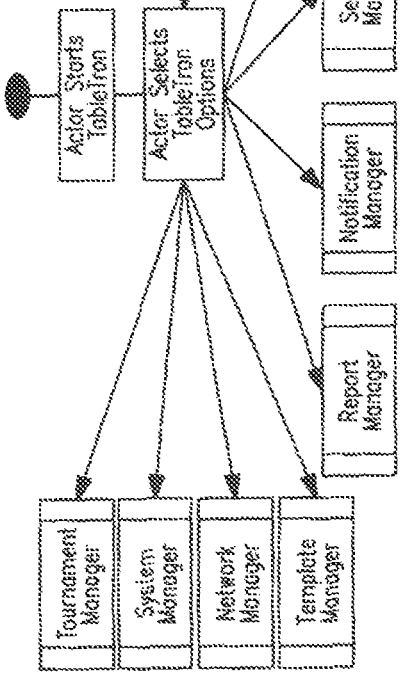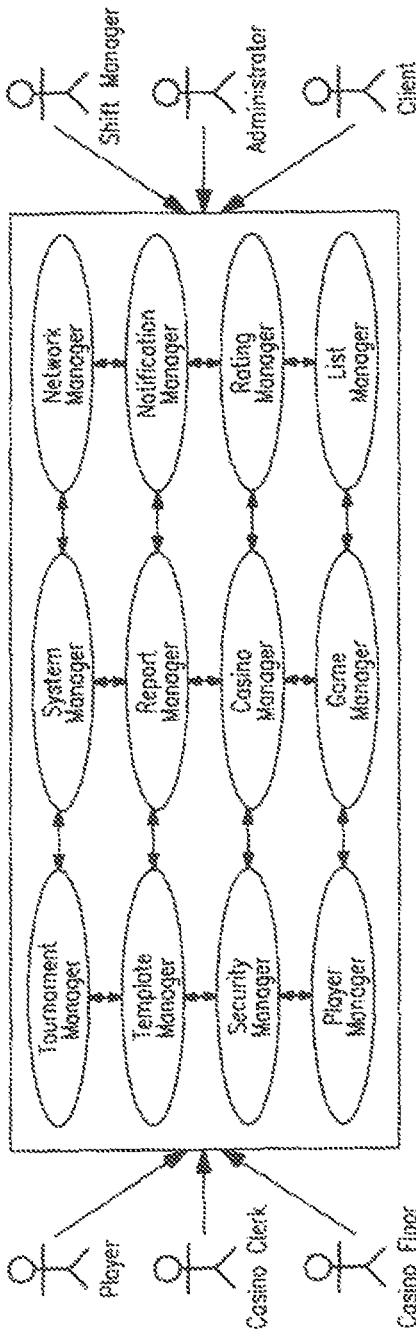
FIG. 5

PRODUCTS AND PROCESSES FOR OPERATIONS MANAGEMENT OF CASINO, LEISURE AND HOSPITALITY INDUSTRY

CLAIM TO PRIORITY AND CROSS REFERENCE TO RELATED APPLICATIONS

This application is a continuation of U.S. application Ser. No. 13/004,405, which is a continuation of U.S. application Ser. No. 12/043,829 (issued as U.S. Pat. No. 7,878,909), which is a division of U.S. application Ser. No. 10/452,231 (issued as U.S. Pat. No. 7,431,650), filed May 30, 2003, entitled "Casino Poker and Dealer Management System," which claims priority to U.S. Provisional Patent Application No. 60/384,565, filed on May 30, 2002, entitled "Products and processes for operations management of casino, leisure and hospitality industry" and U.S. Provisional Patent Application No. 60/429,383, filed on Nov. 25, 2002, entitled "Products and processes for operations management of casino, leisure and hospitality industry." All of which are incorporated herein by reference.

COMPUTER PROGRAM LISTING APPENDIX

The source code files listed below are in this application incorporated by reference, and are stored on two compact discs (one original compact disc and one duplicate) filed herewith.

| Creation Date and Time | | SIZE | FILENAME |
|---|---|---|---|
| 04/15/2002 | 02:51p | 2,343 | ActionButton.java |
| 11/04/2002 | 06:18p | 7,535 | ActiveCreditRequestSummaryJPanel.java |
| 11/04/2002 | 06:18p | 7,451 | ActiveFillRequestSummaryJPanel.java |
| 02/11/2002 | 09:22p | 11,697 | administration.java |
| 02/05/2003 | 02:09a | 26,213 | AS400RobotManager.java |
| 04/03/2003 | 09:28p | 1,916 | AverageWaitButton.java |
| 04/22/2003 | 12:38p | 20,717 | AverageWaitTimeEntryListCalculatorThread.java |
| 02/20/2002 | 01:25p | 671 | BarCode.java |
| 11/04/2002 | 06:19p | 10,406 | buildDB.java |
| 11/04/2002 | 06:19p | 2,110 | buildPlayerCardSQL.java |
| 11/04/2002 | 06:19p | 4,295 | buildPlayerSQL.java |
| 11/04/2002 | 06:18p | 2,200 | CalculatorButton.java |
| 12/16/2002 | 01:29p | 10,542 | CalculatorThread.java |
| 04/22/2002 | 11:02p | 2,743 | CardNumberFocusThread.java |
| 04/29/2002 | 12:25p | 4,411 | CardReader.java |
| 12/16/2002 | 01:24p | 39,864 | CasinoManagerConsole.java |
| 12/16/2002 | 01:27p | 3,432 | CasinoManagerCreditTablesJPanel.java |
| 05/15/2002 | 06:36p | 2,323 | CasinoManagerTableButton.java |
| 12/16/2002 | 01:44p | 3,412 | CasinoManagerTablesJPanel.java |
| 11/04/2002 | 06:19p | 3,860 | CheckInConfirmationJPanel.java |
| 11/04/2002 | 06:19p | 3,647 | CheckInJPanel.java |
| 02/05/2003 | 02:02a | 11,141 | CheckInPanel.java |
| 11/04/2002 | 06:19p | 2,369 | CheckInPlayerButton.java |
| 11/04/2002 | 06:19p | 171 | client.properties |
| 02/05/2003 | 12:34a | 30,743 | ClientConnection.java |
| 11/04/2002 | 06:19p | 7,313 | clientListener.java |
| 03/12/2002 | 04:12a | 964 | ClockLabel.java |
| 02/21/2002 | 09:46p | 4,909 | Code39.java |
| 01/28/2003 | 06:24p | 2,317 | ColumnHeaderButton.java |
| 11/04/2002 | 06:18p | 2,313 | CreditCurrencyJButton.java |
| 05/22/2002 | 04:09p | 24,589 | CreditDenominationJPanel.java |
| 12/17/2002 | 06:17p | 6,544 | CreditJPanel.java |
| 09/24/2002 | 08:43p | 7,483 | CreditRequestSummaryJPanel.java |
| 04/30/2002 | 11:01p | 17,071 | CurrentBetJPanel.java |
| 05/27/2003 | 01:22p | 1,098 | database.properties |
| 11/04/2002 | 06:19p | 12,780 | DatabaseSystem.java |
| 04/30/2002 | 10:05p | 1,722 | DateTime.java |
| 11/04/2002 | 06:19p | 2,058 | DigitalClock.java |
| 04/15/2002 | 02:51p | 2,466 | EntryButton.java |
| 11/04/2002 | 06:18p | 2,309 | FillCurrencyJButton.java |
| 05/21/2002 | 12:37p | 24,451 | FillDenominationJPanel.java |
| 12/17/2001 | 06:19p | 6,416 | FillJPanel.java |
| 09/24/2002 | 08:43p | 7,401 | FillRequestSummaryJPanel.java |
| 12/12/2002 | 01:33a | 9,133 | FooterThread.java |
| 12/12/2002 | 05:25p | 20,245 | GameConsole.java |
| 04/15/2002 | 02:51p | 2,831 | GameLegendButton.java |
| 12/16/2002 | 01:15p | 13,274 | GameManagerCommandCenter.java |
| 12/17/2002 | 06:21p | 3,083 | GamesJPanel.java |
| 04/15/2002 | 02:51p | 1,888 | GameTypeComboBox.java |
| 12/06/2001 | 12:01a | 1,256 | getWebFile.java |
| 05/29/2002 | 11:45a | 1,915 | GradientCardSwipeJPanel.java |
| 04/21/2002 | 03:06p | 1,897 | GradientJPanel.java |
| 05/29/2002 | 04:50p | 3,467 | GradientLoginInfoJPanel.java |
| 12/01/2001 | 06:32p | 1,334 | hello.java |
| 04/10/2003 | 02:42p | 7,868 | HTTPRequest.java |
| 04/10/2003 | 02:19p | 3,997 | HTTPRequestPOST.java |
| 04/10/2003 | 02:19p | 162 | httpserver.properties |
| 04/10/2003 | 02:19p | 7,264 | HTTPServerPropertyLoader.java |
| 11/04/2002 | 06:18p | 2,348 | IncrementDecrementJButton.java |
| 12/03/2001 | 02:55a | 456 | InitializeSystem.java |
| 07/23/2002 | 05:00p | 2,877 | InteractiveCalendar.java |
| 01/31/2003 | 10:37p | 25,168 | Ipaq.java |
| 04/22/2003 | 12:14a | 3,517 | JarClassLoader.java |
| 04/22/2003 | 12:15a | 4,930 | JarRunner.java |
| 04/15/2002 | 02:51p | 2,305 | KeyboardKeyButton.java |
| 03/12/2002 | 04:03a | 5,845 | Key-Detection.java |
| 04/22/2003 | 11:52a | 15,121 | LegacyInterface.java |
| 04/15/2002 | 03:07a | 35,056 | LegacyRobot.java |
| 11/04/2002 | 06:19p | 1,852 | LegendButton.java |
| 04/07/2003 | 02:15p | 17,231 | LegendThread.java |
| 04/07/2003 | 02:19p | 23,063 | List.java |
| 11/04/2002 | 06:18p | 2,687 | ListDownArrowJButton.java |
| 11/04/2002 | 06:18p | 2,298 | ListGameButton.java |
| 05/08/2002 | 09:06p | 2,361 | ListGameScrollButton.java |
| 11/04/2002 | 06:19p | 6,607 | ListManager.java |
| 05/23/2002 | 05:50p | 21,191 | ListManagerRobot.java |
| 01/27/2003 | 11:04a | 17,786 | ListPanel.java |
| 04/15/2002 | 02:51p | 776 | ListPorts.java |
| 11/04/2002 | 06:19p | 2,685 | ListUpArrowJButton.java |
| 11/04/2002 | 06:18p | 2,354 | LoginInfoButton.java |
| 12/03/2002 | 06:58p | 17,401 | LogonScreen.java |
| 11/04/2002 | 06:19p | 1,846 | LongButton.java |
| 04/22/2003 | 03:26p | 2,216 | MailExample.java |
| 04/15/2002 | 02:51p | 2,345 | ManagerButton.java |
| 03/12/2003 | 04:32p | 20,603 | ManagerConsole.java |
| 12/16/2002 | 01:01p | 6,738 | MarqueeThread.java |
| 11/04/2002 | 06:19p | 2,336 | MathematicalJButton.java |
| 04/15/2002 | 02:51p | 1,978 | MenuButton.java |
| 12/16/2002 | 12:52p | 2,750 | MonitorCloseTable.java |
| 01/27/2003 | 10:59a | 24,247 | MonitorEntryList.java |
| 12/16/2002 | 01:10p | 2,517 | MonitorOpenSeat.java |
| 12/16/2002 | 12:54p | 4,611 | MonitorOpenTable.java |
| 12/16/2002 | 01:17p | 2,516 | MonitorPhoneInList.java |
| 12/16/2002 | 01:05p | 4,000 | MonitorPublicSeating.java |
| 12/16/2002 | 01:19p | 8,435 | MultiAddJPanel.java |
| 01/28/2003 | 11:43p | 10,343 | MultiGamePlayerView.java |
| 12/12/2002 | 01:26a | 10,378 | MultiGamePlayerViewJPanel.java |
| 12/03/2002 | 01:20a | 12,381 | NetworkManagerConsole.java |
| 04/15/2002 | 02:51p | 1,976 | NextButton.java |
| 12/03/2001 | 01:54a | 4,519 | nodes.java |
| 09/24/2002 | 08:43p | 13,565 | NotificationManagerConsole.java |
| 03/24/2002 | 04:23p | 55,593 | oldClient.java |
| 12/16/2002 | 12:49p | 7,028 | OpenGamePanel.java |
| 12/16/2002 | 01:47p | 25,208 | OpenSeatAnnounce.java |
| 04/22/2003 | 11:47a | 4,963 | OpenSeatMaintenanceThread.java |
| 01/08/2003 | 01:37p | 70,751 | PCkeyBoard.java |
| 03/17/2002 | 02:33a | 2,064 | pda.java |
| 03/19/2002 | 05:15p | 613 | PDAscreenSize.java |
| 01/28/2003 | 11:46p | 9,185 | PlayerBasicSearch.java |
| 02/20/2002 | 05:45p | 7,825 | PlayerCard.java |
| 11/04/2002 | 06:19p | 11,284 | PlayerCashPanel.java |
| 11/04/2002 | 06:19p | 11,415 | PlayerChipPanel.java |
| 11/04/2002 | 06:19p | 2,304 | PlayerGameButton.java |
| 02/05/2003 | 02:04a | 9,165 | PlayerGamePanel.java |
| 01/28/2003 | 05:00p | 10,369 | PlayerHistoryView.java |
| 12/17/2002 | 06:23p | 28,306 | PlayerManagerConsole.java |
| 02/05/2003 | 02:06a | 5,682 | PlayerPanel.java |

| Creation Date and Time | | SIZE | FILENAME |
|---|---|---|---|
| 11/04/2002 | 06:19p | 2,307 | PlayerSeatButton.java |
| 11/04/2002 | 06:19p | 4,254 | PlayerSummaryPanel.java |
| 05/29/2002 | 06:01p | 2,309 | PlayerTableButton.java |
| 09/11/2002 | 12:12a | 5,884 | PlayerVerificationTicketLayout.java |
| 04/15/2002 | 02:51p | 2,576 | PokerTableButton.java |
| 02/04/2002 | 09:42p | 3,109 | Print2DGraphics.java |
| 09/24/2002 | 08:43p | 15,847 | PrintCreditRequestReceipt.java |
| 02/26/2002 | 12:44p | 5,367 | PrinterTest.java |
| 09/24/2002 | 08:43p | 15,922 | PrintFillRequestReceipt.java |
| 02/04/2003 | 12:15p | 3,281 | PrintJob.java |
| 09/13/2002 | 06:24p | 6,170 | PrintPlayerVerificationTicket.java |
| 05/17/2002 | 02:36p | 18,734 | PrintTournamentTicket.java |
| 02/14/2002 | 06:09p | 4,511 | progress.java |
| 12/16/2002 | 01:19p | 6,904 | PropertyLoaderThread.java |
| 01/02/2002 | 06:44p | 3,491 | PropertyReader.java |
| 12/16/2002 | 01:47p | 11,541 | PublicSeatingAnnounce.java |
| 04/22/2003 | 11:47a | 4,976 | PublicSeatingMaintenanceThread.java |
| 04/10/2003 | 02:19p | 5,184 | QueryParameters.java |
| 08/02/2002 | 01:45p | 11,073 | RatingChipPanel.java |
| 11/04/2002 | 06:19p | 2,313 | RatingCurrencyJButton.java |
| 02/05/2003 | 02:07a | 4,555 | RatingGamePanel.java |
| 12/17/2002 | 06:29p | 4473 | RatingJPanel.java |
| 12/17/2002 | 06:31p | 11,547 | RatingManagerConsole.java |
| 02/05/2003 | 02.06a | 5,682 | RatingPanel.java |
| 11/04/2002 | 06:19p | 2,501 | RatingPlayerInfoJPanel.java |
| 02/05/2003 | 02:07a | 10,238 | RatingPlayerPanel.java |
| 11/04/2002 | 06:19p | 2,307 | RatingSeatButton.java |
| 12/17/2002 | 06:32p | 3,176 | RatingSeatsJPanel.java |
| 11/04/2002 | 06:19p | 3,593 | RatingSummaryPanel.java |
| 11/04/2002 | 06:19p | 2,309 | RatingTableButton.java |
| 12/17/2002 | 06:34p | 3,125 | RatingTablesJPanel.java |
| 04/09/2002 | 01:46p | 3,458 | ReadCom1.java |
| 11/04/2002 | 06:19p | 696 | RemoteUpdate.java |
| 09/13/2002 | 07:26p | 12,967 | ReportManagerConsole.java |
| 05/22/2002 | 09:09p | 22,971 | RobotManagerConsole.java |
| 11/04/2002 | 06:19p | 1,848 | RoundButton.java |
| 01/28/2003 | 11:32p | 3,063 | SearchColumnHeader.java |
| 06/13/2002 | 09:08p | 2,726 | SearchLDAP.java |
| 04/15/2002 | 02:51p | 2,392 | SeatButton.java |
| 12/17/2002 | 06:25p | 3,193 | SeatsJPanel.java |
| 11/04/2002 | 06:19p | 13,668 | SecurityManagerConsole.java |
| 05/29/2002 | 05:53p | 1,792 | SecuritySession.java |
| 05/20/2003 | 02:20p | 14,641 | SendMail.java |
| 04/22/2003 | 04:50p | 594 | server.properties |
| 12/05/2001 | 07:25p | 1,086 | ServerAlive.java |
| 05/20/2003 | 11:05a | 8,905 | ServerPropertyLoaderThread.java |
| 04/11/2003 | 04:40p | 3,264 | SimpleHTTPServer.java |
| 04/09/2002 | 02:33p | 3,274 | SimpleRead.java |
| 04/09/2002 | 12:04p | 3,149 | SimpleWrite.java |
| 11/04/2002 | 06:19p | 1,849 | smallButton.java |
| 12/05/2001 | 11:33p | 1,192 | socketTest.java |
| 11/04/2002 | 06:19p | 4,472 | Splash.java |
| 05/28/2003 | 10:27p | 0 | srclist.txt |
| 12/17/2002 | 06:27p | 3,177 | StakesJPanel.java |
| 01/02/2002 | 04:48p | 385 | StartClientApp.Java |
| 11/04/2002 | 06:19p | 543 | startLogonScreen.java |
| 08/26/2002 | 07:30p | 667 | startManagerConsole.java |
| 11/04/2002 | 06:10p | 1,629 | startPDA.java |
| 11/04/2002 | 06:19p | 556 | startRobotManagerDemo.java |
| 04/15/2002 | 02:51p | 1,940 | StatusLabel.Java |
| 05/27/2003 | 03:37p | 199,640 | StructuredQuery.Java |
| 05/29/2002 | 10:14a | 2,662 | SwipeCardFocusThread.Java |
| 12/05/2001 | 11:47p | 487 | SystemCheck.Java |
| 11/04/2002 | 06:19p | 1,955 | SystemClock.java |
| 04/15/2002 | 02:51p | 1,924 | SystemExitButton.java |
| 11/04/2002 | 06:19p | 4,788 | SystemInit.java |
| 09/24/2002 | 08:44p | 9,978 | SystemManagerConsole.java |
| 11/04/2002 | 06:19p | 480 | SystemProperties.java |
| 02/15/2002 | 09:44p | 6,066 | tablechoice.java |
| 12/17/2002 | 06:28p | 3,226 | TablesJPanel.java |
| 11/04/2002 | 06:19p | 50,355 | TableTron.java |
| 05/20/2003 | 03:06p | 26,045 | TableTronApplicationServer.java |
| 05/20/2003 | 02:39p | 8,559 | TableTronServerMultiThread.Java |
| 09/13/2002 | 07:43p | 12,890 | TemplateManagerConsole.java |
| 02/28/2002 | 04:47p | 4,561 | test.java |
| 11/04/2002 | 06:18p | 551 | testCalculator.Java |
| 11/04/2002 | 06:18p | 587 | testCasinoManager.java |
| 04/09/2002 | 01:00p | 336 | testComPort.java |
| 11/04/2002 | 06:19p | 590 | testDatabaseSystem.java |
| 12/22/2000 | 10:02a | 1,702 | TestDataSource.java |
| 08/26/2002 | 04:37p | 665 | testFooter.java |
| 03/12/2003 | 02:43p | 669 | testLegend.java |
| 11/04/2002 | 06:19p | 459 | testList.java |
| 11/04/2002 | 06:19p | 520 | testMarquee.java |
| 08/02/2002 | 01:45p | 693 | testMultiAdd.java |
| 03/07/2002 | 04:13p | 460 | testOracle.java |
| 01/28/2003 | 05:07p | 722 | testPlayerBasicSearch.java |
| 11/04/2002 | 06:19p | 540 | testPlayerManager.java |
| 11/04/2002 | 06:19p | 18,677 | testPrint.java |
| 09/11/2002 | 12:16a | 650 | testPrintPlayerVerificationTicket.java |
| 11/04/2002 | 06:19p | 548 | testPropertyLoader.java |
| 11/04/2002 | 06:19p | 540 | testRatingManager.java |
| 04/23/2002 | 01:35a | 684 | testRobot.java |
| 11/04/2002 | 06:19p | 549 | testRobotManager.java |
| 03/15/2002 | 08:01p | 6,270 | testt.java |
| 04/15/2002 | 02:51p | 1,276 | threadedClockLabel.java |
| 04/15/2002 | 02:51p | 1,266 | threadedDateLabel.java |
| 11/18/2002 | 01:55p | 20,568 | TitanServer.java |
| 04/15/2002 | 02:51p | 1,974 | TotalButton.java |
| 03/12/2002 | 04:05a | 1,829 | TotalsButton.java |
| 09/24/2002 | 08:44p | 12,673 | TournamentManagerConsole.java |
| 07/25/2002 | 12:09p | 2,367 | TournamentMenuButton.java |
| 03/06/2002 | 11:18p | 3,688 | TourneyTicket.java |
| 11/04/2002 | 06:19p | 2,686 | TourneyNode.java |
| 11/04/2002 | 06:19p | 1,526 | WatchPanel.java |
| 01/10/2002 | 01:15p | 9,342 | XMLParser.java |
| 01/23/2002 | 08:53p | 180 | xValue.java |
| 01/23/2002 | 08:51p | 489 | yValue.java |
| | | 225 File(s) 1,787,248 bytes | |

BACKGROUND

A casino or other gaming environment can have poker rooms, table games (e.g., Blackjack, Roulette, Craps), slot machines and other gaming devices which customers pay to play. Casino games usually involve a Dealer, one or more Player(s), and some oversight by a person such as Floor Person, Shift Manager, and/or Pit Boss.

Poker rooms are frequented by Players who play poker at tables against other Players. To play a game at a table in a poker room, Players are placed upon waiting lists by Clerks and are called (by voice, or microphone) once their opportunity to enter a game arises. Clerks maintain a waiting list via pencil, pen, and paper methodology.

Casinos sometimes offer Players compensation for playing. Floor Persons are responsible for oversight of Players' durations and level of play. At times, the table at which a game is being played may require support. Some forms of support include: restocking betting chips, recording financial standings, security monitoring, and closing down games. Support operations may require the assistance of the Floor Person. Dealers may deal the playing cards for a specified duration. Dealers often participate in rotations that require them to shift tables of service. Dealer rotation scheduling, maintenance, and oversight are provided by the Dealer Coordinator (DC).

Table Games (e.g., Blackjack, Roulette, Craps), much like poker games, involve a Dealer, Player(s), and some level of supervisory oversight by a person such as a Pit Boss. Table games also operate similar to poker rooms in that players receive compensation for play. Such dealers likewise engage in rotations, and Tables where the table games are played require support.

FIGURES

FIG. 5 is a flow chart of a process of an overview of an embodiment.

FIG. 5 is a flow chart of a process of an overview of an embodiment.

Figure 17:
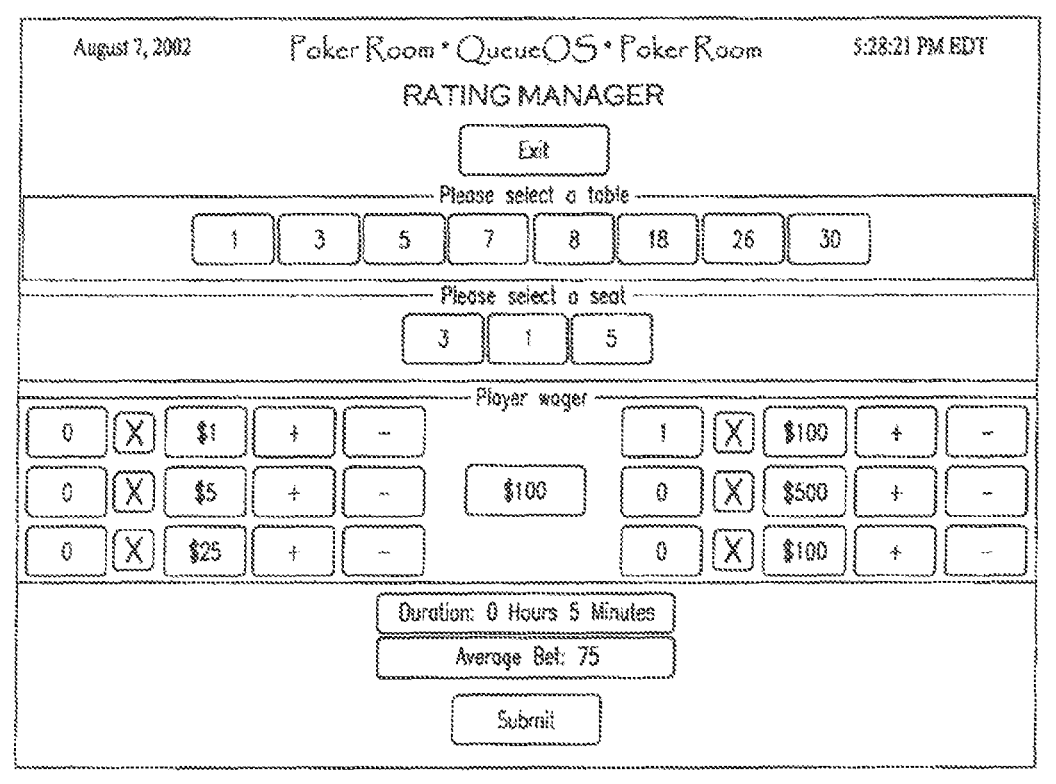

FIG. 17 is an illustration of an example of graphical user interface for Rating Manager module.

FIG. 22 is an illustration of the printed hard copy receipts for an embodiment of a process for a Player Check In and Check Out operations.

FIG. 33 is an illustration of an example of graphical user interface for List Manager module.

FIG. 67 is an illustration of a graphical user interface, shown at the Security Manager Logs screen.

FIG. 73 is an illustration of a graphical user interface, shown at the Initials Search result screen.

FIG. 84 is an illustration of a graphical user interface, showing the View Rotation screen.

DETAILED DESCRIPTION

Figure 1:
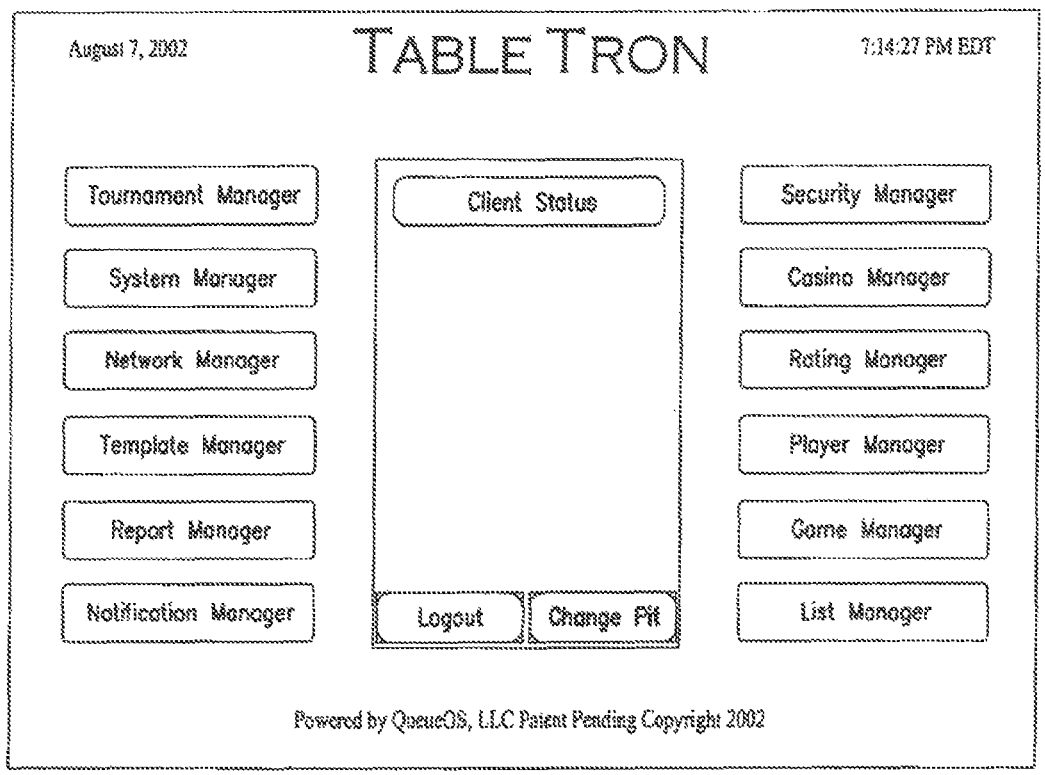
FIG. 1 is an illustration of a graphical user interface, shown at an initial display in accordance with an embodiment.

Some embodiments of this invention enable a casino or other establishment to implement, manage, and/or report on crucial operations involved in the casino or gaming environment. The term "casino" is used in this application as a convenient description of an environment in which embodiments of the invention may be deployed. However it will be apparent that many other, non-casino environments are suitable as well.

Terms used in this application include:

Player: any person who plays a game.

Dealer: someone, such as a casino employee, who services one or more Player(s) at a game table.

Floor Person: someone, such as a casino employee, who supervises the overall play and operation of a table or group of tables where games are played.

Clerk: someone, such as a casino employee, who operates and manages the placement of Player(s) for games. e.g., with waiting lists.

Cage: a location for storing, e.g., cash, chips, tokens, and other valuables. Pit: The name designated for a group of tables.

System: a device according to one or more embodiments of this invention.

Embodiments of this invention may be implemented as a suite of computerized software tools linked together to provide real-time operational support for casino or gaming hospitality functions through the use of electronic devices. The electronic devices can include devices in fixed locations and/or wireless devices which are more mobile. The electronic devices selectively communicate with each other and with centralized electronic devices, including servers.

The software and electronic devices are referred to collectively as the "system", for convenience. In some embodiments of this invention, the system can provide electronic interfaces and reporting capability. It will be apparent that, although certain types of devices are described in this application, many other types are appropriate for implementing embodiments of this invention.

This invention may be implemented in any of a large number of embodiments, some of which are described below, and others of which will be apparent to the reader. Some embodiments of the invention may provide some or all of the following benefits:

(1) Displaying the availability and location of games, such as table games in a casino.

(2) Facilitating the creation, modification and visual display of tournament games, such as poker or other tournaments in a casino or other venue. In tournaments, which employ tickets (e.g. to identify players), randomized tickets can be automatically generated. In tournaments where money or other tokens of value are employed, entry fees, re-buys, payouts, awards and other uses of such tokens of value may be calculated according specified business rules.

(3) Facilitating the registration of players for table games. Customers or customer data may be identified through various known mechanisms, including barcode reading and/or magnetic stripe scanning, thus allowing customer resource management data to be received and processed (e.g. by casino management or other interested parties).

(4) Maintaining, processing and displaying sets of data about customers, such as customer lists and queues of customers waiting for various games, tables for games, or other resources. Players may be dynamically added, deleted and moved on lists at the request of various authorized users of the system. Such data may be processed to yield information, including estimated, predicted or actual wait times for games, tables or other resources, as well as types of customers represented by the lists.

(5) Facilitating the calculation of compensation points and providing persistent and/or temporary storage of this information. This information may be utilized in various ways, including displayed at the request of a customer, game manager, or other entity, emailed to the customer or printed for verification.

(6) Providing a visual display of game information, including active and inactive tables, the current dealer at an active game, which registered players are sitting at specific seats and win/loss statistics for tables. Such information may be utilized by, e.g. casino management and regulatory authorities. This allows players to see this information easier, and does not require casino employee interaction.

(7) Automating manual accounting processes, such as table credits, table fills and customer markers, thus increasing accuracy and allowing other processing of such information.

Some embodiments of this invention use wireless technology, hand-held computers, networking and persistent storage in a relational database to facilitate or perform various functions.

The method and apparatus of various embodiments may employ the Internet as well as conventional communications systems such as Integrated Voice Response (IVR), self-service environments (kiosks) and cross-marketing opportunities.

Embodiments of this invention may be implemented as a suite of object-oriented software applications, using open software standards and compatible with open computer hardware platforms and architectures. When implemented in a modular nature, solutions for individual entities (e.g. casinos and hospitality operations) may be customized more easily. Further, as is well known, portions of a modular system may more easily be used separately from other portions. Therefore, various modules described in this application may be used alone, or in conjunction with other modules.

In some embodiments, various activities of a casino or hospitality establishment may be managed. Many other environments are equally suitable to this invention.

Benefits of certain embodiments are increased customer satisfaction, increased employee accountability, increased operational efficiency and reduced incidence of fraud. The description in this application provides sufficient information for a person of ordinary skill in the art to implement a great many embodiments of the invention. In particular, this application uses standard industry notation such as Unified Modeling Language (UML), Use Case diagrams, Process Charts and Activity Diagrams in order to provide detailed guidance on design and implementation. Further, the functionality and architecture of various modules is also decomposed and described in terms of subparts to facilitate understanding, replication and customization.

The enclosed source code, which may be used to practice embodiments of this invention, is described in detail below.

Several system modules (also referred to as "Managers") are described in this application. Each module supports different features, and any or all of the modules may be organized and run as a single program, if desirable. The modules can interact with each other to ensure real-time functionality. The program can be accessed from several different computing platforms, including: a personal computer, wireless handheld device or PDA (personal digital assistants including the PALMPILOT™ by Palm Inc., the BLACKBERRY™ by Research In Motion Limited, the iPaq PocketPC™ by Hewlett-Packard Company), computer tablet, and a traditional or cellular telephone. Data may be input using known devices and methods such as touch screen, keyboard, buttons, mouse, voice recognition, and stylus pen. The system can record transactions that the system processes. This recording of transactional data can permit the generation of historical reports, as well as operate in real-time mode.

FIG. 1 shows a user interface, which is displayable on a display device (e.g., computer monitor) in a well known manner. The user interface includes twelve buttons, six on the left and six on the right. Each button (when activated by a user in a manner which is well known) initiates the functions of one of the managers. Of course, more or less than twelve buttons could be included in the user interface. Similarly, the functions of any of the managers could be initiated in many other ways using known graphical user interface techniques.

Figure 2:
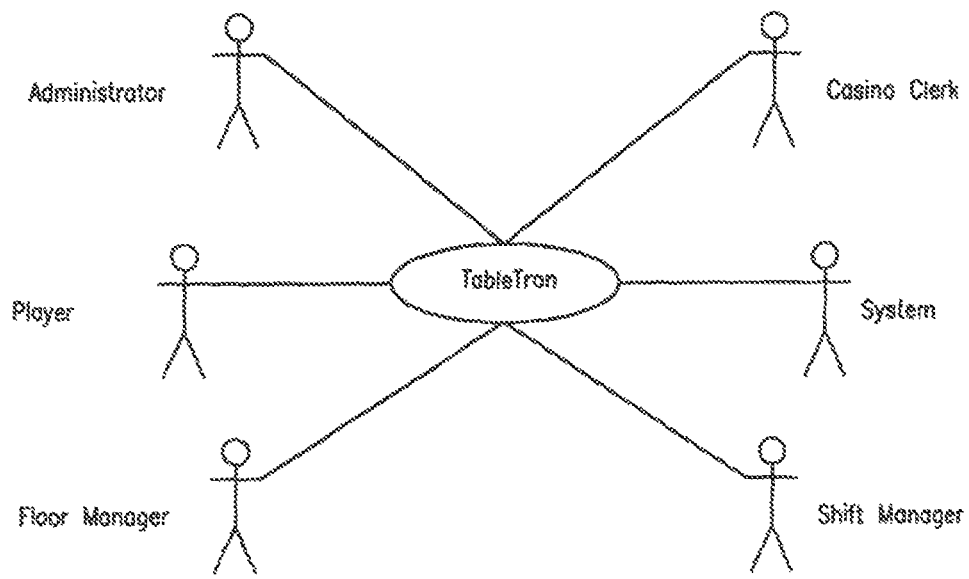
FIG. 2 is a Use Case Diagram of an overview of an embodiment.

FIG. 2 shows a Use Case Diagram in which a program (referred to as "TableTron") according to an embodiment of this invention communicates with six other actors, or entities. One such actor is a player. Other entities are typically casino employees (or others responsible for related operations), such as an administrator, a floor manager, a casino clerk and a shift manager. Another entity, the system, can refer to one or more other software and/or hardware systems. For example, the program may communicate with other casino computer devices, such as hotel devices, restaurant devices, and devices that calculate player compensation. In other embodiments, however, the embodiments that are described in this application can actually constitute a part of such devices.

Figure 3:
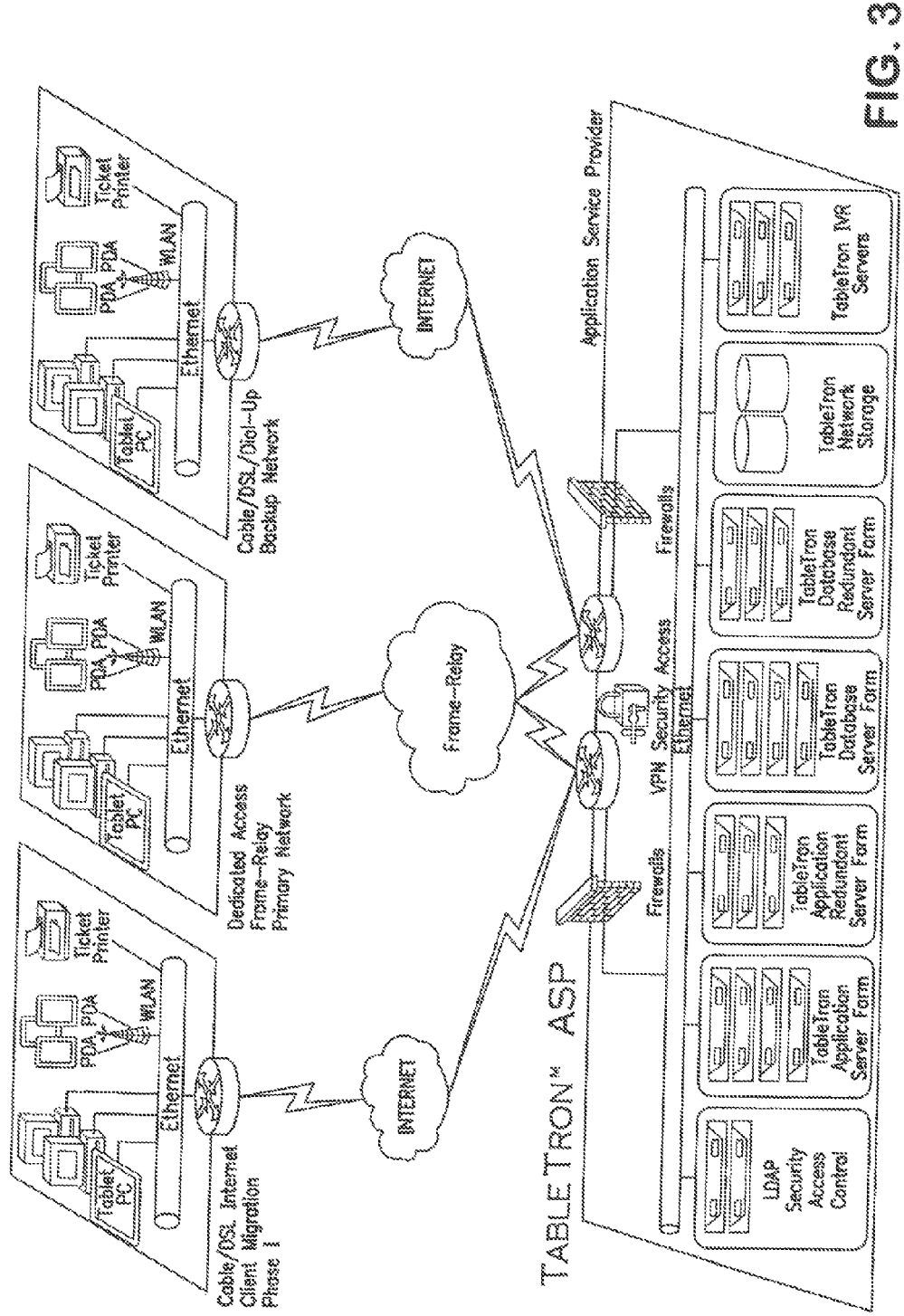
FIG. 3 is a schematic illustration of the Application Service Provider architecture of an embodiment.
Figure 4:
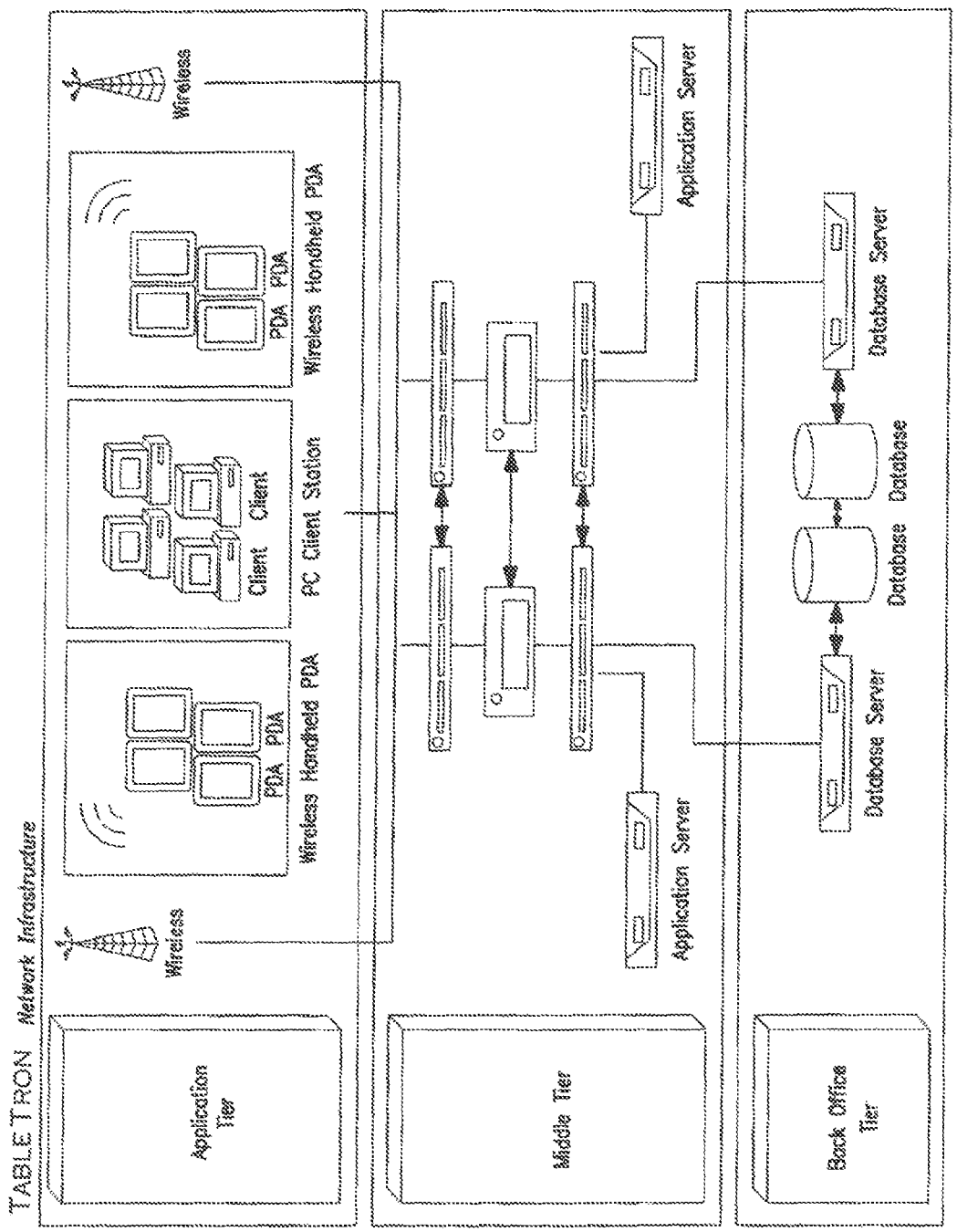
FIG. 4 is a schematic illustration of the network architecture of an embodiment.

The system may be organized in a three-tiered architecture consisting of an application tier, middle tier, and back office tier. For redundancy, there may be redundant application servers and redundant copies of databases. FIGS. 3 and 4 show possible configurations of a three-tier architecture. However, many other configurations will be readily apparent, and as is well known software can be efficiently run on many other architectures, such as single tier and double tier architectures.

In an Application Tier, a client environment runs on, e.g., standalone personal computers or handheld mobile wireless devices ("PDAs"—Personal Digital Assistants). In a Middle Tier, application main services run on dedicated computers referred to as Application servers. The application servers act as the main engine serving the requests of the clients and handling communication to the database servers in a well known manner. In a Back Office Tier, data resides in databases on database servers. The database servers are computer devices that store the data used in the program.

The Back Office Tier and Middle Tier can implement redundancy by performing data copying, synchronization and load balancing, as is well known. The Application Servers and Database Servers can be run separately (i.e. Application Server communicating with a dedicated Database Server), or the database can be embedded within the program itself where the system will run on a combined Application/Database Server. In some embodiments, data copying, synchronization and load balancing can be performed at the Application Server level.

The software described in this application can be run, accessed, and managed in a standalone fashion. In such a standalone setup, the computer equipment which is involved with running, accessing, and managing the program resides in a single location, such as in-house at a casino or otherwise on the customer's premises.

The software may also be run and executed by using an Application Service Provider. As is well known, this type of infrastructure permits users of the software program to run the application tier without incurring the cost or maintenance of the middle and back office tiers. Clients (e.g., PDAs and other computer devices in a casino) connect to the middle and back office tiers via the Internet, private communication line, or wireless satellite access. The connections can utilize enhanced security methods such as VPN (Virtual Private Network) and CA (Certificate Authority) technologies. Virtual Private Network are described in "VPNs: A Beginner's Guide" by John Mairs and Michael Mueller. Certificate Authority is described in "Digital Certificates: Applied Internet Security" by Jalal Feghhi and Peter Williams.

The Application Service Provider controls the maintenance and monitoring of the three tiers. The Application Service Provider can maintain an enhanced data center that provides redundancy and security for connecting clients.

FIG. 5 illustrates a process for using the program to initiate any of a number of the managers. As is seen from the top portion of FIG. 5, an actor who starts the program may select any of a number of options to initiate one of the managers. As is seen from the bottom portion of FIG. 5, various actors may interact with the managers as previously described with respect to FIG. 2.

Figure 6:
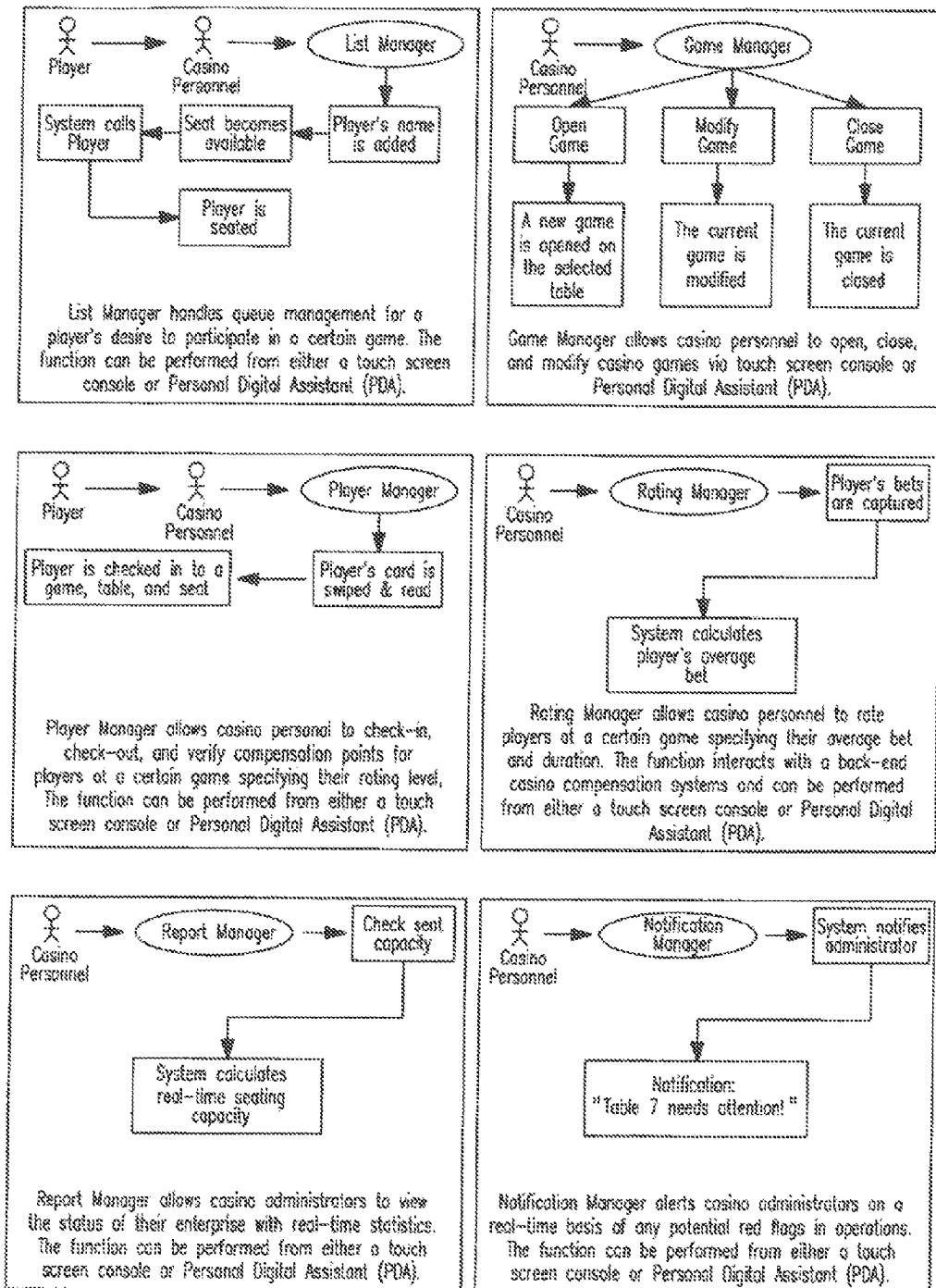
FIG. 6 is a set of examples of how various embodiments of this invention may operate.

FIG. 6 illustrates several examples of different actors interacting with different managers. Text beneath each of the examples describes precisely how the actor is interacting with the specified manager.

DETAILED MODULE DESCRIPTIONS

Below several managers are described, as are functions which constitute parts of those managers. The functions may be activated in many known ways (e.g., when a user presses a particular physical or graphical button).

Tournament Manager:

Tournament Manager is a module which allows certain personnel to create, delete, modify, and view tournaments. Tournament Manager interacts with a database (which stores tournament information) to edit and update data in real-time. Many system features of tournament manager run behind the scenes away from the view of common users, players, and casino patrons. Tournament Manager can utilize wired devices and/or wireless network devices, as well as other peripherals to perform the following functions.

"Create Tournament"

Create gaming tournaments based on a set of parameters that are chosen during the creation process. Such parameters may be, for example, date and time, entry fee amount, number of tables, number of players. The system stores all tournament information and generates a unique identifier (ID) for each tournament. The tournament data is stored in the database.

"Modify Tournament"

Modify any existing tournaments that have previously been saved to the system. Modify values such as number of tables, seats, buy-ins, re-buys, entry fee, date, etc.

"View Tournament"

Figure 7:
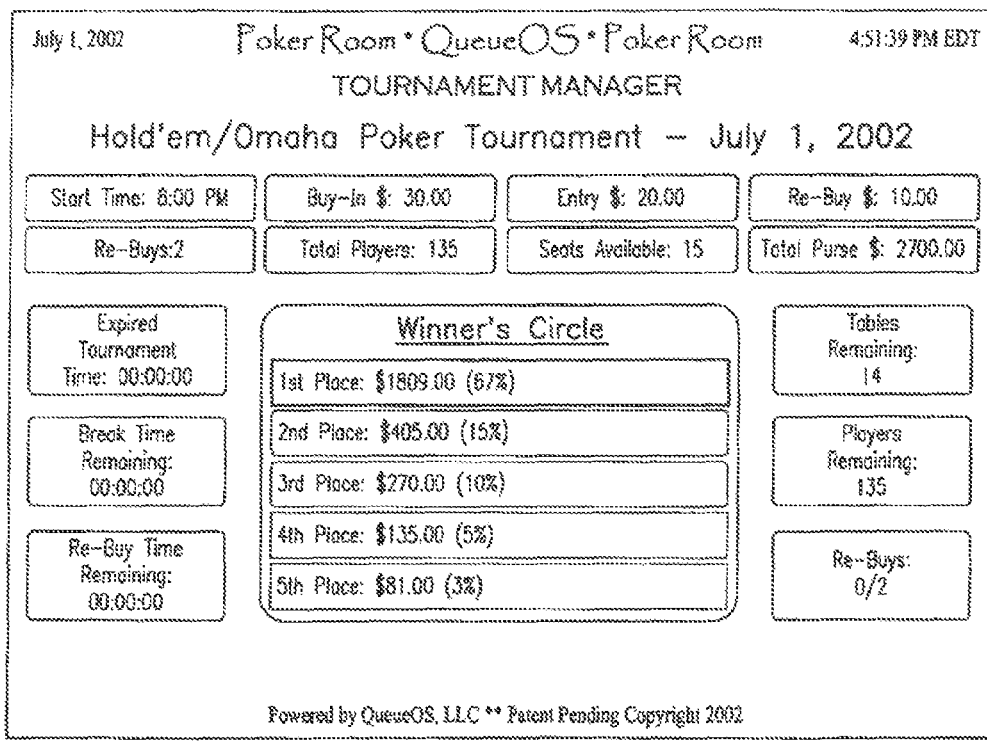
FIG. 7 is an illustration of a graphical user interface, shown at the View Tournament feature of the embodiment.

FIG. 7 shows a graphical user interface which is presented to a user when the View Tournament feature of the Tournament Manager is initiated. As seen in this graphical user interface, various data related to the tournament may be display to the user. Such data includes, for example, start time of the tournament, buy-in, entry fee, rebuys, total number of players in the tournament, seats available in the tournament, and total purse of the tournament. Other data which can be displayed may include, for example, the prizes won by various winners, the tables remaining for the tournament, the players remaining for the tournament, and break time remaining for the tournament.

The "View Tournament" function can display active, past, and/or future tournaments. The "View Tournament" function also displays data such as tournament start time, number of tables in tournament, seats available/not available for this tournament, buy-ins, re-buys, entry fee, winners, payout calculator and date of tournament. The "View Tournament" function also serves as a visual guide for players throughout the tournament, allowing players to track their process and the progress of other players. Both players and operational personnel of the tournament can have a graphical view of the tournaments status from start to finish.

"Delete Tournament"

Delete any specified tournaments in the system. Deleting tournaments deletes the tournament from an active or pending play status. The tournament does not get deleted from the database allowing management to run reports on active, completed, pending, modified and deleted tournaments.

Figure 8:
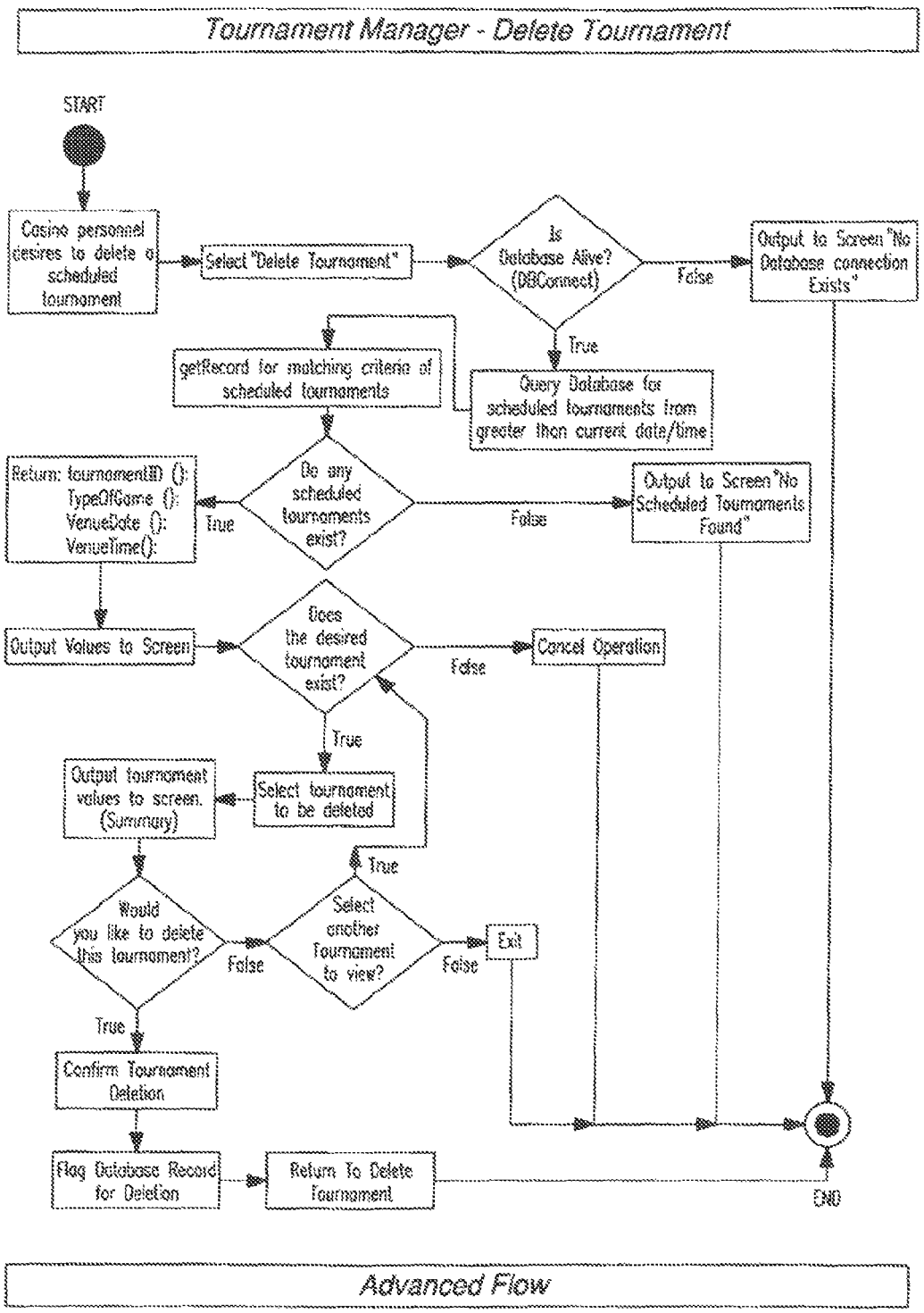
FIG. 8 is a flowchart illustrating an embodiment of a process for deleting a tournament.

FIG. 8 illustrates a flowchart describing a process for deleting a tournament.

"Tournament Payout Algorithm"

Calculates the running total of the tournament payouts based upon number of entries in the tournament and any desired payout algorithms for specific winning placements. Management and system users may modify payout algorithms as they see fit by storing rules/data which define the payout algorithm.

"Convergence of Tournament Tables"

Calculates the number of contestants remaining in the tournament and automatically moves contestants to new tables to ensure table capacity and free up unused table space for non-tournament patrons. While a tournament is active, the system users can modify the tournament by selecting how many and which players remain in the tournament. Once the system collects this information, it can automatically adjust the seating arrangement of players to conserve seats.

"Tournament Tickets"

A function that allows the printing of specialized unique tournament tickets for given tournaments. Replaces the method of ordering bulk tickets and carbon copy forms. This feature gives the establishment the ability to create custom tickets on demand. Many types of printers will be recognized as appropriate to print such tickets, including BOCA or PRACTICAL AUTOMATION thermal printers. Similarly, many types of papers will be recognized as appropriate for use with such printers and for such a purpose, including "thermal tag stock" paper. Unique system IDs and barcodes may be printed on the tickets, which can render duplicated tickets ineffective, and which can therefore help verify legitimate players' claims to specified tournament prizes or tournament entries. Tournament tickets may also be used to present promotions and marketing material printed on the tickets. For example, many types of offers and advertisements may be printed on the tickets, and the types of offers/advertisements can change with time, be different for different players, for different tournaments, for different types of players, etc.

"Tournament Up-Sell"

A marketing feature that permits the up-sell of establishment goods and services to be presented to tournament contestants. The up-sell may be used on tournament tickets or in the registration process of a tournament.

"Tournament Bracket Display"

A visual display of all registered contestants, seating assignments, and tournament statistics. Allowing contestants to view to current tournament progress. The visual display of active players, seat arrangements, and which players are leading the tournament.

"Free Roll Transfers"

A method for transferring free-roll applicants of a desired tournament. Free-roll tournaments are those in which there is no buy-in or entry fee. The system allows players to qualify and be transferred to tournaments via free-roll.

"Satellite and Double Elimination Tournament Support"

Satellites are tournaments in which the winner earns a buy-in into a larger tournament. The system automatically registers the winners of satellites with the desired tournament of choice.

System Manager:

The System Manager includes features by which administrators can set certain parameters which instruct the system how to respond and run under certain circumstances. The System Manager allows establishments to customize the program directly to their needs. By providing a centralized management console, System Manager provides the basic structure for the deployment.

"Help Menu"

An interactive help menu system designed to give users of the system assistance to all available modules and features. The help menu is designed to be accessible from any point in the program. The help menu incorporates both text assistance as well as recorded animation of the procedures to run the system. Users can search for help via text, voice, or video.

"View System Status"

A visual display for system administrators to determine the system's status. Allows administrator to see on- or off-line statuses of devices, users, and features. System administrator may also view licensing, contact, and support information.

"Set System Parameters"

Permits administrators to set specific business rules within the system such as notifications, displays, table rules, etc. These system parameters are used throughout the system to assist the automated functions that the system performs such as payouts, compensation points, etc.

"Set Marketing Parameters"

Helps administrators set marketing and up-sell parameters for the system to use for specific dates and times. Setting these parameters and values tells the system when and where to display the marketing information and for how long.

"Set Security Parameters"

Permits system administrators to set the security parameters for the system in regards to user access, data encryption, network device access, and notification procedures.

"View System Contacts"

A comprehensive list of system and vendor contacts, emergency contact procedures, and support contact procedures.

"QueueCache"

QueueCache is a data-buffering feature which enables all three tiers (in a three-tiered embodiment) to utilize an enhanced fail-safe software measure. QueueCache allows the buffering of data to provide performance and recovery from potential communication outages. QueueCache uses various known algorithms that protect against the potential loss of data. Both the clients and application servers consistently monitor and communicate the status of the communications network. In the event of a communications failure at any point in the network, the clients and application servers buffer or store their data locally to that device. Upon communication re-establishment the systems transmit their buffered or stored data first to ensure no data loss and correct sequencing of data.

"Web Connector"

A method for posting designated internal system parameters (e.g., List Manager View Display) to an internet/intranet website or forum. Web Connector is utilized for the technical support of the program. The program is designed to generate proactive system monitor logs and using the web connector can send the specified logs automatically without user intervention to the program support group. The industry standard protocols used for the Web Connector are SMTP (Simple Mail Transport Protocol—for email) and HTTP/S (Hyper Text Transfer Protocol/Secure). The Web Connector enables the system to gather custom specified data and send or transfer that data to desired users, groups, or other email systems. The Web Connector may be constructed using industry standard protocols as the network transports. An example use of the Web Connector would be: if a computing device had a communications failure, the application server would use the Web Connector to gather, format, and send the alert data to pre-specified destinations.

"Web Publisher"

A design template for preparing specified internal system information such as player information & game information to be posted to the web connector agent for intranet/extranet viewing. The Web Publisher acts as the gathering and formatting tool for the Web Connector. The Web Publisher job is to gather the data from the database, format the data into the correct structure for transmission, and handoff the packet to the Web Connector for transport. Web Publisher defines a set of rules that tell the system when, where, and how to get the information prepared for transit.

"Electronic Display Driver Support"

A specialized serial interface to communicate directly to electronic displays, such as the Trans-Lux™ electronic display. The system contains software drivers that allow displayed data to be viewed on different hardware appliances. The program detects which display hardware is being used, and performs formatting of the data to be displayed correctly on the type of display being used. The system also provides an interface mechanism to "write" the data to the display in the correct manner since different displays may require a different manner to which data is received.

"Voice Activation and Response Unit"

The system utilizes voice activation commands and a voice recognition engine to decipher those commands. The voice activation process allows users to speak commands into either a telephone, or computing device which the system then interrupts and processes the commands. The voice response unit allows system users to "call" into the system via a telecommunication device (telephone or computing device) and receive automated voices responses to the desired information.

"Embedded Applications Download"

To ensure the protection against software piracy, the system uses a download method of attaining the appropriate program files to run the program (both application server and clients). Upon start-up the application server and/or clients query a "system appliance" device located either on- or off-site. The system appliance validates the machine and downloads the program files to the machine's memory store. The machine then runs the program out of memory, thus limiting the amount of files and potential piracy associated with storing program files on the machines itself. The "system appliance" also serves as an update devices where the application server and/or clients query the appliance at scheduled times to locate any program file updates (such as patches and new program versions).

"Knowledge Base with Decision Rule Maker"

The system houses a standardized set of gaming rules which allows systems users to query the system for house or industry standard gaming rules. In the event of a player-house conflict, the user may query the knowledge base to determine what the standard rules are to resolve the conflict. The system may also suggest a solution based upon a history tracking table of rule conflicts. The system attempts to standardize the rules so that users and players have clear solution in the event of a conflict.

"Database Synchronizer"

The Database Synchronizer allows administrator to synch or create a replica of the system's database on any other industry-standard relational database. Establishments may wish to synchronize the system's database with another in-house database for purposes of backup, recovery, or reporting. Internally, the system automatically synchronizes with a secondary database if two or more application servers exist.

"Credit Card Processor Engine"

The system has a built in credit card processing unit that allows patrons to pay for services via credit cards, which are either entered or stored in the system. The application server will make the appropriate communications uplink to an authorized bank or processing facility to complete all credit cards related transactions.

"Legacy Agent Robot"

The legacy agent feature communicates to back-end existing systems such as AS400 or ACSC patron management systems. Using both screen scrapping (a technique that maps out the coordinates on a computer terminal screen, writes information to the appropriate fields and sends the data as if a manual entry was conducted) and socket based connections, the system can accurately upload data to existing back-end systems. The two methods are used to update existing systems, provide replica data, and eliminate manual entry of data. The screen scrapping method uses an existing upload program and acts as a virtual user entering data. The socket-based communication encapsulates the data into packets that the back-ends system can understand and transmits that data to the back-end system directly.

Network Manager:

Network Manager is designed to assist in the setup, maintenance, and support of the computer network topology through which the program communicates. Utilizing technology such as data load balancing, server redundancy, encryption, and monitoring agents enhances the program's performance. Network Manager is a management console enabling administrators to control the attributes and behaviors of their computer devices (e.g., desktops, PDAs, servers) throughout the topology. With Network Manager, administrators of the system can selectively add, delete, or modify computing devices from a virtual map layout. The devices can be aligned to form a geographical map of each device's location. Network Manager allows administrators to test device communications, ensure security mechanism are being followed, and view proactive communications monitoring. The manager provides administrators a graphical view of the devices and their statuses throughout the computer network.

Figure 9:
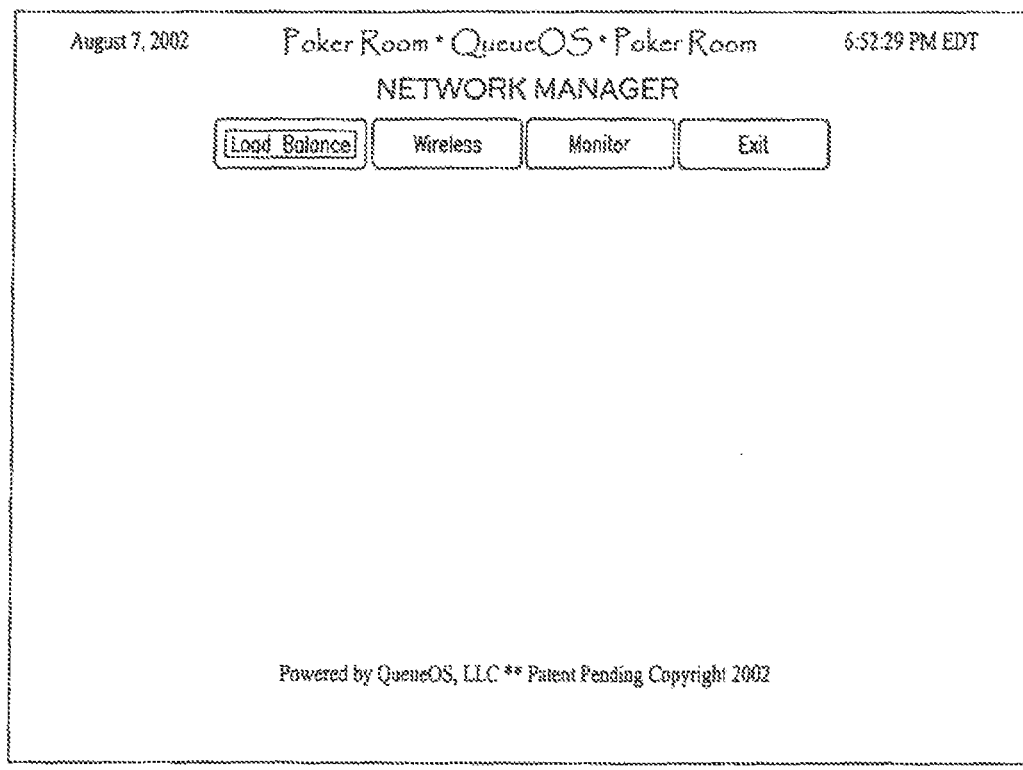
FIG. 9 is an illustration of an example of graphical user interface for Network Manager module.

FIG. 9 illustrates a graphical user interface which is displayed upon initiating the Network Manager.

"Add Network Device"

Adds a network device to the system topology to be used and monitored.

"Modify Network Device"

Modify an existing network device in the system topology.

"Delete Network Device"

Delete a network device from the system topology.

"View Network Device Status"

Figure 69:
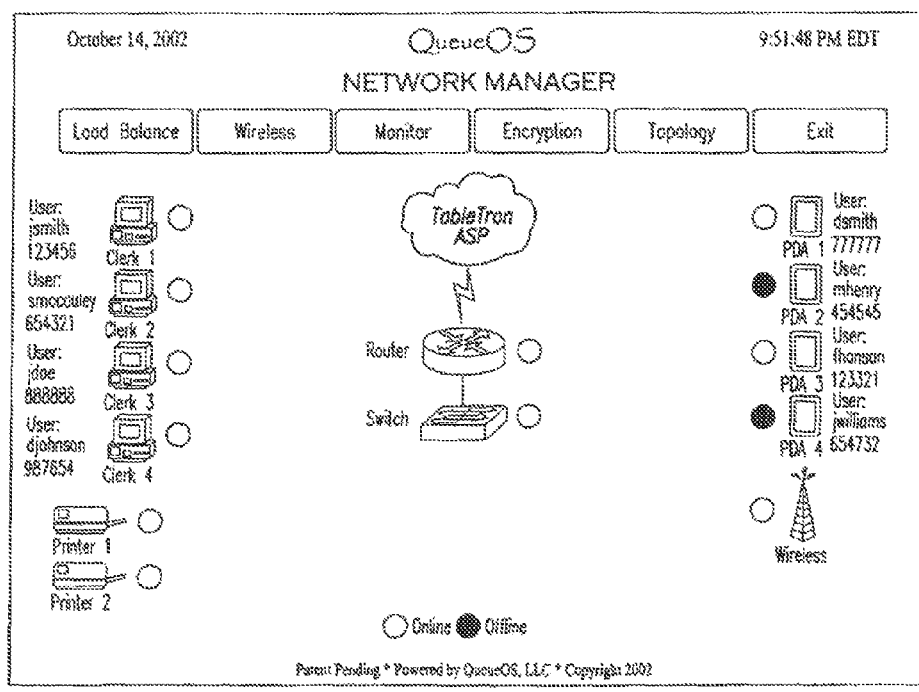
FIG. 69 is an illustration of a graphical user interface, shown at the Network Manager screen.

A real-time display of all networked computing devices that reside in the system. Providing device status, uptime, and any alerts to the health of the device. An example of such a display is shown in FIG. 69.

"Workstation Manager"

Allows administrators to remotely control the workstations (e.g., personal computer devices) that make up the system topology. The feature allows the ability to run certain procedures remotely to maintain the status of each personal computer device.

"Wireless Manager"

Provides the system administrator to control the flow and redundancy of data transmissions throughout the wireless portion of the system topology. The wireless manager maintains industry standard 802.1 lb wireless protocol technology. Wireless managers also allow management personnel to pinpoint the location of their wireless devices anywhere within the wireless range.

"Infrastructure Manager"

Allow administrators to control remotely the infrastructure devices that make up the system topology communication segments. The feature allows the ability to run certain procedures remotely to maintain the status of each device.

"Ping Network Device"

An industry standard tool for testing the connectivity to a networked device.

"Integrated locator System (ILS)"

Integrated Locator System allows management personnel to pinpoint the location of their wireless devices anywhere within the wireless range.

Template Manager:

Template Manager eases redundant system resources and procedures by providing the ability to use resource templates. With templates, administrators can quickly and easily maintain other areas of the program and quickly increase the establishments' productivity. Template Manager allows administrators and users of the system to quickly create, delete, and modify a pattern or structure applicable to many system resources. Template Manager can be used throughout all system modules and may also be protected by permission set forth by administrators. For example, a poker room manager would have the ability to create a template for upcoming tournaments which would include the pre-configured date, time, amount, entry fees, table number, etc.

"Create Template"

Create a new template for a system resource.

"Modify Template"

Modify an existing template for a system resource.

"Delete Template"

Delete a specified template.

"Print Template"

Print a specified template to a local or networked printer.

Report Manager:

Report Manager allows authorized personnel to view real-time and historic data. The Report Manager may be enabled to be constantly active, thus ensuring real-time capability. By utilizing event-triggered methods, the real-time status of an establishment's areas of business may be ascertained. The report Manager incorporates different features in which the data is formatted and delivered to the inquiring parties. Report Manager can use predefined reports. Additionally, individually customized reports can be created by users. Report Manager actively searches the database for the records and data need to complete the report query and returns the results back to the user in graphical format. Report Manager has an automated scheduling system in which reports may be set up and run without any user intervention.

Figure 10:
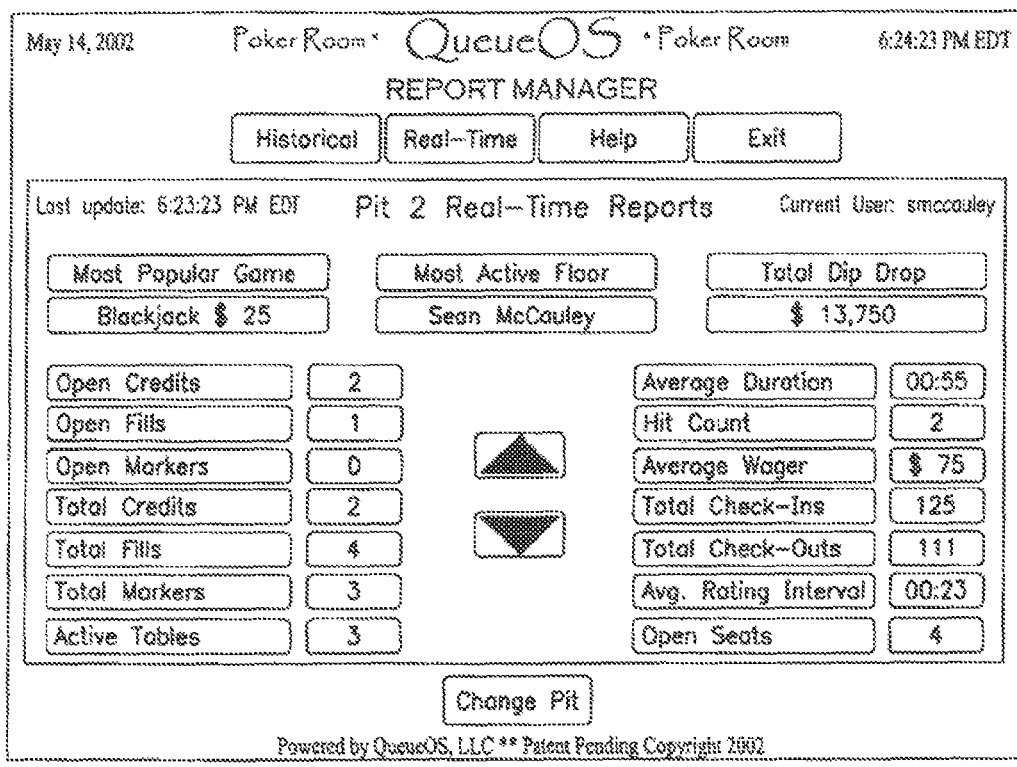
FIG. 10 is an illustration of an example of graphical user interface for Report Manager module.

FIG. 10 illustrates a graphical user interface which is displayed by Report Manager. That user interface displays a report which includes several items pertaining to the status of a Pit ("Pit 2").

"Real-Time Reports"

Utilizing structured update calls, the system provides clients real-time reporting capability on specified data chosen by the user.

"Historical"

Historical reporting provides users of the system access to historical data stored by the system in the database. Allowing users to query data on a specified set of parameters for any past date and time.

"Automated Reports"

Methods in which a real-time report can be sent via electronically or printed after certain predefined parameters trigger the reporting event. Electronic messages can be sent, e.g., via e-mail, instant message, pager, or voice mail, "Slot Attendant"

The Slot Attendant function allows system users to view reports of slot machines. Information gathered such as cash contained, uptime, downtime, hit counters, location and maintenance records are all viewable through Repot Manager Slot Attendant.

Notification Manager:

Notification Manager is the system's alert engine. Notification Manager is a watch engine that looks for certain parameters that raise red flags in the system. These notifications may be based on business rules and/or system conditions. Notification Manager can be customized to meet an establishment's needs and priorities. Industry standard protocols may be used to alert and notify predetermined individuals of certain system conditions and business rules violations. Notification Manager allows the establishment to be notified proactively on any condition they deem to be vital. The Notification Engine utilizes the industry standard TCP/IP (Transmission Control Protocol/Internet Protocol) as the mechanism for transport. Business rules and system conditions are pre-set by system administrators. The groups, departments or destinations to which the messages are sent are also set forth by administrators. Loss of communication to a computing device is an example business rule violation that could initiate a notification message being sent to a set forth party.

Figure 68:
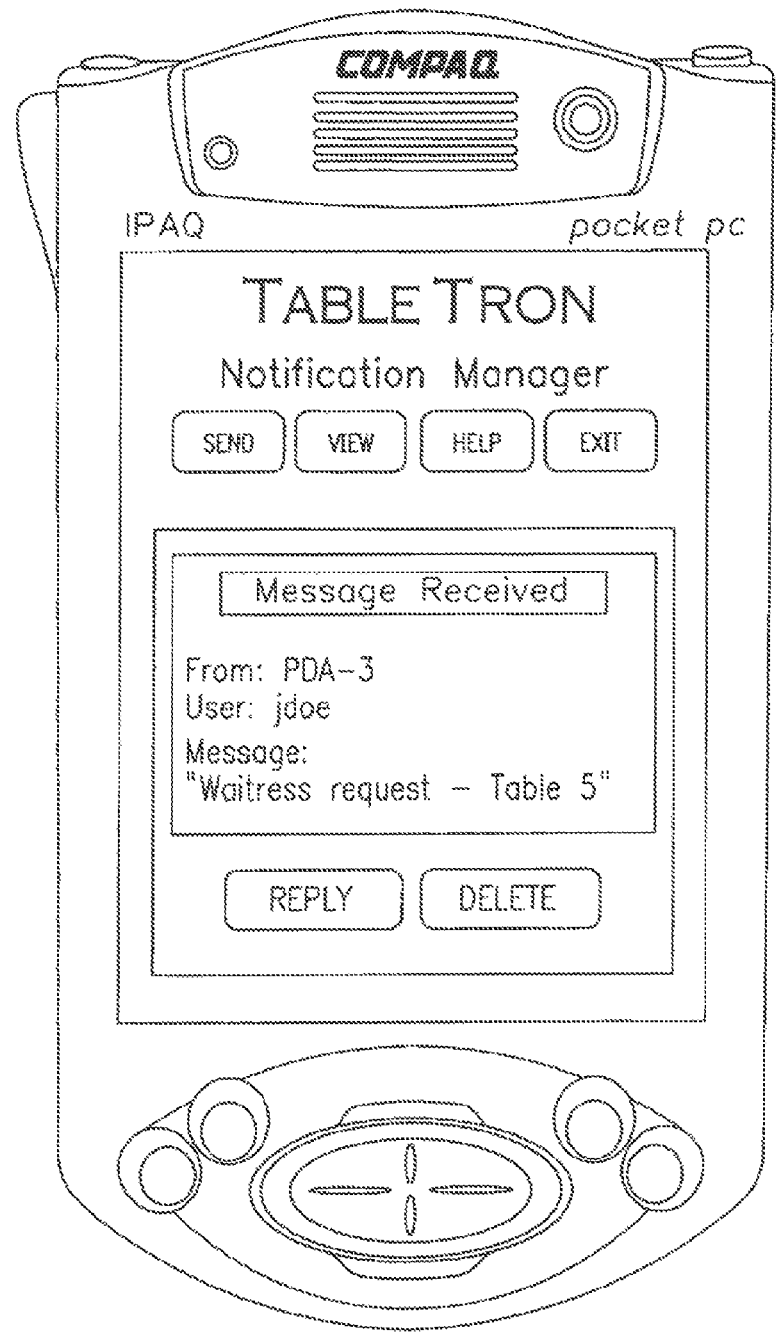
FIG. 68 is an illustration of a graphical user interface, shown at the PDA Notification screen.

FIG. 68 is an illustration of a graphical user interface, including a notification message, shown on a PDA.

Figure 70:
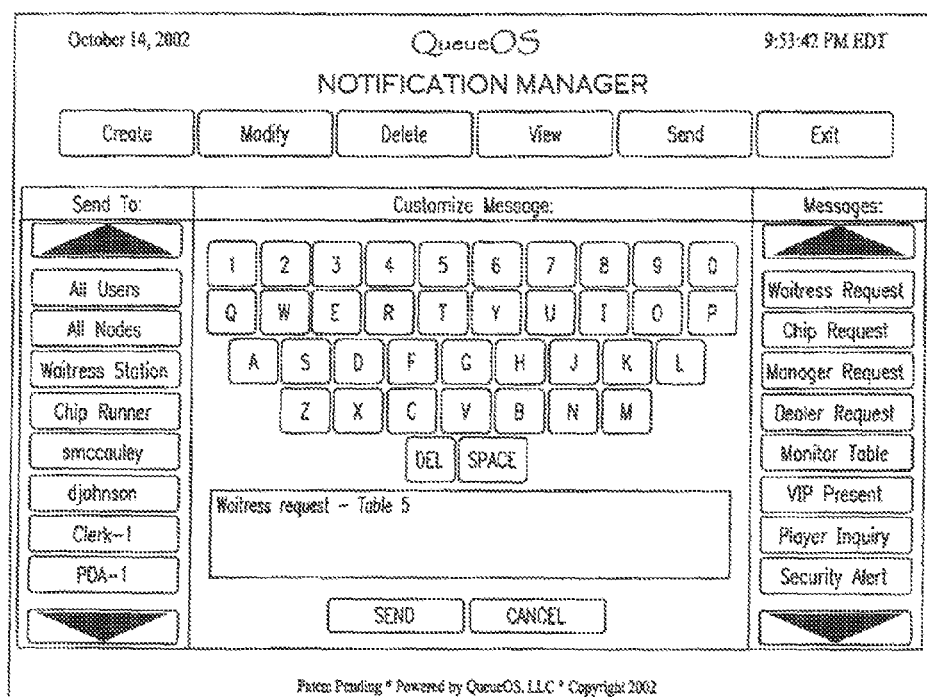
FIG. 70 is an illustration of a graphical user interface, shown at the Notification Manager Send screen.

FIG. 70 is an illustration of a graphical user interface which permits a user to create and send a notification. The user interface allows the user to select a recipient and corresponding message.

"Start Notification"

The "Start Notification" function starts the notification engine and begins to capture and send messages.

"Stop Notification"

Stop Notification stops or pauses the notification engine and queues up the inbound and outbound messages to a buffer pool. Once notification begins the queue is flushed and all paused messages are delivered.

"Clear Notification Log"

Enables administrators to clear or flush the notification log file where all transactions are recorded.

"View Notification Log"

Display the log of recorded transactions that the system has processed.

"Add Notification"

Add a custom notification based on a set of system parameters determined by the system administrator.

"Modify Notification"

Modify an existing notification by adding or removing parameters.

"Delete Notification"

Deletes a notification from the system.

"Set Notification Parameters"

Allows administrators to customize how and when notifications are sent and received.

"Send Message"

Permits users to send instant text and voice based messages to other devices within the system topology.

"E-mail Support"

The system feature that enables the emailing of patrons, management, or other system users data that is set forth via business rules. The system may email players compensation or play statistics, email management reports, etc.

"Web SNMP Notification Engine (WSNE)"

This feature combines the industry standard SNMP (Simple Network Management Protocol) with a web based communication protocol (HTTP/HTTPS) to send system alerts to technical support representatives via the Internet or intranet. The system allows the capture of SNMP packets, encapsulates those SNMP traps into an HTTP or HTTPS (secure) packet, and then forwards those packets to a desired destination. Upon retrieval of the packet, a small java program deciphers that packet to retrieve the SNMP trap or alert. This eliminates the need for SNMP management software by utilizing the industry standard HTTP/HTTPS web network protocols.

Security Manager:

Security Manager allows system administrators to set security policies and procedures by using an industry standard security protocol called Light Directory Access Protocol (LDAP). LDAP is described in "Understanding and Deploying LDAP Directory Services (2nd Edition)" by Timothy A. Howes, Mark C. Smith, Gordon S. Good.

Security Manager assigns security levels and privileges to individual users and groups of the system. Security Manager also establishes data encryption schemes to ensure that any transmitted data is securely encrypted and protected from outside threats. Security Manager maintains the relationship between the users of the system and the security database where access levels are granted. Security Manager supports the use of Smart Cards and Smart Card readers, an industry standard security mechanism validating the authenticity and integrity of system users. Use of Smart Cards also enables the system clients to be run using "thin client" or "dumb terminals" devices. Thin clients are devices that process all data including operating system and programs off a centralized server.

Figure 67:
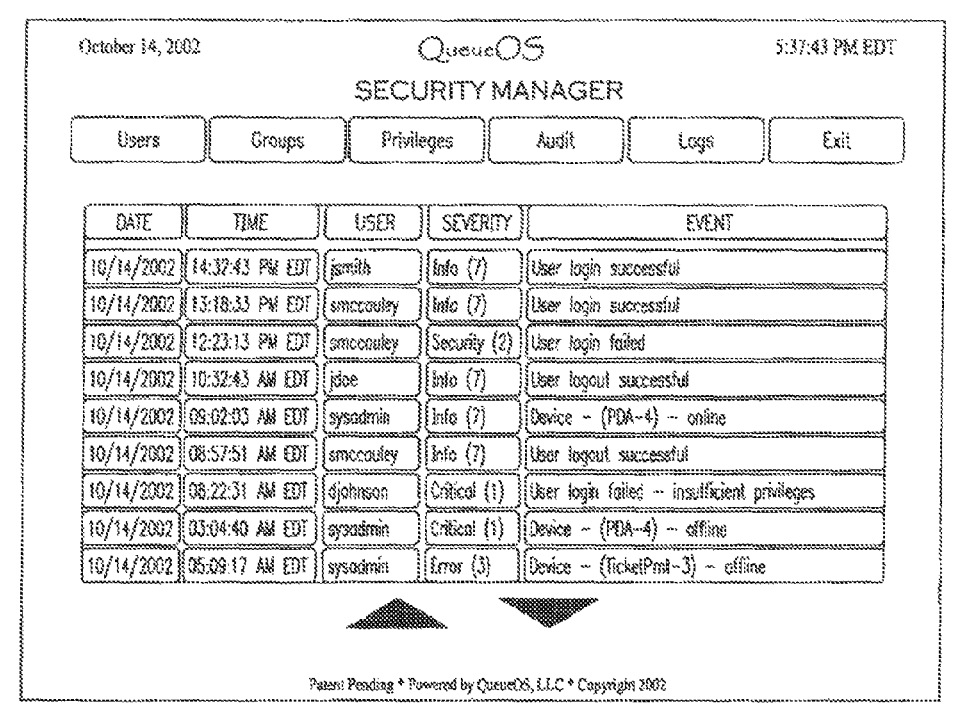

FIG. 67 is an illustration of a graphical user interface shown at the Security Manager Logs screen. The illustrated interface shows data on a number of security events, including when the event occurred, who was involved, and the severity of the event.

"System Login"

By using an industry standard authentication method (LDAP), the system login process validates a user's identity and access privileges. The method of authentication can be derived from many known mechanisms, including barcodes, magnetic stripe cards, text based passwords, voice recognition, or fingerprint recognition. Login transactions are recorded by the system for tracking, accountability, and administrative purposes. The system can easily integrate into an existing LDAP environment or provide it's own standalone authentication domain.

Figure 11:
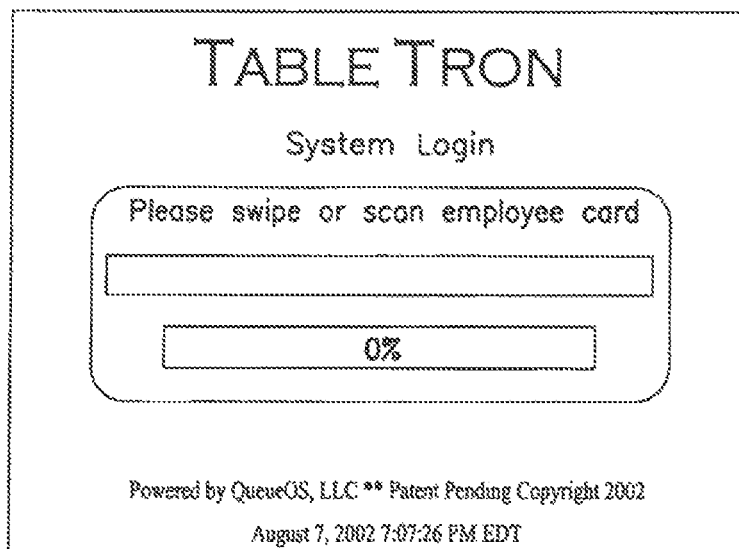
FIG. 11 is an illustration of an example of graphical user interface for Security Manager module.
Figure 12:
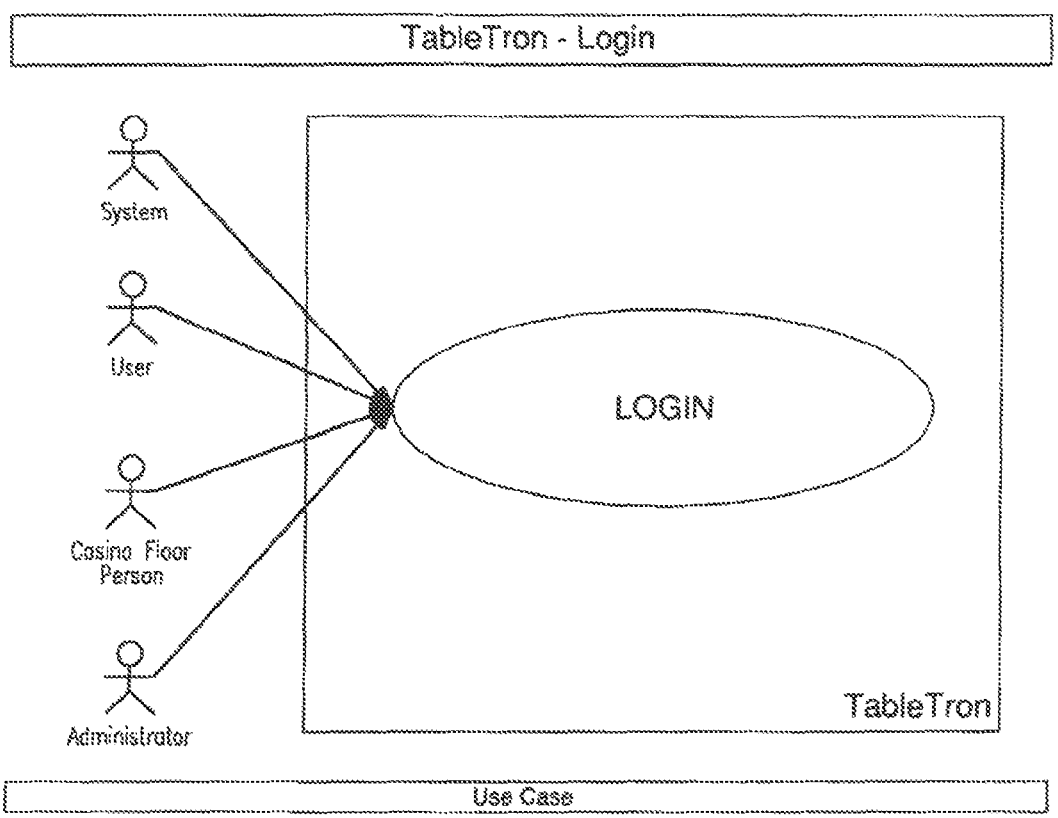
FIG. 12 is a Use Case Diagram of a System Login operation.
Figure 13:
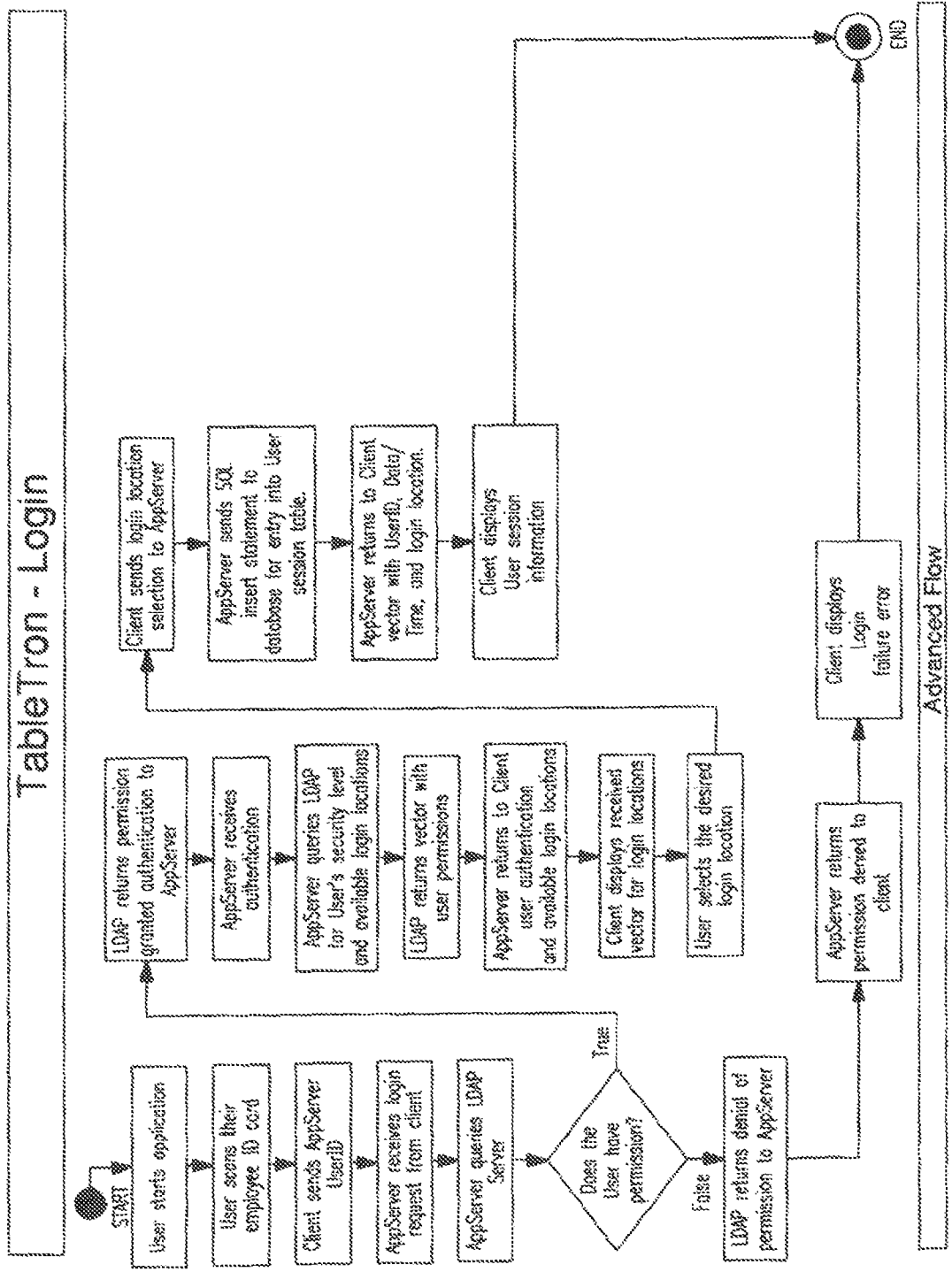
FIG. 13 is a flowchart illustrating an embodiment of a process for a System Login operation.
Figure 14:
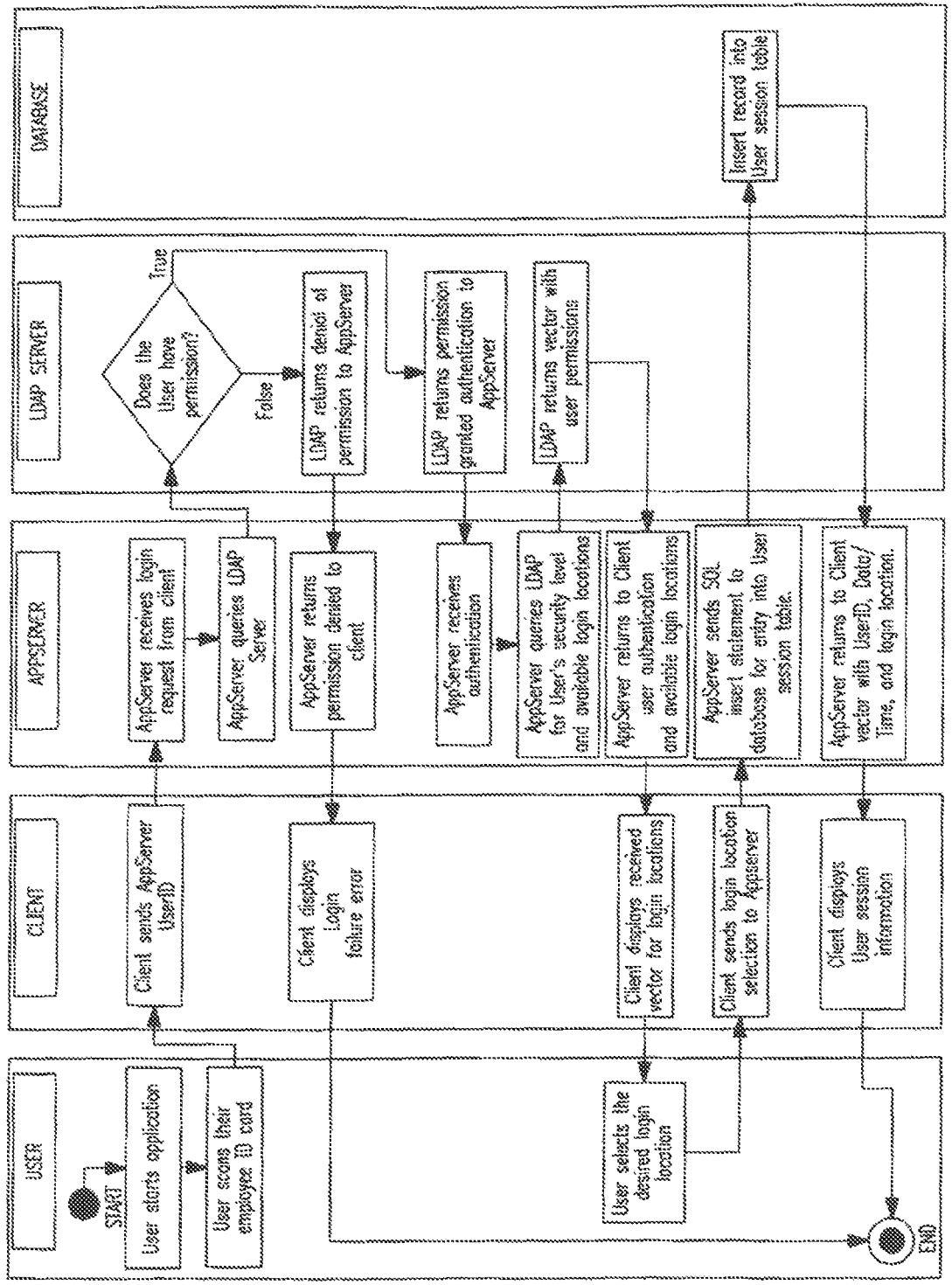
FIG. 14 is an Activity Diagram for an embodiment of a process for a System Login operation.

FIG. 11 is a sample display that is shown to a user when the user is expected to swipe a card thru a card reader, thereby identifying the user. FIGS. 12-14 illustrate a process for system login.

"System Logout"

The process by which a users logs themselves out of the system. Capturing the transaction, the system updates the user's profile with information captured during the session. Once the user is logged out of the system, the user must log back into the system to gain access.

"Add User"

Add a user to the system directory for access.

"Modify User"

Modify an existing user's profile.

"Delete User"

Delete a user from the system removing all associated access privileges.

"Disable User"

Disable a user's account where that user is not removed from the system but the user has no permission to access any area of the system.

"Active User Display"

Display for administrative personnel a real-time description of which users are active in the system and their corresponding locations of activity.

"Set User Permissions"

Provide users with different security levels which can permit or deny them access to certain areas of the system or access to certain system devices.

"Add User Group"

Allow administrators to group like users into a single group that holds certain security levels. All users included in the group follow the groups' security privileges.

"Modify User Group"

Modify the parameters of a certain user group of the system.

"Delete User Group"

Remove a user group from the system.

"View User"

Display showing the profile of a specified user, including personal information, security level, employee identification, license number, digital signature, and/or photo identification.

"View User Group"

A visual display showing the users and parameters associated with the specified user group.

Casino Manager

Casino Manager performs casino wide business functions. Casino Manager includes functions for requesting credits, fills, and markers. Table inventory and table history methods are included along with a scheduling module used in the management of dealers. Casino Manager allows functionality to be run from either a standalone personal computer or from a wireless handheld device or PDA (Personal Digital Assistant).

Figure 15:
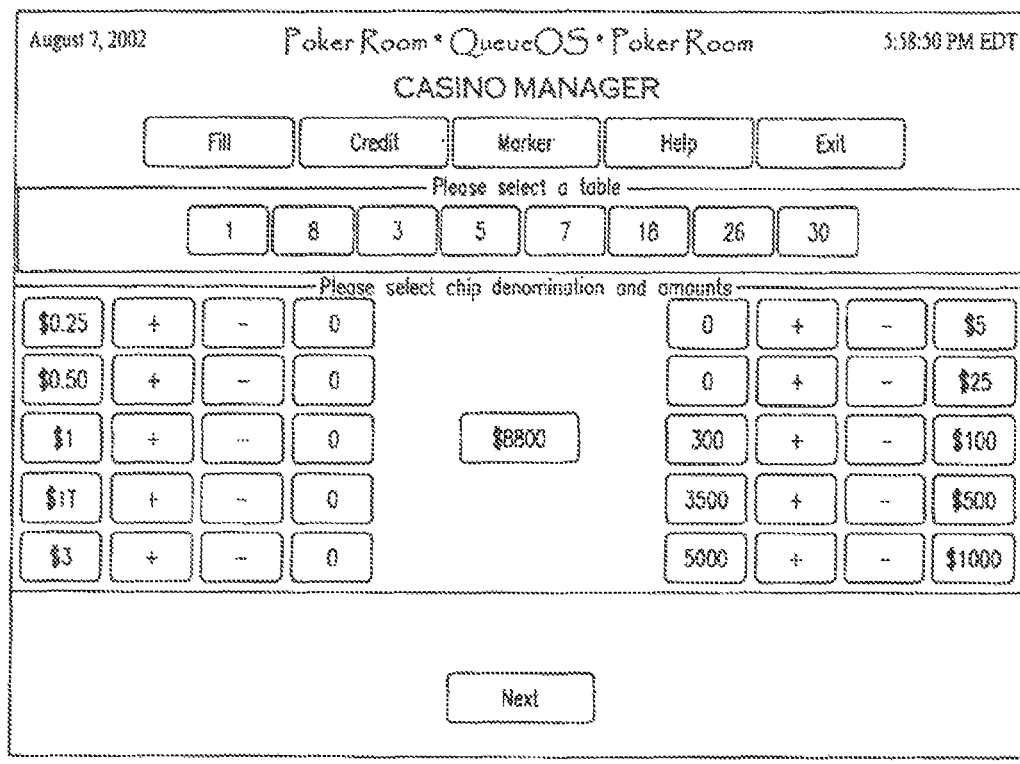
FIG. 15 is an illustration of an example of graphical user interface for Casino Manager module.

FIG. 15 is an illustration of an example of graphical user interface for Casino Manager in which a table and an amount of chips may be designated, along with other functions applied to such a table and amount of chips. Note that a similar interface may be used in other functions to enter chip denominations and/or chip amounts.

Figure 16:
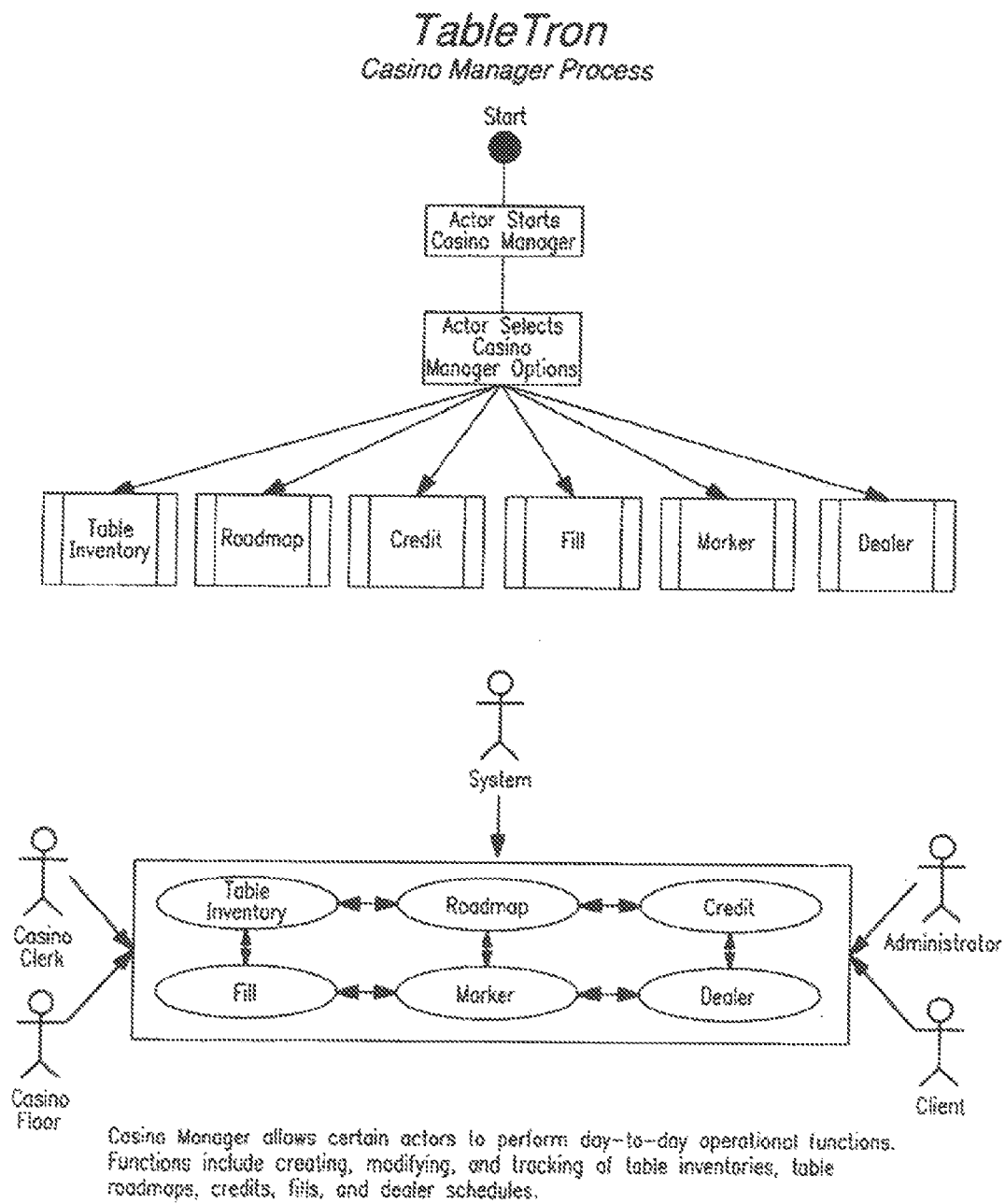
FIG. 16 is a flowchart of a process for initiating Casino Manager functions.

FIG. 16 is a flowchart of a process for initiating Casino Manager functions.

"Table Inventory"

Allows users to accurately and electronically track table inventories at startup and closure of each table session. The system records all inventory values and updates the table roadmap accordingly.

"Roadmap"

The roadmap keeps a constant accounting cycle of a table's financial situation. All table transactions are recorded and entered into the roadmap by the system with no user intervention.

"Credit"

The credit feature automates the credit request made by pit and floor person. A fill request is recorded by the system and transmitted electronically to the casino back end system. A system printed receipt allows employee signatures and barcode verification for tracking.

"Fill"

The fill feature automates the fill request made by pit and floor person. A fill request is recorded by the system and transmitted electronically to the casino back end system. A system printed receipt allows employee signatures and barcode verification for tracking.

"Marker"

The marker method allows pit and floor personnel to request player markers for gaming purposes. The system generates the request to the casino cage and handles accountability and tracking of the requests, along with sequential printed receipts for employee signatures.

"Dealer Coordinator"

Dealer feature allows dealers and authorized personnel to perform dealer preferences and dealer scheduling. The feature allows dealers to register themselves into the system upon the beginning of a work shift. The system using random generation schedules dealers for certain games and breaks based upon preloaded dealer preferences. Cross referencing available Dealer pools to cover lost shifts and table dealer necessities.

Figure 82:
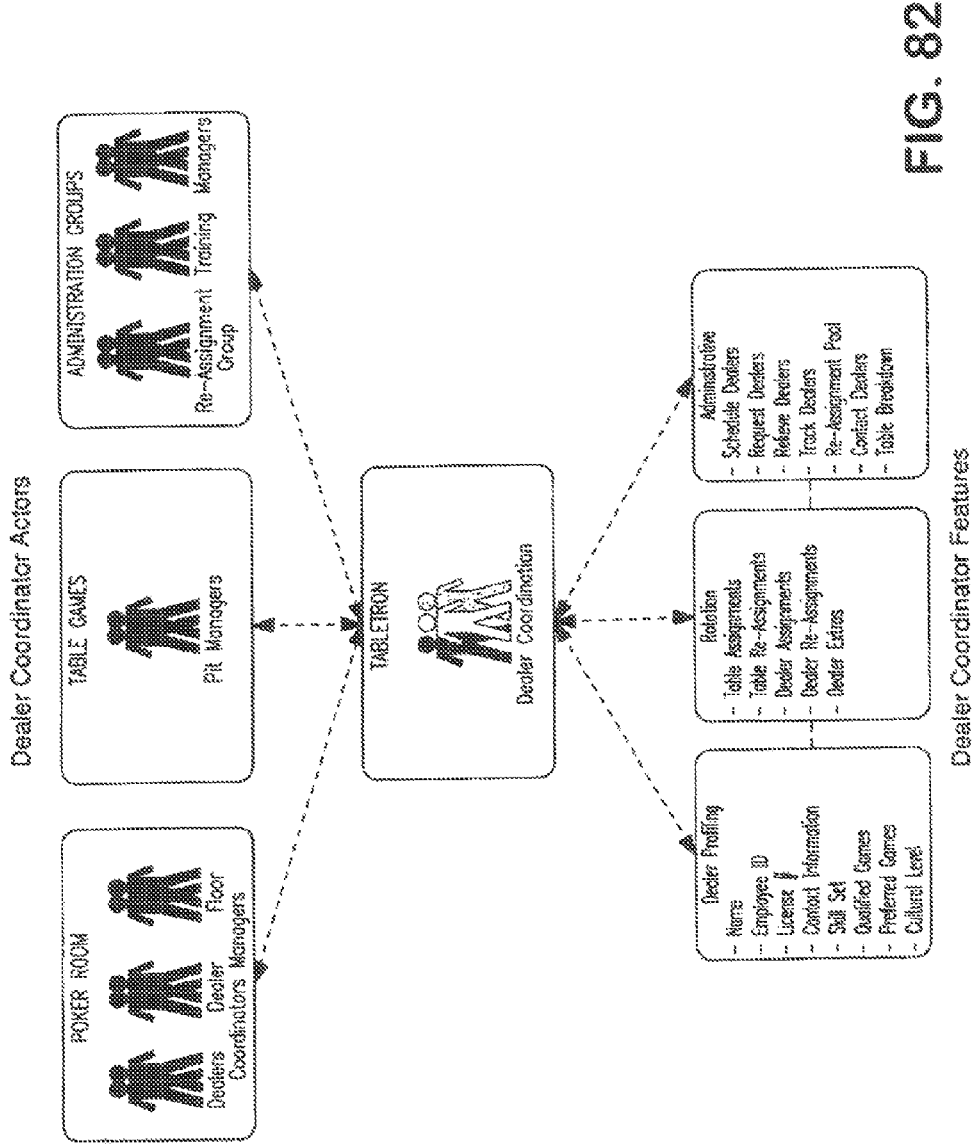
FIG. 82 is an illustration showing the Dealer Coordinator actors and functions.

FIG. 82 is an illustration showing the Dealer Coordinator actors and functions.

Figure 83:
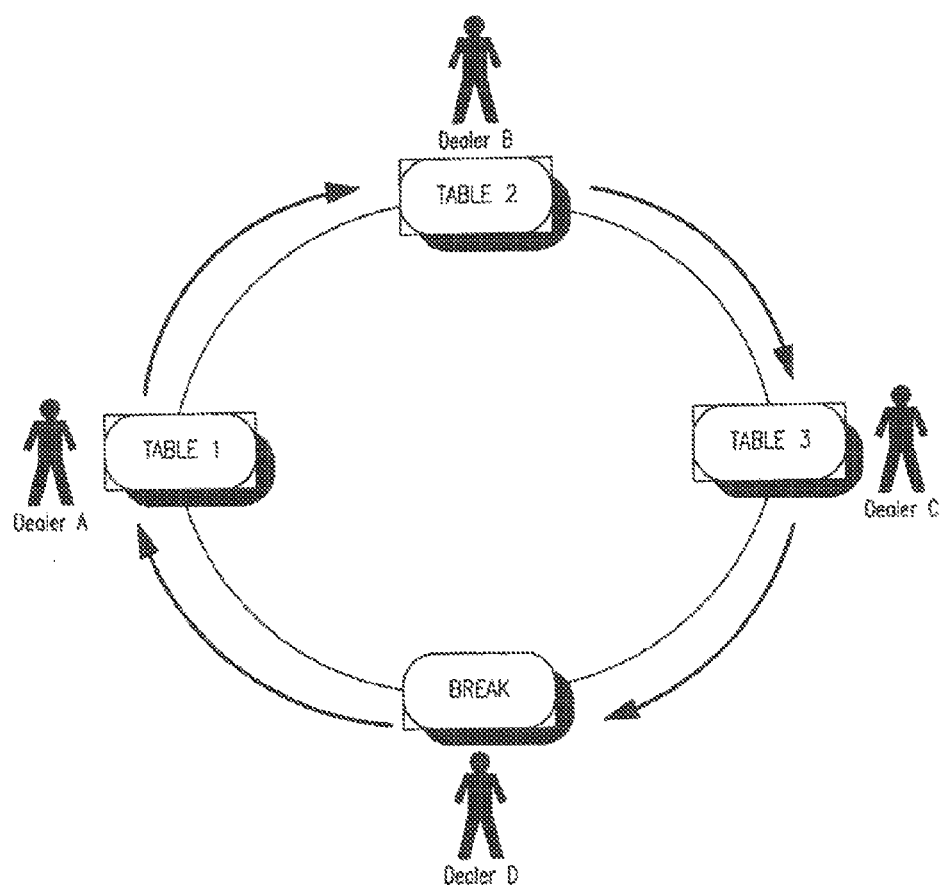
FIG. 83 is a diagram of the process for Dealer Rotation.

FIG. 83 is a diagram of the process for Dealer Rotation.

Figure 84:
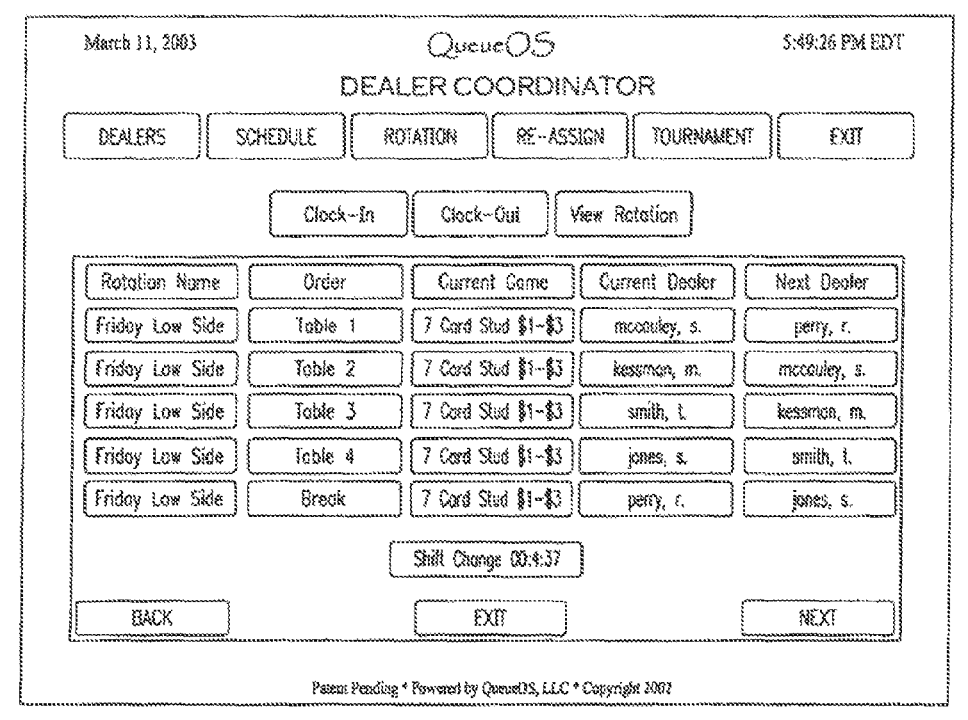

FIG. 84 is an illustration of a graphical user interface which shows the View Rotation display this user interface shows information regarding various shifts, and responsibilities of personnel in the shifts.

Figure 87:
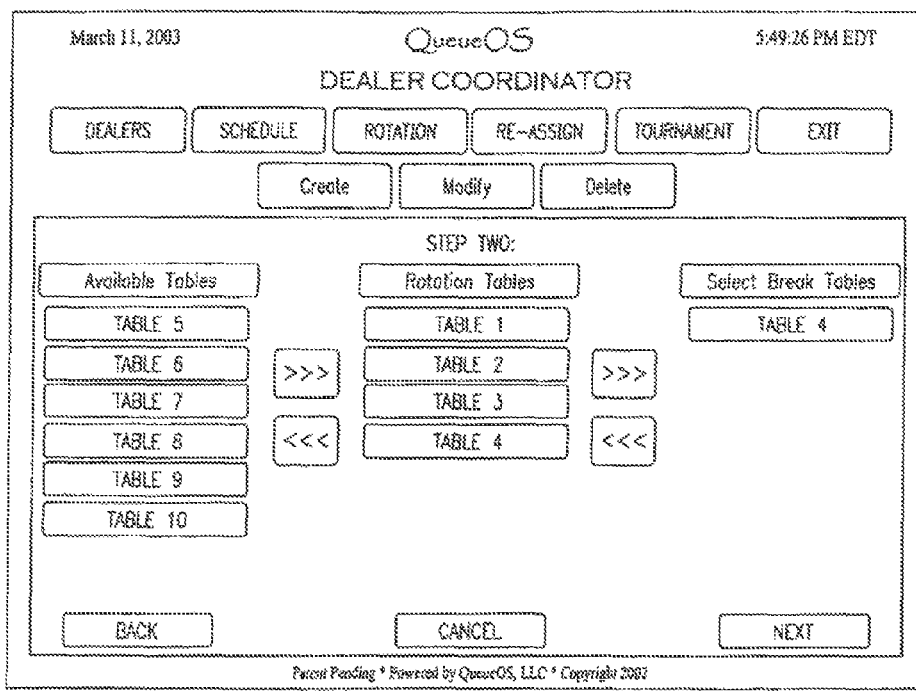
FIG. 87 is an illustration of a graphical user interface, showing the Dealer Coordinator Create Rotation screen.

FIG. 87 is an illustration of a graphical user interface which shows the Dealer Coordinator Create Rotation screen.

Figure 88:
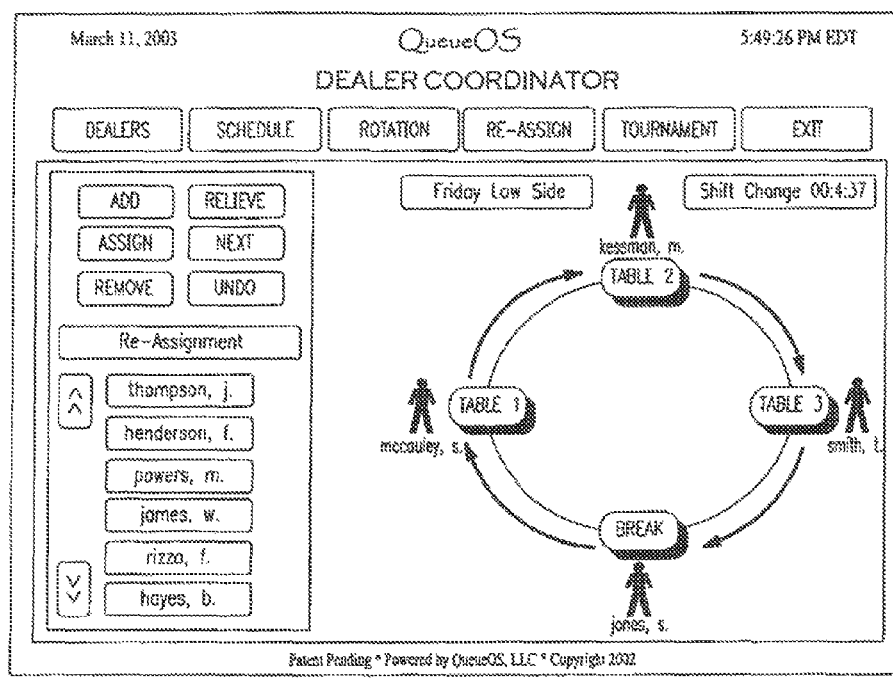
FIG. 88 is an illustration of a graphical user interface, showing the Dealer Coordinator Re-Assign screen.

FIG. 88 is an illustration of a graphical user interface which shows the Dealer Coordinator Re-Assign screen.

"Request Player Card"

A method that allows a user to request a player identification card be processed for a particular player. The system generates a request and is sent to the establishments computer system responsible for handling player identification cards. Typical requests stem from lost or damaged player cards.

"Security Alert Request"

A feature which allows a user of the system to request security assistance to a gaming table or area. The system generates an alert notification to the establishments security division. To combat fraud within the establishment the user has the capability to send a real-time request for assistance. The system calculates the exact location of the alert origin and notifies security personnel.

Figure 85:
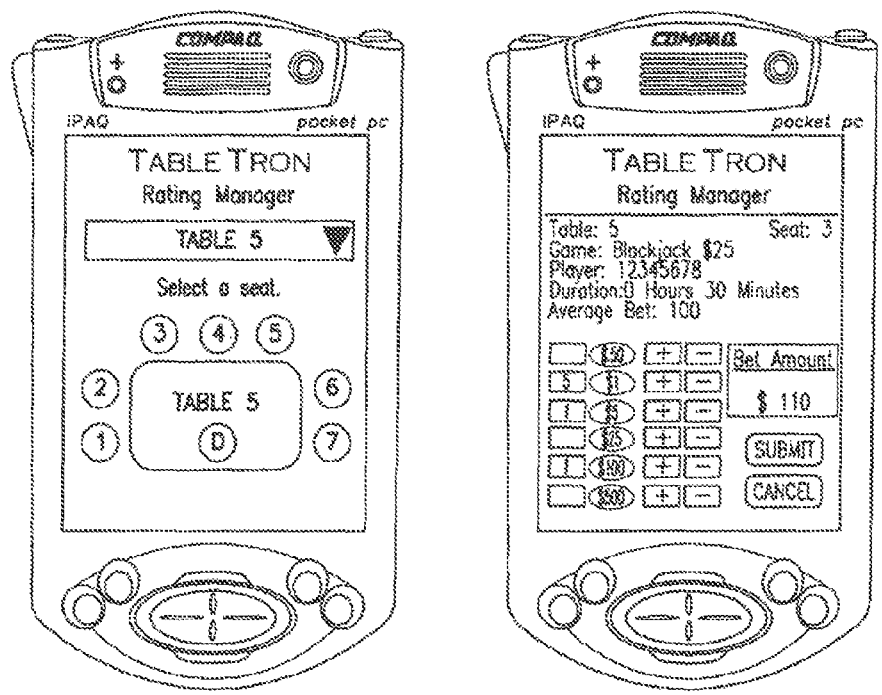
FIG. 85 is an illustration of a graphical user interface which shows Rating Manager displays on PDAs.

Rating Manager:

Rating Manager tracks the characteristics of wagers by players. Users of the system have the ability to record the wagers of players, calculate average wagers of players, and track duration of play by a player. Rating Manager cooperates with Player Manager in order to calculate and assign a player's compensation points. Compensation points are typically calculated based on the amount the player wagers, but may also be calculated in other many ways, including based on time, player characteristics, and/or fixed amounts. FIG. 17 is an illustration of an example of graphical user interface for Rating Manager module which allows a user (E.G., Pit Boss, Floor Manager) to enter a wager amount made by a player. In particular, the graphical user interface allows a player to be selected by selecting a table and seat at which the player is seated. Note that a similar interface may be used in other functions to indicate (by a seat at a table) a player. The graphical user interface also allows a wager of this player to be entered and thereby recorded by the system. Note that a similar interface may be used in other functions to enter wager amounts. The system also may display, via this user interface, the duration of play by this player and the average bet of this player, which may be computed from data previously entered, such as prior wagers and when the player checked-in to begin play for this game. FIG. 85 is an illustration of a graphical user interface which shows Rating Manager displays on PDAs (e.g., a PDA operated by a Pit Boss or Floor Manager). The left display shows a graphical user interface which allows a table and seat to be selected by the user of the graphical user interface. In the right display shows a graphical user interface which allows a wager for the player at this seat to be entered. This display also provides the user with information regarding this player, such as the table and seat of the player, the game played by this player, the player identifier, the duration of play of this player, and the average bet of this player. Such data can be calculated from data previously entered.

Rating Manager functionality is implemented by the software described in the following source code files, filed herewith and incorporated in this application by reference.

RatingChipPanel.java
RatingCurrencyJButton.java RatingGamePanel.java
RatingJPanel.java
RatingManagerConsole.java RatingPanel.java
RatingPlayerinfoJPanel.java RatingPlayerPanel.java
RatingSeatButton.java
RatingSeatsJPaneljava
RatingSummaryPanel.java  RatingTableButton.java
RatingTablesJPanel.java "Current Wager"

Records a wager amount of a player at a table game. This function is typically activated (e.g., by a Pit Boss or Floor Person via a PDA) during the game immediately after the player makes a wager. This function is also typically activated to record several wager amounts of the player.

"Average Wager"

Calculate the average wager of a player by averaging the accumulated wagers previously recorded during this player's active session (e.g., this game, this type of game, this tournament, this day at the casino).

"Away Status Button"

Indicate and record when a player is/is not absent from an active game session (e.g., the player has momentarily left the table, the player ha paused play for some reason). A toggle button may be used to easily toggle a player's "away status", and thereby record whether the player is actively playing at any time. As described in this application, the system may use play duration and/or "player away" duration to calculate compensation points.

"Chip Count"

Record the amount of chips that a player brings to the table or leaves the table with. As described in this application, by tracking the chip count, the system can ascertain, in real-time, the chip count for a table.

"Player Session Duration"

A feature that allows the system and users to track the play duration of a player at gaming tables.

"Player Seat Tracking"

A method that tracks the seat assignments and changes made by a player during their active session at a gaming table.

"Chips In", "Chips Out"

Record the amount of chips that a player brings to a gaming table/the amount of chips that are relinquished by a table to a player. Specifically, the system records player and table transactions for a game. Upon the opening or closing of a game, the Pit Boss and Dealer can perform a Table Inventory. This inventory can be entered into the system, allowing the gaming establishment to record the table inventory is upon open and close. Also, when players enter a game, they can receive chips from the table in exchange for cash. The Pit Boss (or another user) can enters this "buy-in" amount into the system (e.g., via an interface that allows a player to be selected and a chip amount to be entered).

This data entry, which indicates a number of chips the player starts/ends a game with, is then saved and processed by the system to update player and table inventory data in the database. By providing the ability to register the amount of chips that come in and out of a table, the system can accurately determine the table's win/loss amount.

"Total In"

Records the amount of markers and cash that a player uses at a specific gaming table.

"Total Out"

Record the amount of chips that a player takes from the gaming table during an active session.

"Wager Notification"

Allow users to notify certain personnel of possibly fraudulent waging practices. For example, since the recorded player bet may be tracked, a significant deviation from the player's recorded wager amounts (e.g. over a time period such as one day, over all recorded bets of the player) may be noted and communicated to the proper entities. Similarly, if not enough samples of a player's wager amounts have been recorded, this may indicate a problem with the person responsible for recording the bets (e.g. possible collusion with that player, because that person has not recorded the player's lower wager amounts).

In ascertaining a deviation amount by which at least one of the wager amounts deviates from other wager amounts, many known methods may be used, such as the absolute value of the difference between the one wager amount and the average of the remaining wager amounts, or the percentage difference between the one wager amount and the average of the remaining wager amounts. Various types of thresholds may be established, as desired, to indicate when a deviation is to be considered significant enough to warrant notification.

Such notifications may include a message sent to predefined personnel (e.g., Floor Manager, Pitt Boss) and/or a message which is stored or record (for future reading by others, for future auditing).

"Calculate Rating"

The system can ascertain the elapsed time between when the player starts playing and when the player ends playing (e.g., by subtracting the stop time from the start time, minus any duration(s) of "player away"). Based on the elapsed time the system can calculate a player rating in any of a number of ways the casino desires. A player's rating may possibly but not necessarily include an amount of additional compensation points earned by the player for his play.

An example of a rating, specifically a poker rating, performed by Rating Manager is provided below:

Ratings level (which may indicate compensation points or other benefits to the player) in poker games may be based on wager amounts of the game, or the type of game at the table.

For example, the player may be awarded compensation points (valued at certain dollar amounts) based on the duration of play and the table "stakes" or wagers of the player, such as:

Level 1—Stakes under $20 earn $1.00/per hour
Level 2—Stakes over $20 and under $60 earn $1.50/per hour
Level 3—Stakes over $60 earn $2.00/per hour Such rating levels are of course stored in the database, and can be changed by administrators to implement various compensation schemes.

A player may be awarded compensation points based on the following information recorded by the system:

| Player Name | Play Start Time | Play End Time | Level |
|---|---|---|---|
| Player A | 10:00AM | 12:00PM | 2 |

Thus, the system calculates the compensation points (in dollars) for this player by the following equation:

Rating per session=2(hours of play)×1.50(hourly rating amount for a level 2 player)=$3.00

Note that the system itself may calculate an amount of compensation points for the player based on the elapsed time. Alternatively or additionally, the system may simply transmit the elapsed time to a compensation system (in an embodiment where the casino has an existing compensation system which cooperates with the present system).

Player Manager:

Player Manager permits a player to be registered for a specific game (e.g., at a table). By registering the player, the system can accurately calculate seating and game capacity as well as track player activities. Using a security mechanism, the system tracks a player's registration across the entire gaming establishment. The player registration is recorded via a player identification card (e.g., encoded with a magnetic strip storing a player identifier) that is swiped thru a card reader (e.g., operable to transmit a signal, from cards that are read, to a desktop computer or PDA). The player may be identified from such a signal by translating the signal to a corresponding player identifier read from the card, and looking up that identifier in a database of player information.

Figure 18:
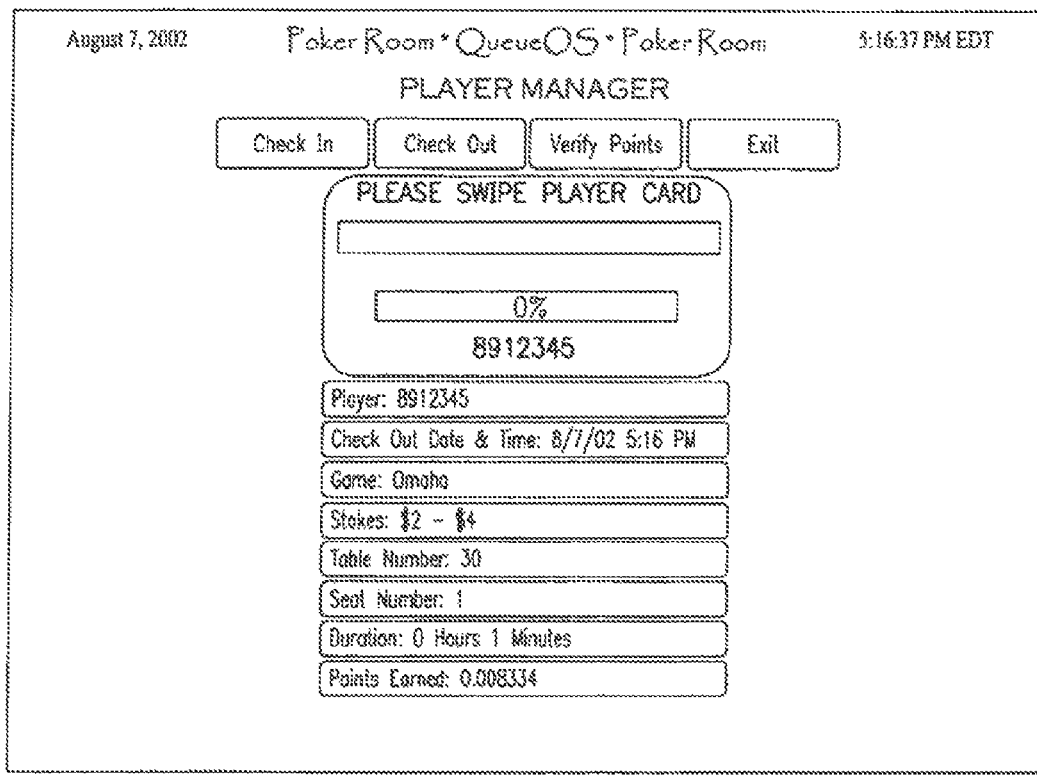
FIG. 18 is an illustration of an example of graphical user interface for Player Manager module.

Players may check in themselves (e.g. by swiping their own player tracking card) or may be checked in by another (e.g. by a casino employee that swipes the player's card). Players that check themselves out may be prompted to enter other data (e.g. via a nearby keyboard). For example, players may be prompted to enter their email addresses so that they may receive an email receipt. This would facilitate the collection of email addresses of such players. FIG. 18 is an illustration of an example of graphical user interface for Player Manager module. This interface allows a player to be identified (by swiping a player tracking card). This interface also allows the identified player to be checked into or out of a game and the compensation points of the player to be verified. In addition, the interface may display player information, such as the player identifier, when the player was checked out of a game, the game the player was checked out of, and other game related information.

Figure 86:
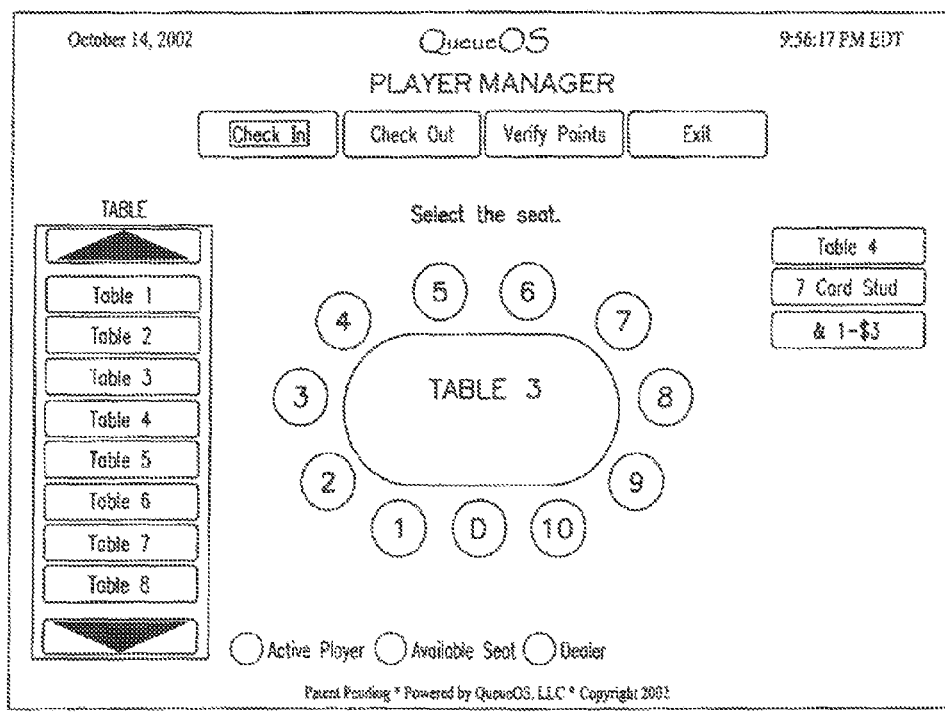
FIG. 86 is an illustration of a graphical user interface, showing the Player Manager Expert View screen.

FIG. 86 is an illustration of a graphical user interface, showing the Player Manager Expert View display. This interface allows a player to be checked into or checked out of a particulars seat at a particular table. This interface also displays information about the table and seats at that table, such as whether the seats are available for additional players or not.

Player Manager functionality is implemented by the software described in the following source code files, filed herewith and incorporated in this application by reference.

PlayerBasicSearch.java
PlayerCard.java
PlayerCashPanel.java
PlayerChipPanel.java
PlayerGameButton.java
PlayerGamePanel.java
PlayerHistoryView.java
PlayerManagerConsole.java
PlayerPancl.java
PlayerSeatButton.java
PlayerSummaryPanel.java
PlayerTableButton.java
PlayerVerificationTickctLayout.java "Check In Player"

Register a player at a specific gaming table and seat. The system records player information and begins to record play duration and play characteristic, that are used by the system to determine, e.g., compensation and player profiles. Thus, activating this function (e.g., by receiving a swipe of the player's player tracking card and/or a button press by a dealer or other personnel to indicate a seat at the table) allows the system to ascertain when a player starts playing a game at a table.

"Check Out Player"

Record the end of a player's active session and remove the player from the game at this table. The system calculates the player's session giving that player the correct amount of compensation. The system then transmits the player data to the establishments main rating system.

Thus, activating this function (e.g., by receiving a swipe of the player's player tracking card and/or a button press by a dealer or other personnel to indicate a seat at the table) allows the system to ascertain when a player stops playing a game at a table.

Figure 19:
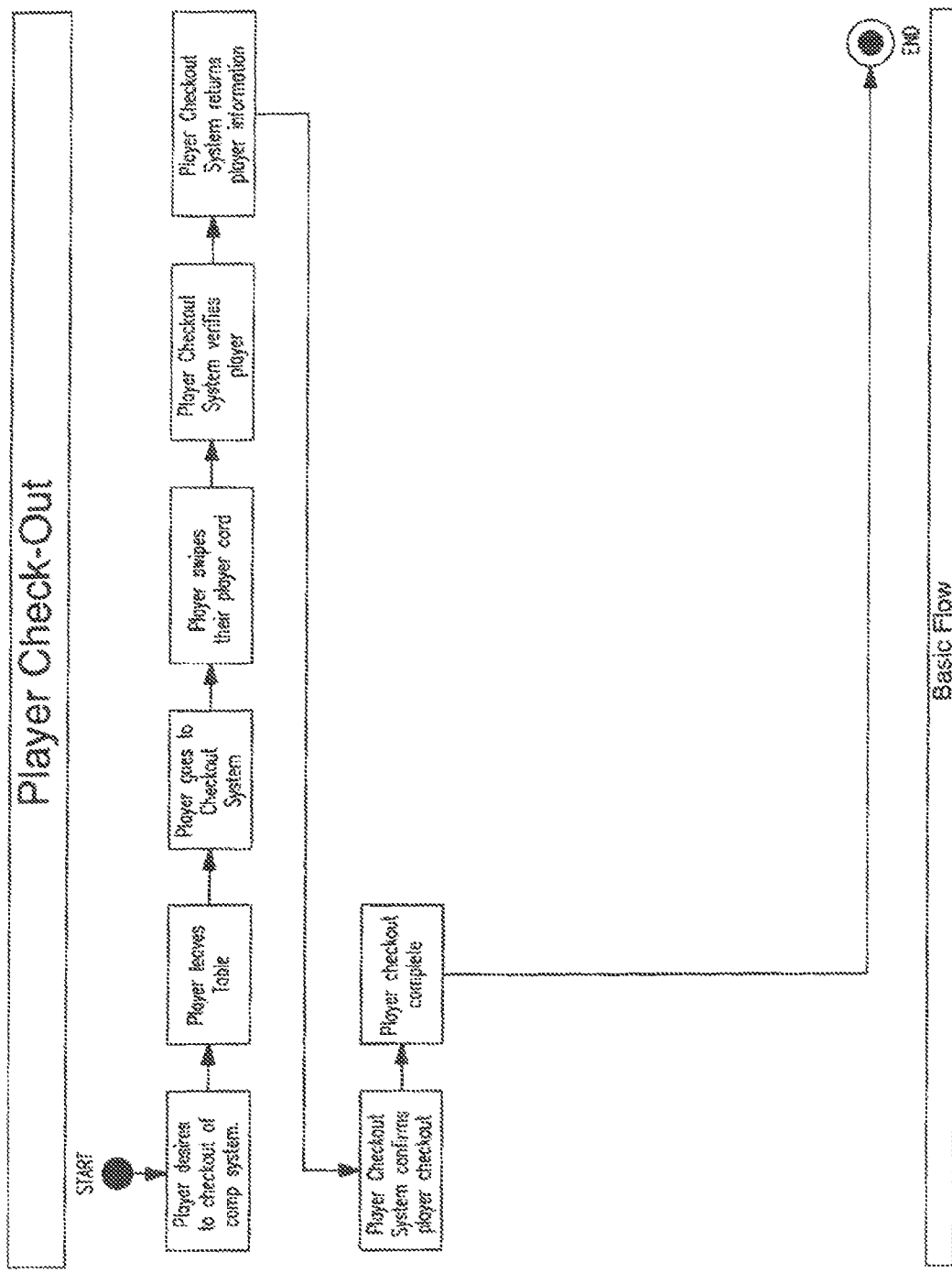
FIG. 19 is a flowchart illustrating an embodiment of a process for a Player Check Out function.
Figure 20:
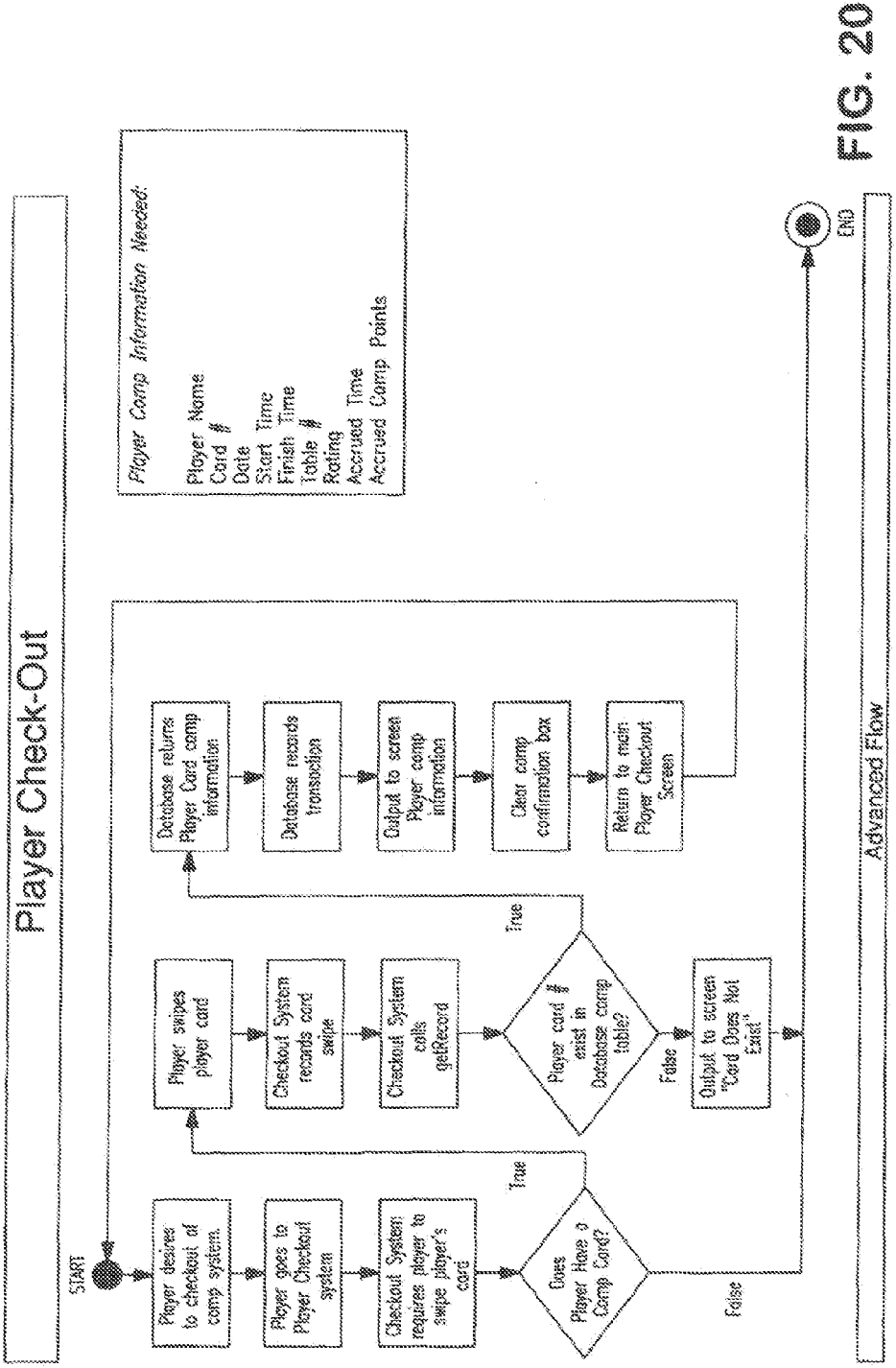
FIG. 20 is another flowchart illustrating an embodiment of a process for a Player Check Out function.
Figure 21:
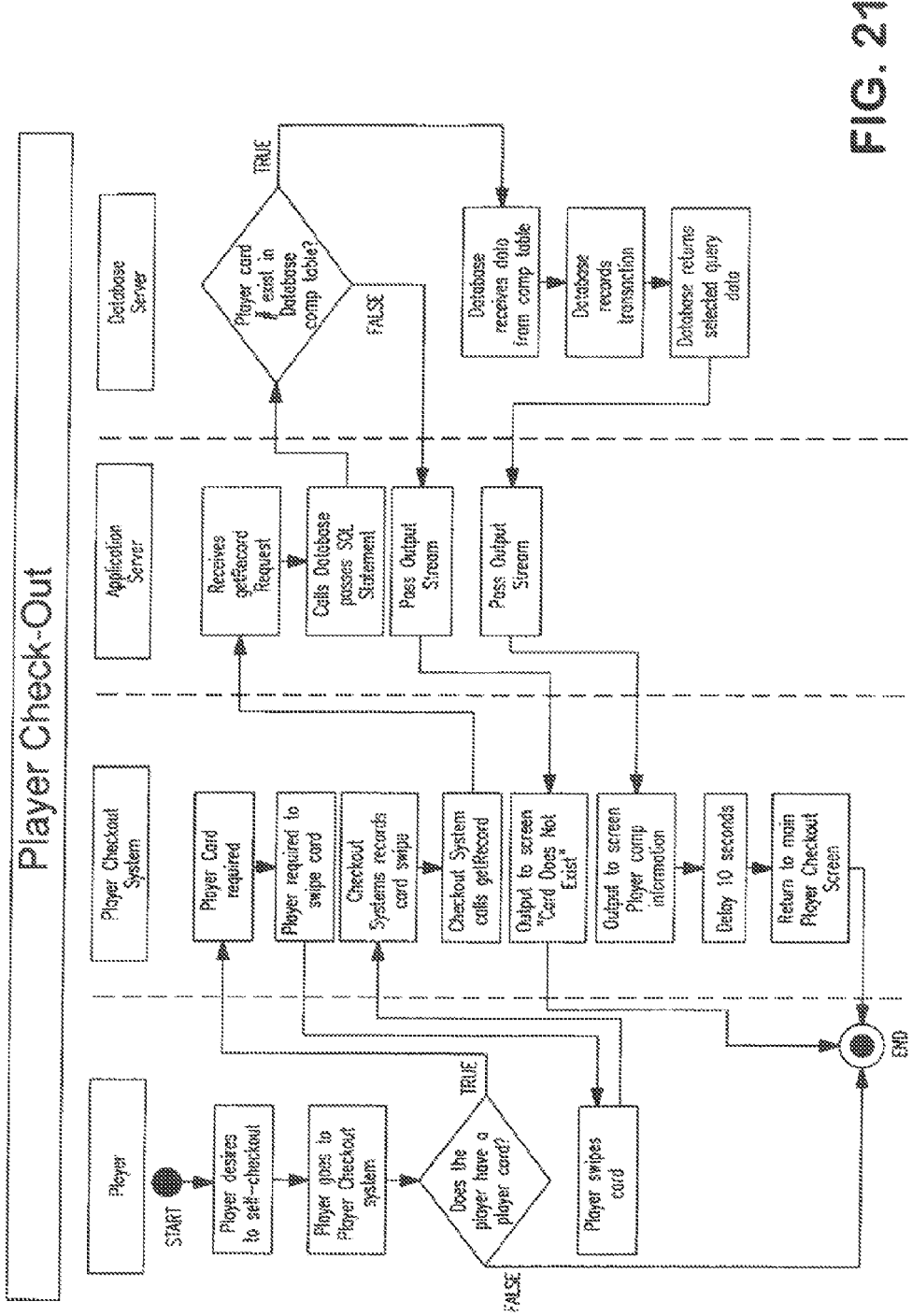
FIG. 21 is an Activity Diagram for an embodiment of a process for a Player Check Out function.

FIGS. 19-21 describe a process for a Player Check Out function.

"Verify Player Points"

Display the amount of compensation points that a player has accrued. The system queries the database and/or the establishments' main rating system database for the player's current point status. This function may be activated by the player (e.g., at a terminal with a card reader) and/or by casino personnel (e.g., a Dealer).

The data may also be sent instead of or in addition to being displayed. The player may choose to have their session or historical recordings of compensation points sent to them either via c-mail or traditional postal mail. To facilitate such sending, a player's personal information may be requested by the system.

"Player Assignment"

Binding a player to a specific gaming table and seat location for tracking, accounting, and profile purposes.

"Player Card Swipe"

Read, e.g., a magnetic stripe or barcode from a player identification card, and recorded the identifier for player tracking.

"Active Play Verification"

A security feature that ensures the establishment that a player may not be registered for multiple games at one time. The system can ascertain whether the player has attempted to register for another game (e.g., at another table).

To reduced fraudulent practices of undue compensation points awarded to the player, the player may only be registered at an active gaming table where there are seat locations available for play, and the player may only be registered for one game at a time. If the system detects that the player is attempting to register at another game, the system will automatically close out the previous game the player had checked into before starting a new session at the other game.

"Player Statistics Display"

Display player profiles and historical characteristics.

"Forbidden Player Notification"

A security method that restricts players who have a "banned" status from registering and playing at a gaming table by way of a system notification directed to the pit personnel, administrators, and security division.

"Print Player Check-In & Check-Out Tickets"

Figure 22:
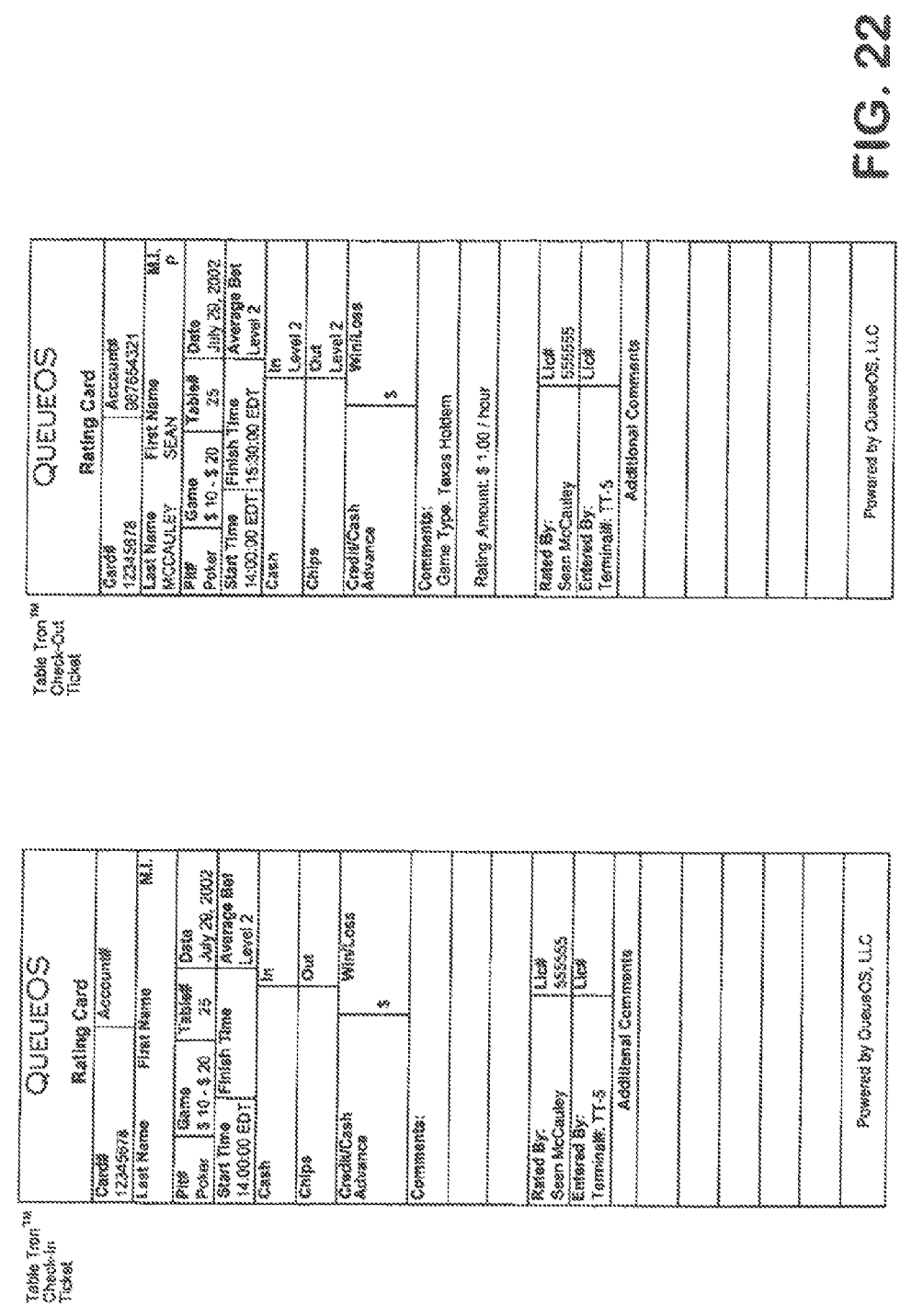

Print, on a ticket, information about the game. Establishments may desire to have a hard copy of their players' ratings. The printing of player tickets is controlled by the program's main processing engine. The printed tickets can include establishments customized data show the session playing time and compensation rating for each player. FIG. 22 shows examples of such tickets Game Manager:

Game Manager allows certain personnel to open, close, modify, and view games. Game Manager interacts with the database and clients to ensure real-time updates and monitoring of games. Game Manager interacts with other modules such as List Manager without requiring user intervention. Game Manager of course supports both stationary and mobile electronic input devices.

Figure 23:
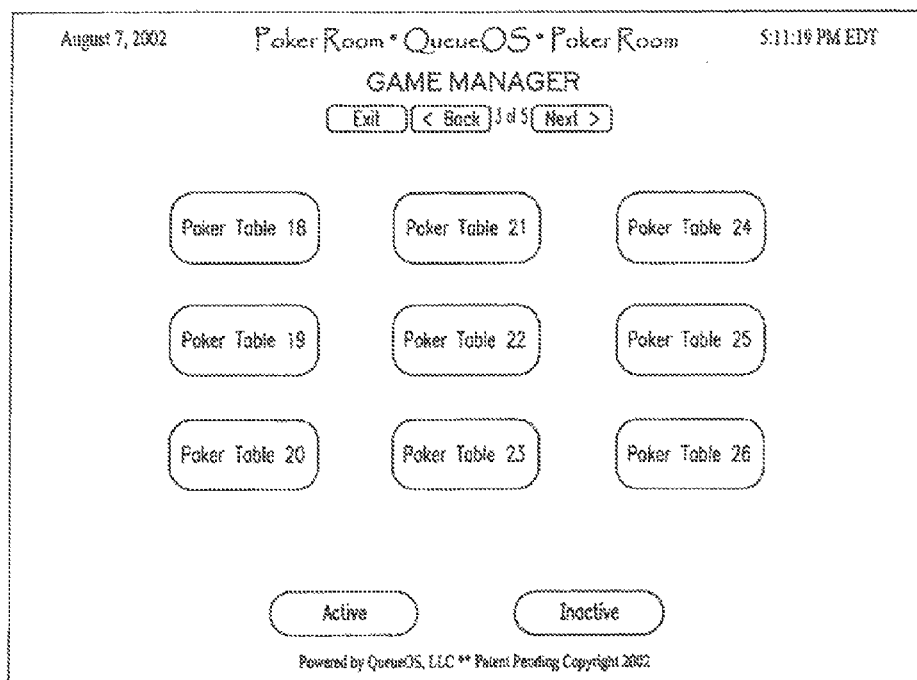
FIG. 23 is an illustration of an example of graphical user interface for Game Manager module.

FIG. 23 is an illustration of an example of graphical user interface for Game Manager. In particular, this interface allows various poker tables to be designated as active or inactive.

Figure 24:
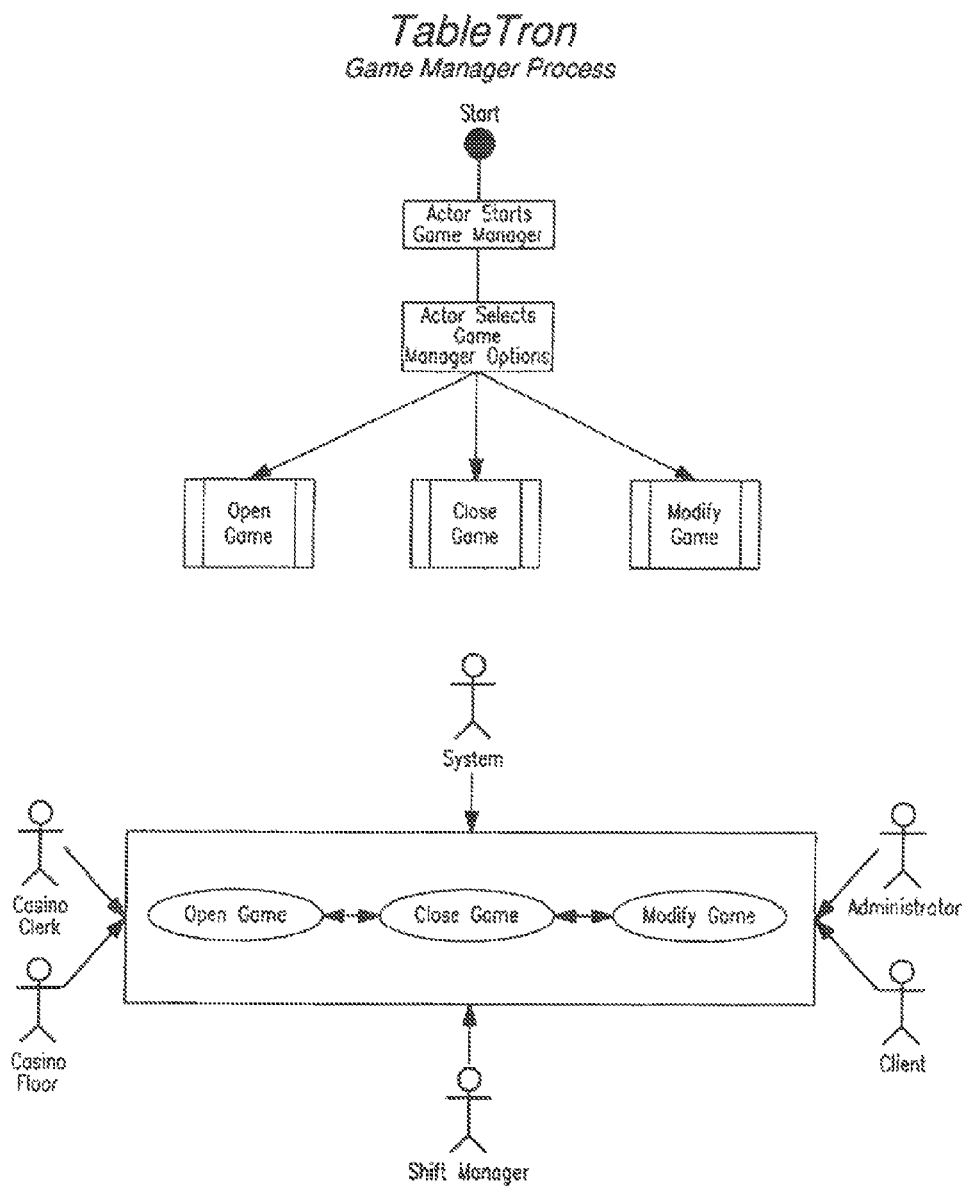
FIG. 24 is a flowchart illustrating an overview of an embodiment for Game Manager.

FIG. 24 is a flowchart illustrating of an overview of an embodiment for Game Manager.

In particular, the flowchart describes a process by which an actor may start Game Manager and invoke various Game Manager functions.

"Open Game"

Figure 25:
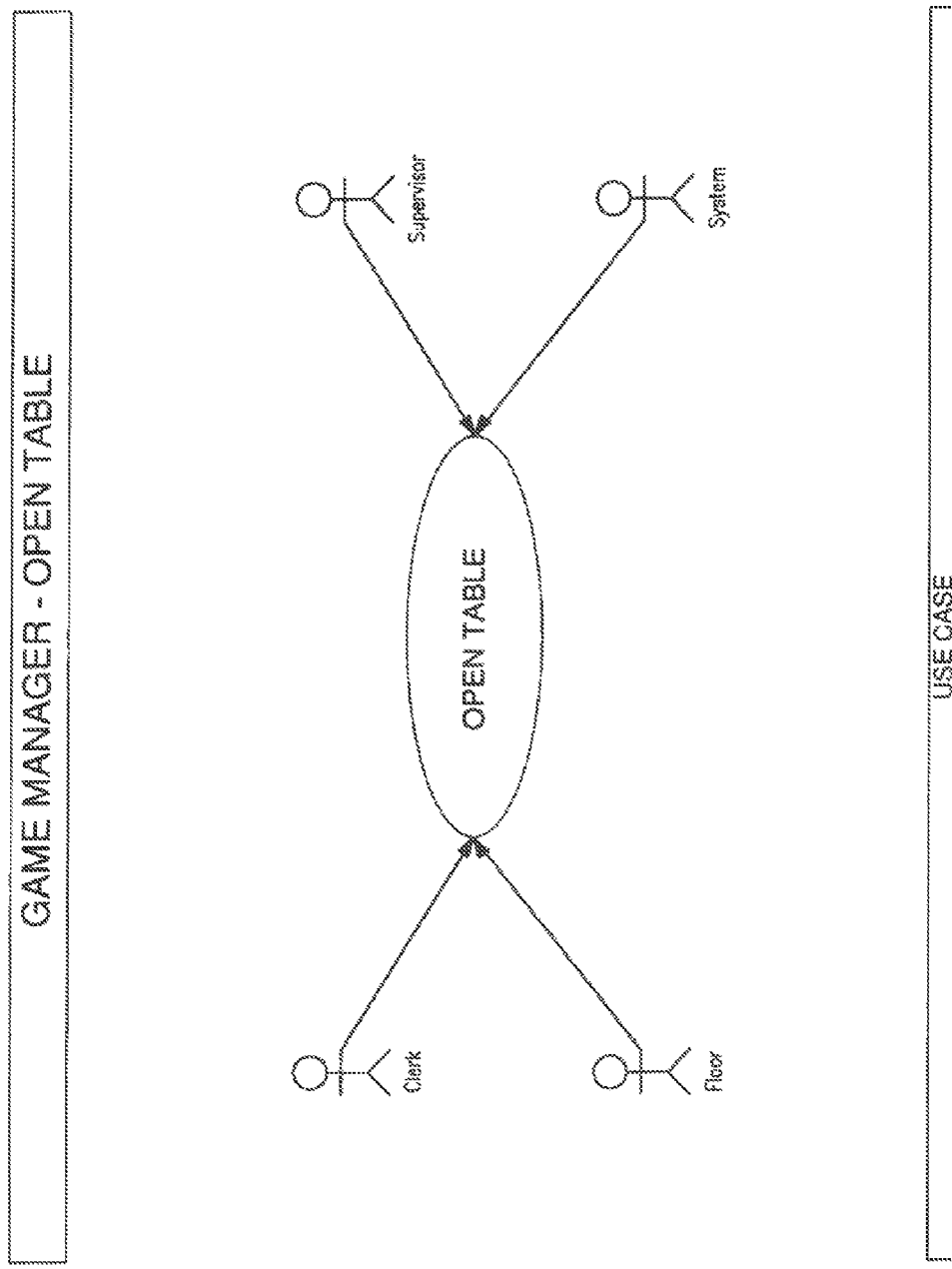
FIG. 25 is a Use Case Diagram of an Open Table operation.
Figure 26:
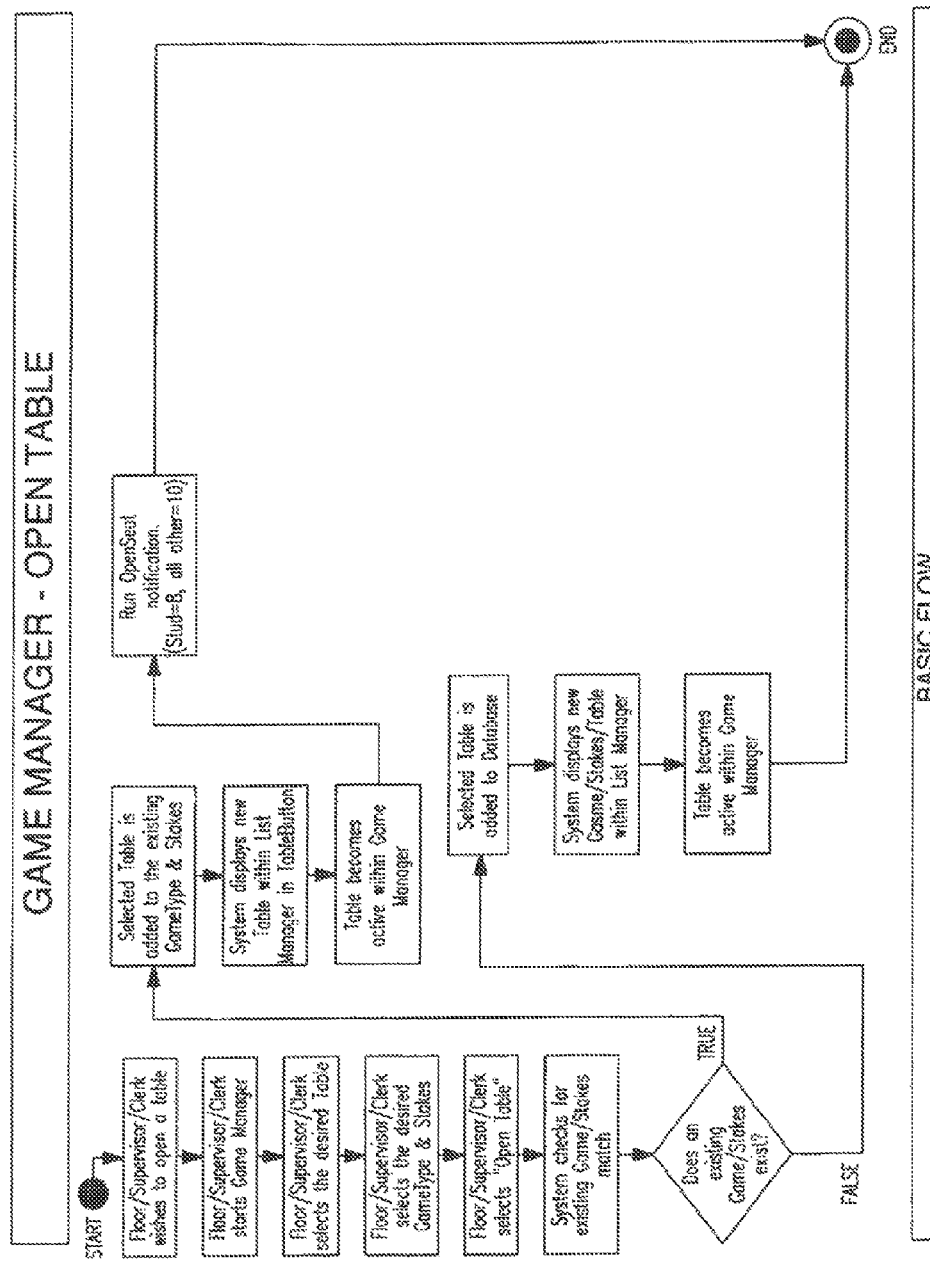
FIG. 26 is a flowchart illustrating an embodiment of a process for an Open Table operation.
Figure 27:
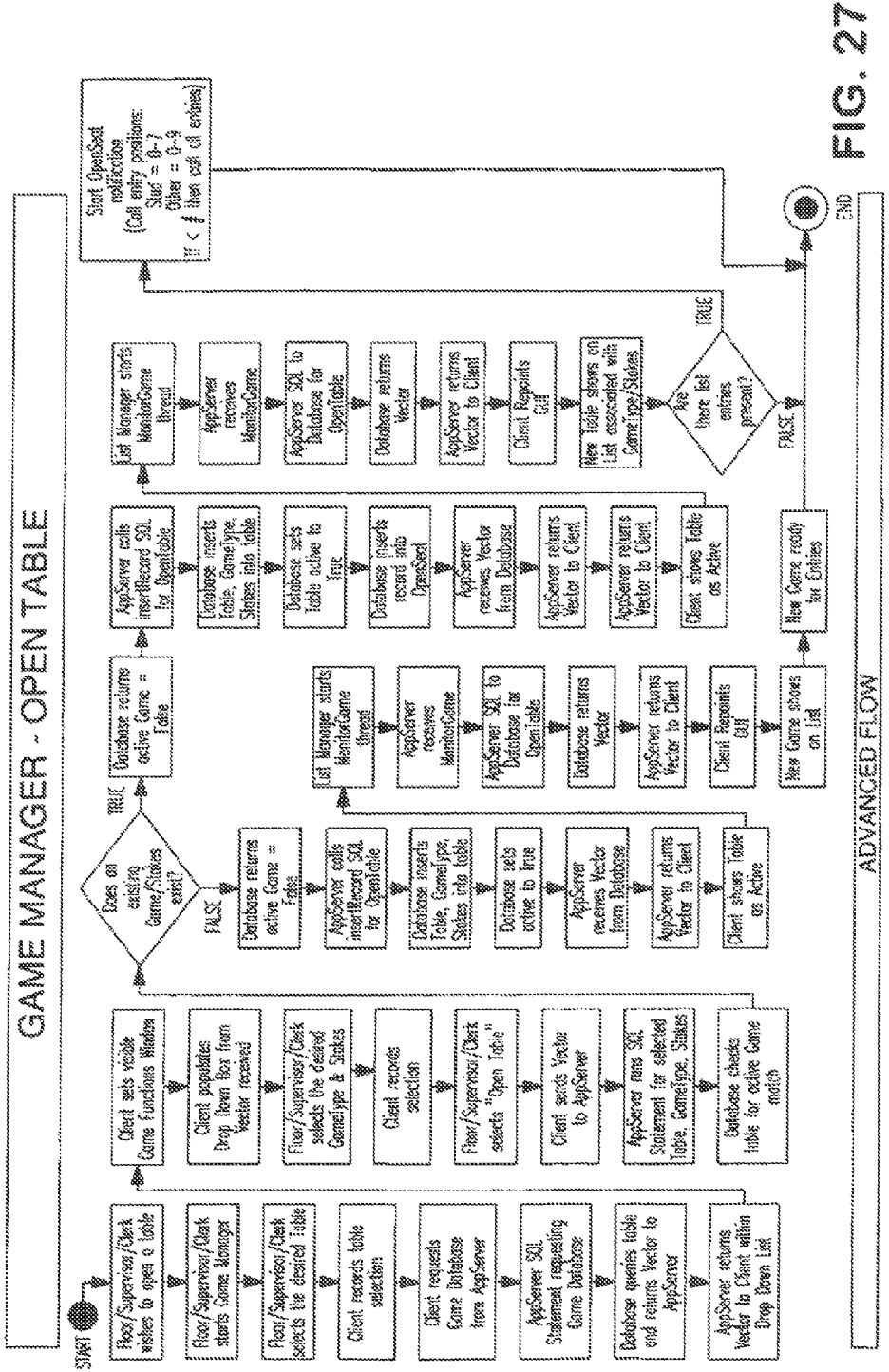
FIG. 27 is another flowchart illustrating an embodiment of a process for an Open Table operation.
Figure 28:
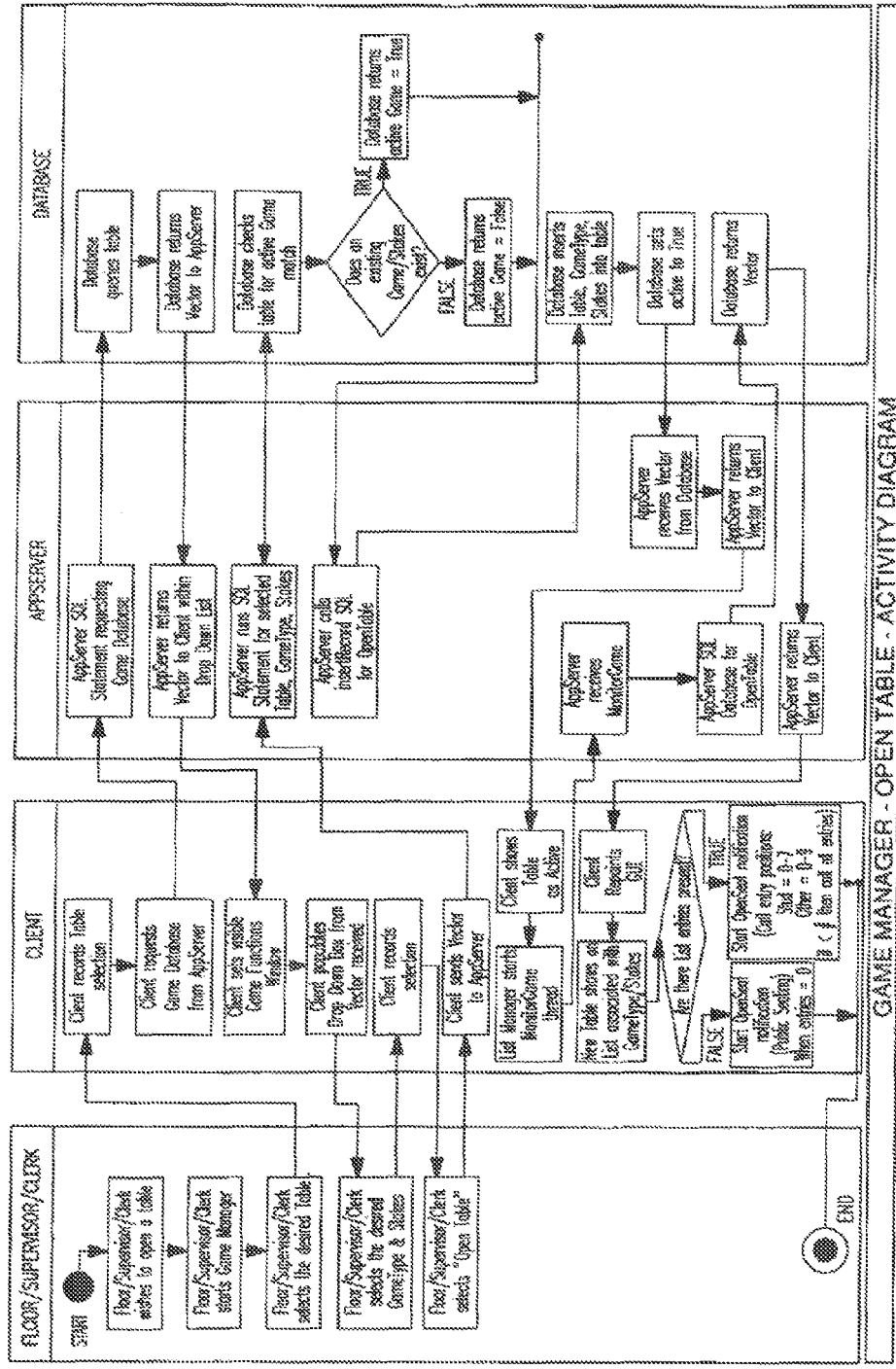
FIG. 28 is an Activity Diagram for an embodiment of a process for an Open Table operation.

Open a new game on a specified table and give the table an "active" status. FIG. 25 describes how various actors may interact with the Open Game (or "Open Table") function. FIGS. 26-28 describe in detail the "Open Game" function.

"Modify Game"

Modify the current game on the specified table.

"Close Game"

Figure 29:
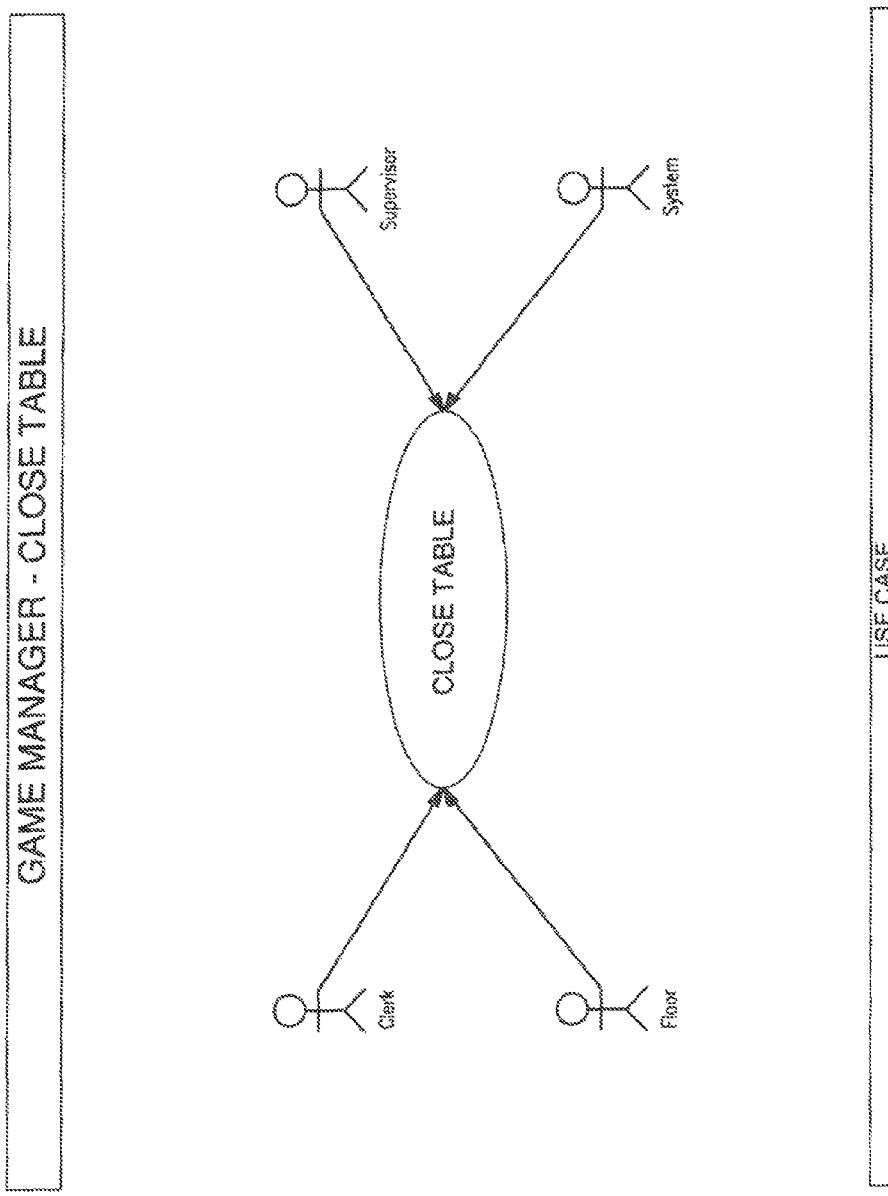
FIG. 29 is a Use Case Diagram of a Close Table operation.
Figure 30:
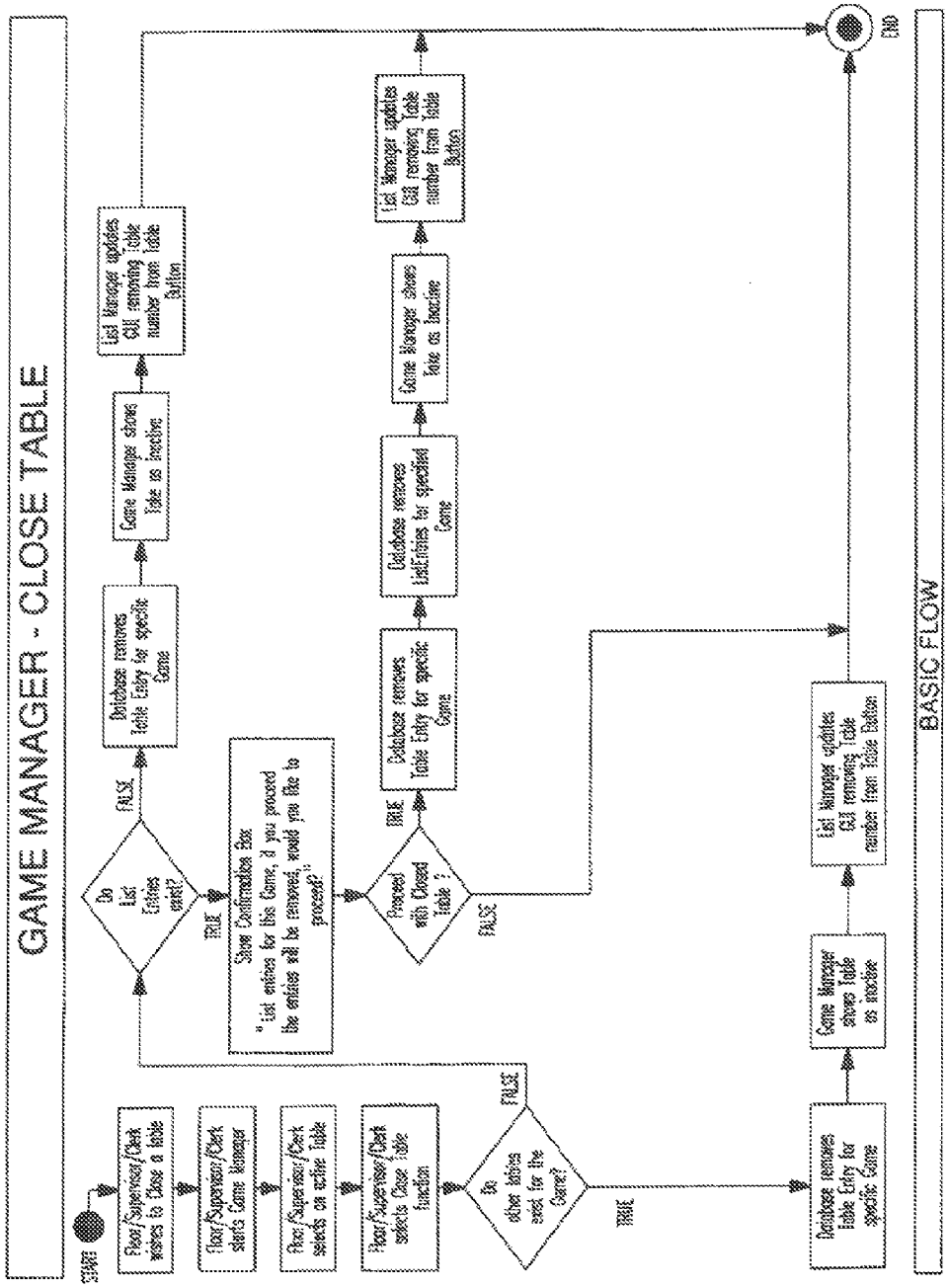
FIG. 30 is a flowchart illustrating an embodiment of a process for a Close Table operation.
Figure 31:
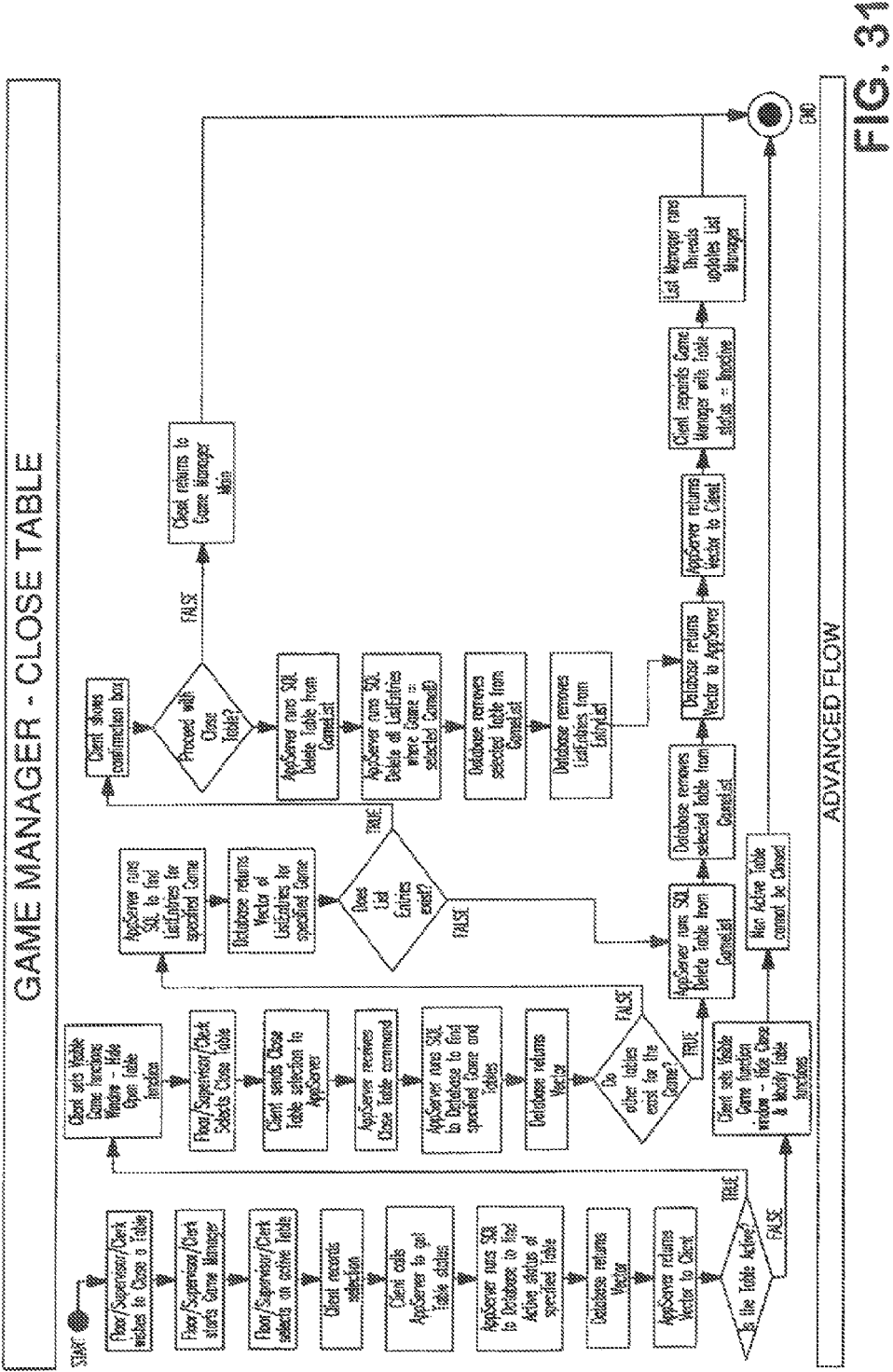
FIG. 31 is another flowchart illustrating an embodiment of a process for a Close Table operation.
Figure 32:
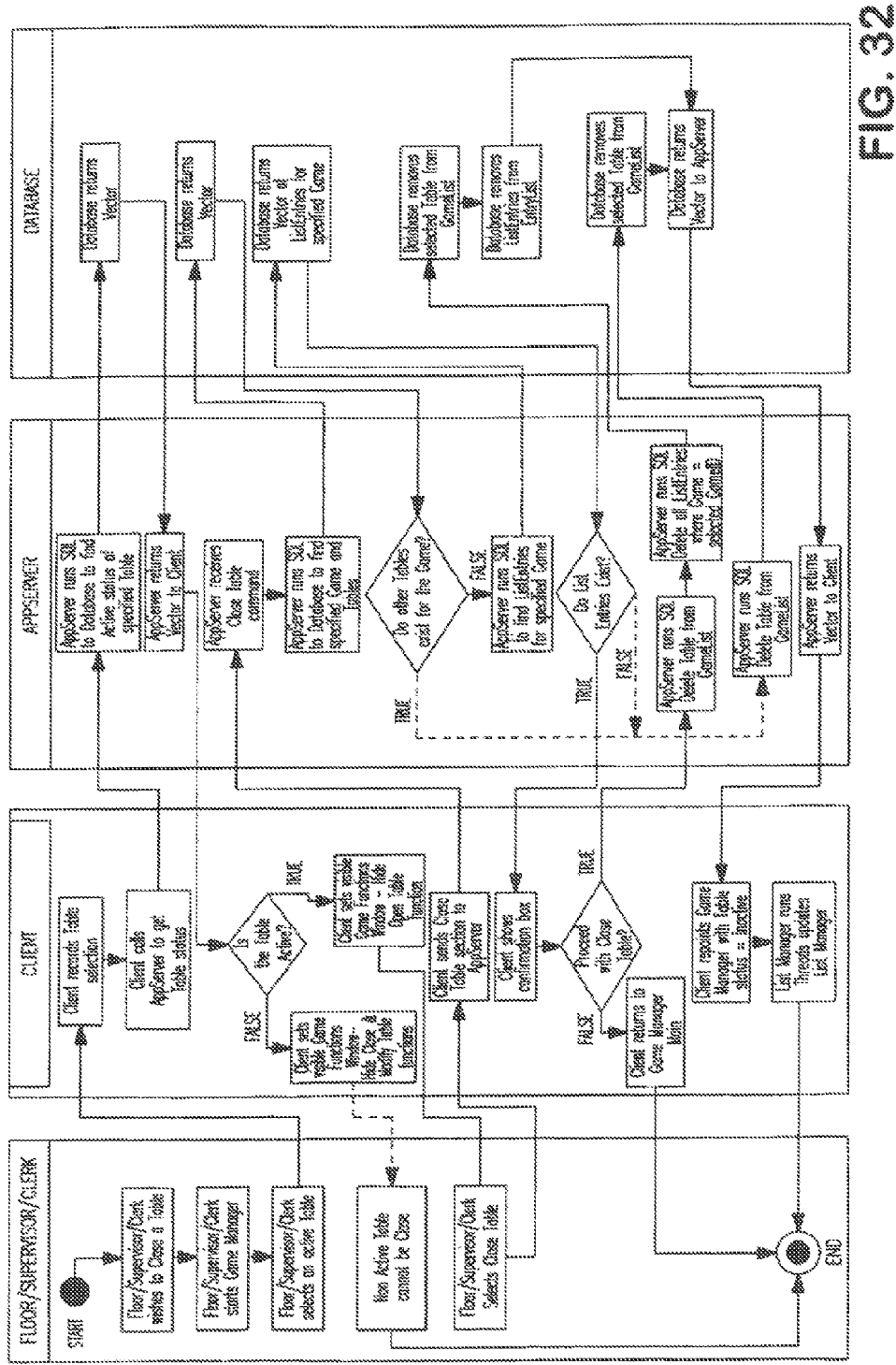
FIG. 32 is an Activity Diagram for an embodiment of a process for a Close Table operation.

Close the current game on the specified table and give the table an "inactive" status. FIG. 29 describes how various actors may interact with the Close Game (or "Close Table") function. FIGS. 30-32 describe in detail the "Close Game" function.

"Must Move Game"

Protect a main game by backfilling players from temporary tables to the main table as seat becomes available. The system automatically handles all instructions to floor and pit personnel about which players to move and to which seats the players be moved to. The system handles player moves by establishing table relationships and recording the order in which players have seniority to play at the main table.

"Active Game Display"

A display showing the active tables and associated games within a pit or specialized gaming room.

"Inactive Game Display"

A display showing the inactive tables within a pit or specialized gaming room giving personnel real-time analysis of table capacity.

"Active Seating Display"

A method that displays real-time seating capacity.

"Inactive Seating Display"

A method that displays real-time seating capacity.

"Seating Capacity"

Displays real-time seating capacity. The system calculates the number of active tables and active seats and compares the values to the predetermined values of maximum table and seat capacity.

"Active Dealer Display"

A feature that displays the current active dealer servicing the game at a particular table.

"Automapper"

Uses a geographical layout of the casino and instruct players or patrons on the "best route" to the gaming table of their choice. This function affects the workings of List Manager by notifying a player of the geographic location of the table where an available seat resides.

"Player—Game Tracking"

Coordinates with other modules to calculate the play rate of a dealer. For example, since a dealer checks into and out the system during his shift at various tables, he may be readily identified when he begins and ends play at a given gaming table. Thus, that dealer's rate of play (e.g. games played per some unit of time) may be readily determined. This in turn may be used to calculate an expected "take rate" for the casino, since the expected take rate per game may be determined for specific games.

List Manager:

List Manager maintains a list or queue of various information. List Manager includes a suite of tools for automating the queuing process. These tools include: Add, Modify, Delete, Phone-In, Activate, Open Seat, Lockup, Rollover, Insert, Public Seat, and Multiple. Using these combined tools allows certain personnel to automate the manual processes. List Manager also uses voice recognition, text-to-speech algorithms, and intelligent queue notification to alert patrons of various availabilities. Sun's Java™ telephony API module may be used to implement text-to-speech appropriately.

List Manager interacts with the database and all clients to ensure real-time updates and monitoring. List Manager of course supports both stationary and mobile electronic input devices.

Figure 33:
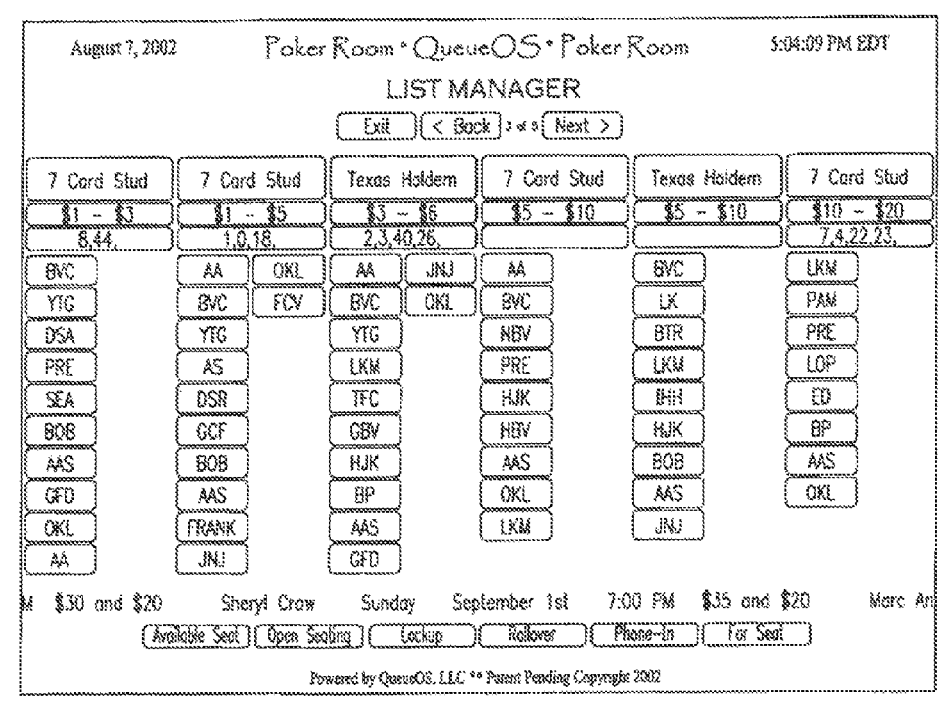

FIG. 33 is a graphical user interface that displays, for various games at various tables, the players that are registered for those games. Whether the player is registered or waiting to be registered for the game may be indicated by, for example, a different shading or color of the initials of the player indicated.

Figure 34:
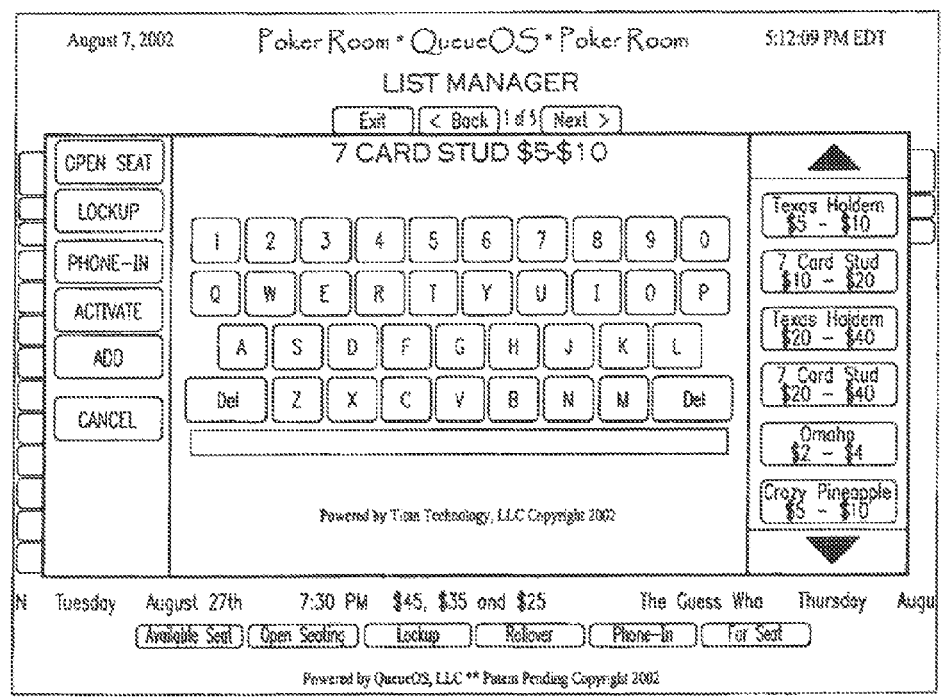
FIG. 34 is an illustration of an example of graphical user interface for the virtual keyboard operation.

FIG. 34 is a graphical user interface showing a virtual keyboard, which allows data such as players' initials to be entered in conjunction with a particular game at a particular table.

Figure 35:
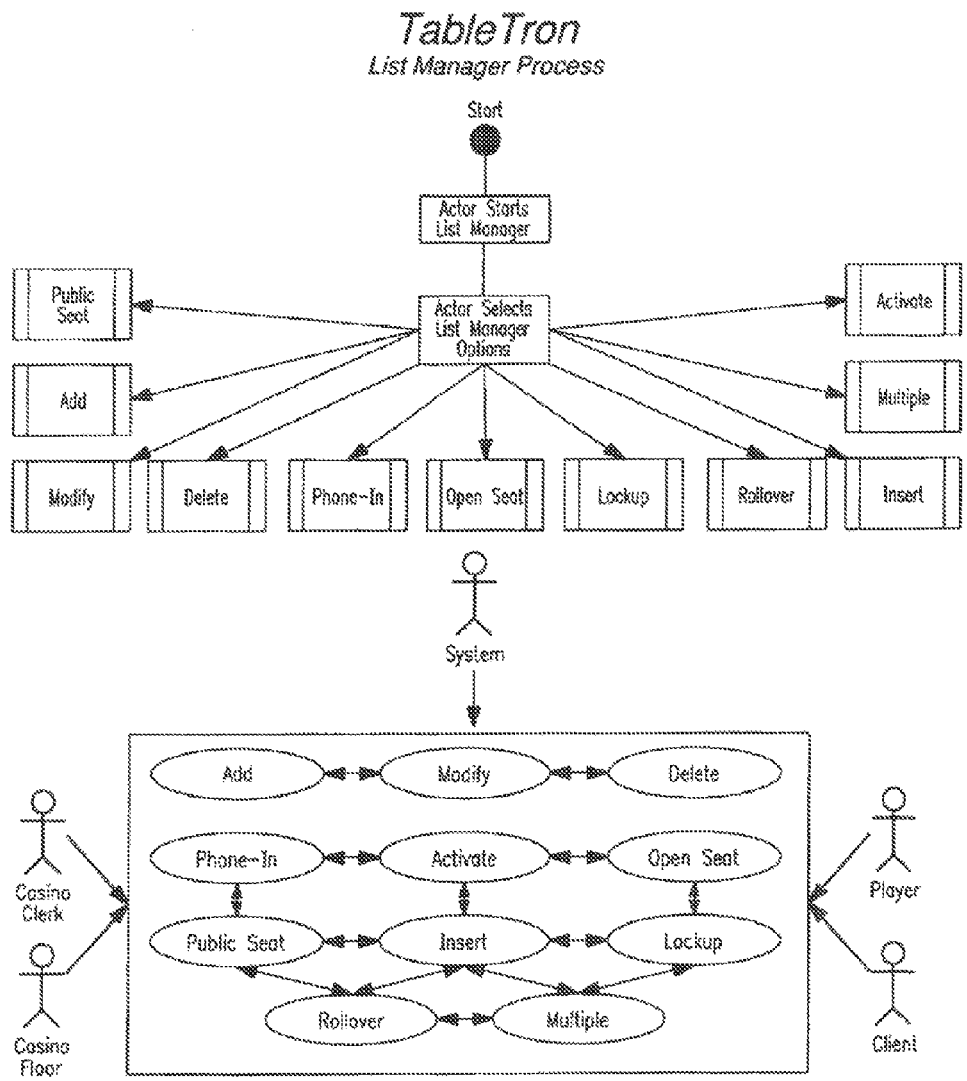
FIG. 35 is a flowchart illustrating an overview of an embodiment for List Manager.

FIG. 35 is a flowchart illustrating an overview of an embodiment for List Manager. In particular, the flowchart illustrates that an actor may start List Manager and invoke various functions of List Manager.

"Add"

Figure 36:
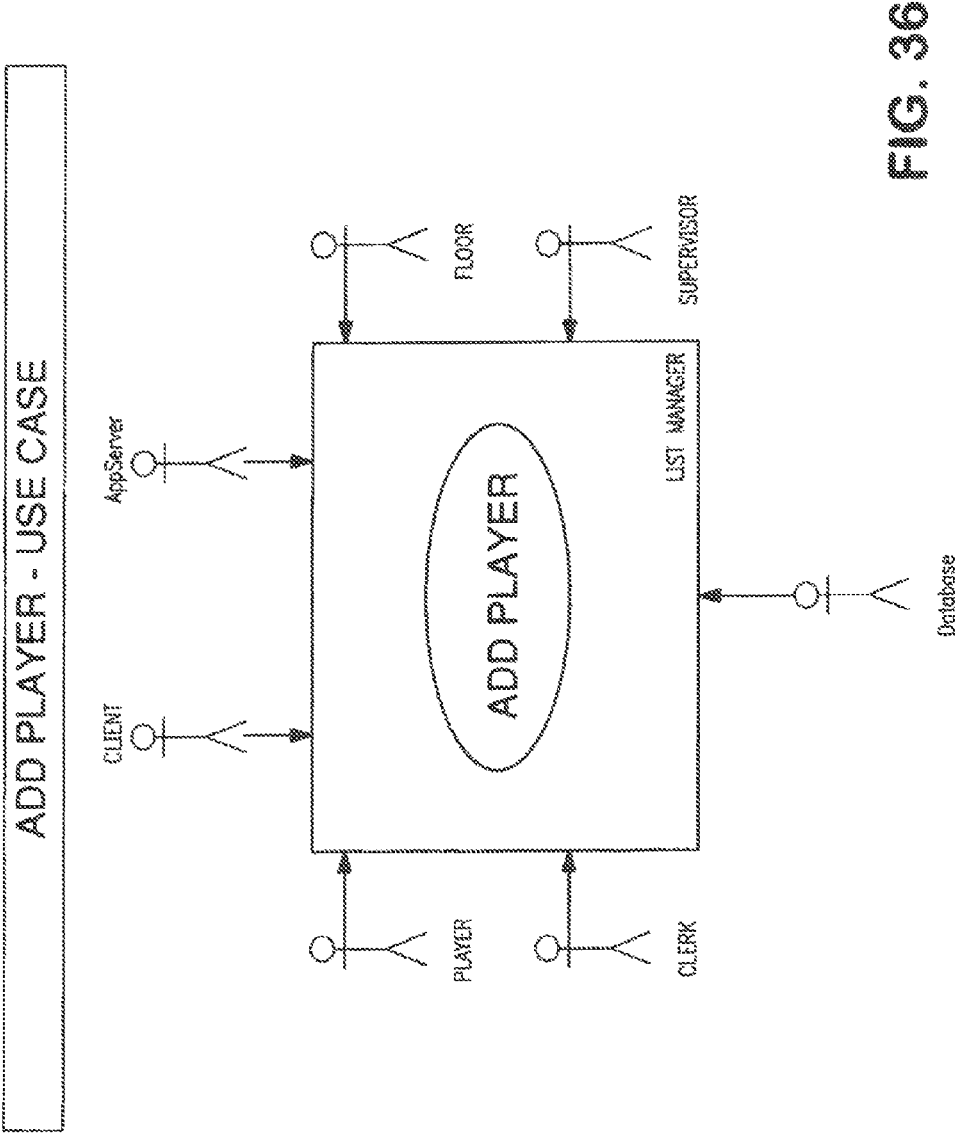
FIG. 36 is a Use Case Diagram of an Add Player operation.
Figure 37:
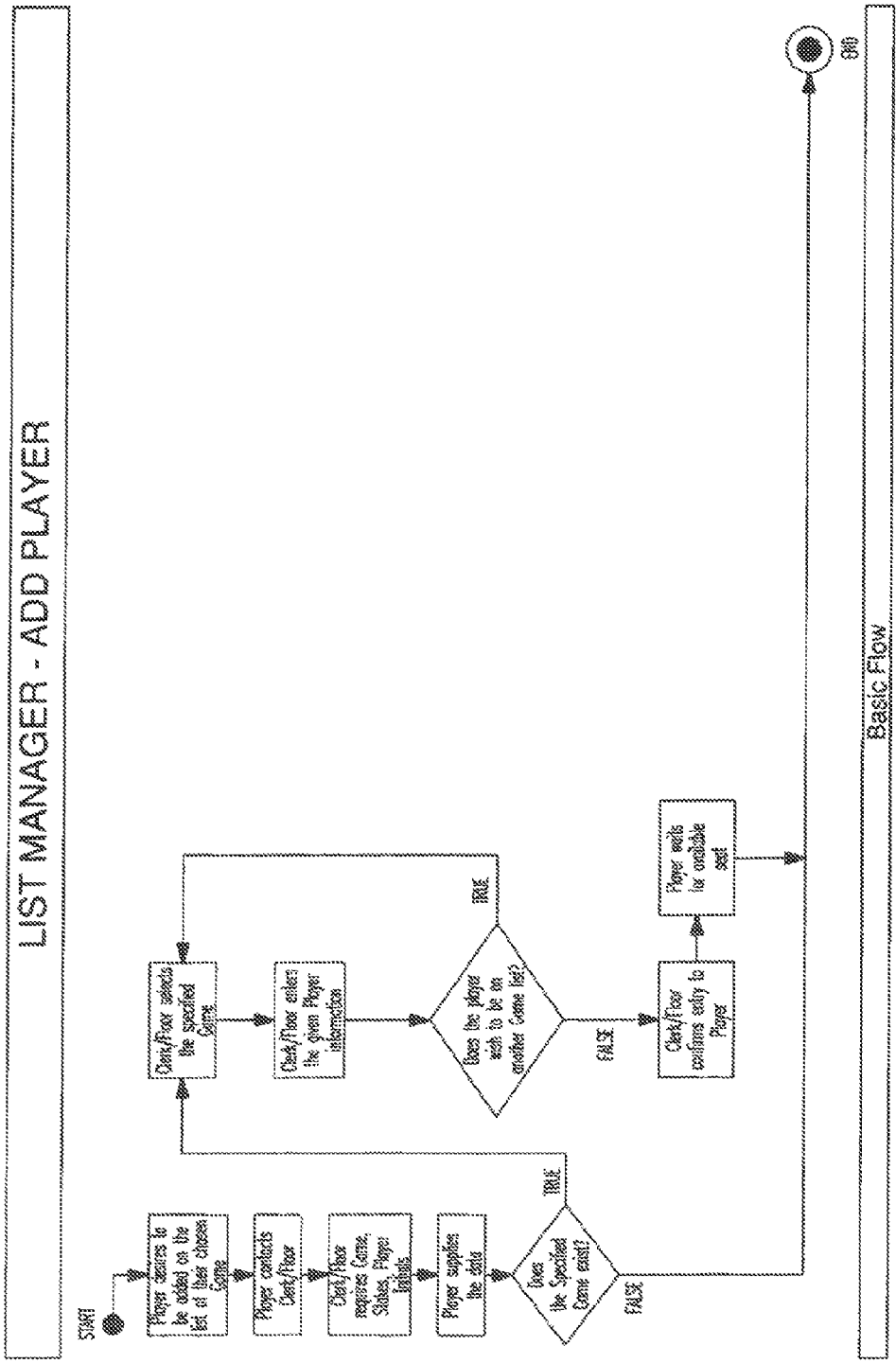
FIG. 37 is a flowchart illustrating an embodiment of a process for an Add Player operation.
Figure 38:
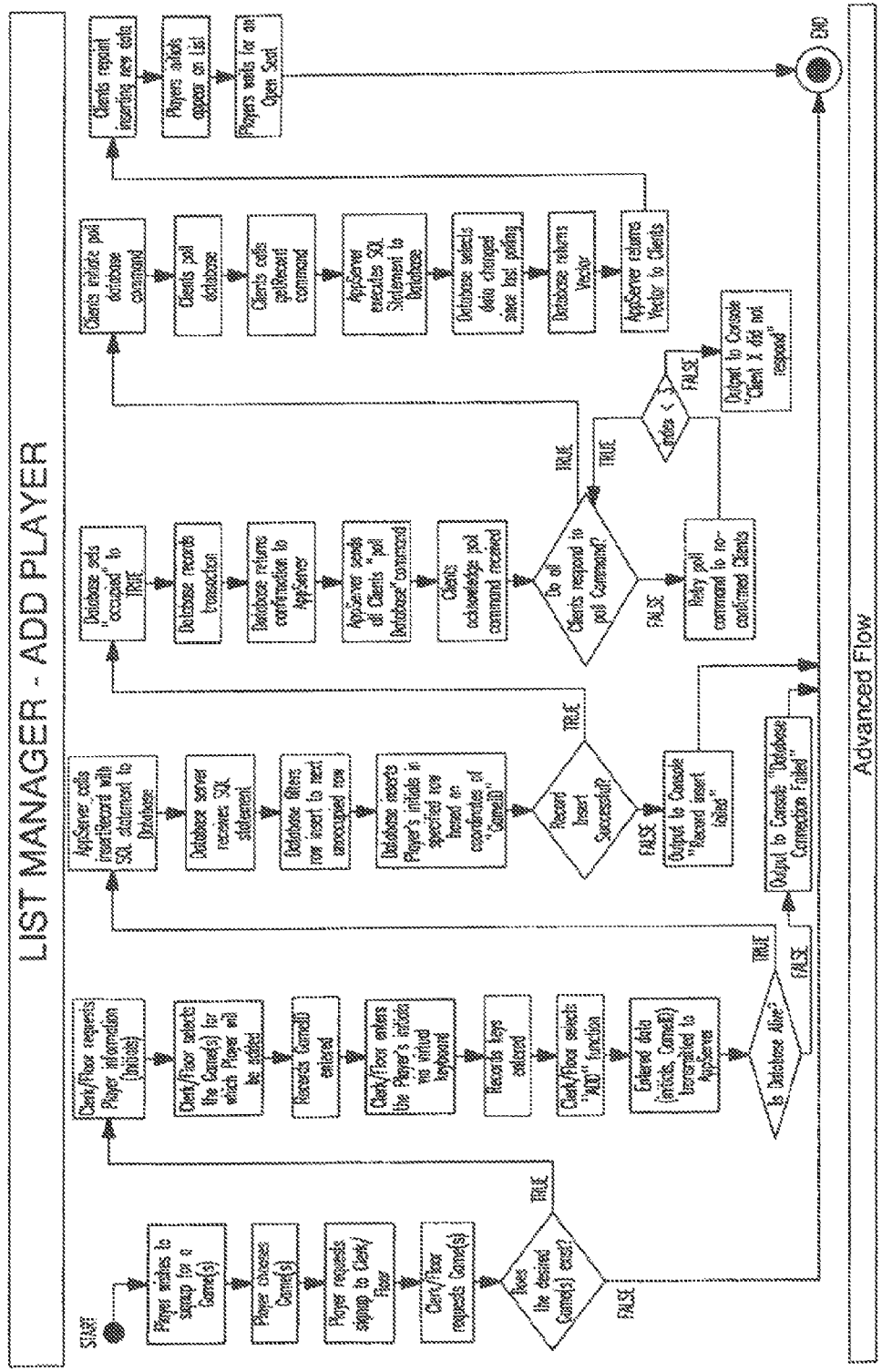
FIG. 38 is another flowchart illustrating an embodiment of a process for an Add Player operation.
Figure 39:
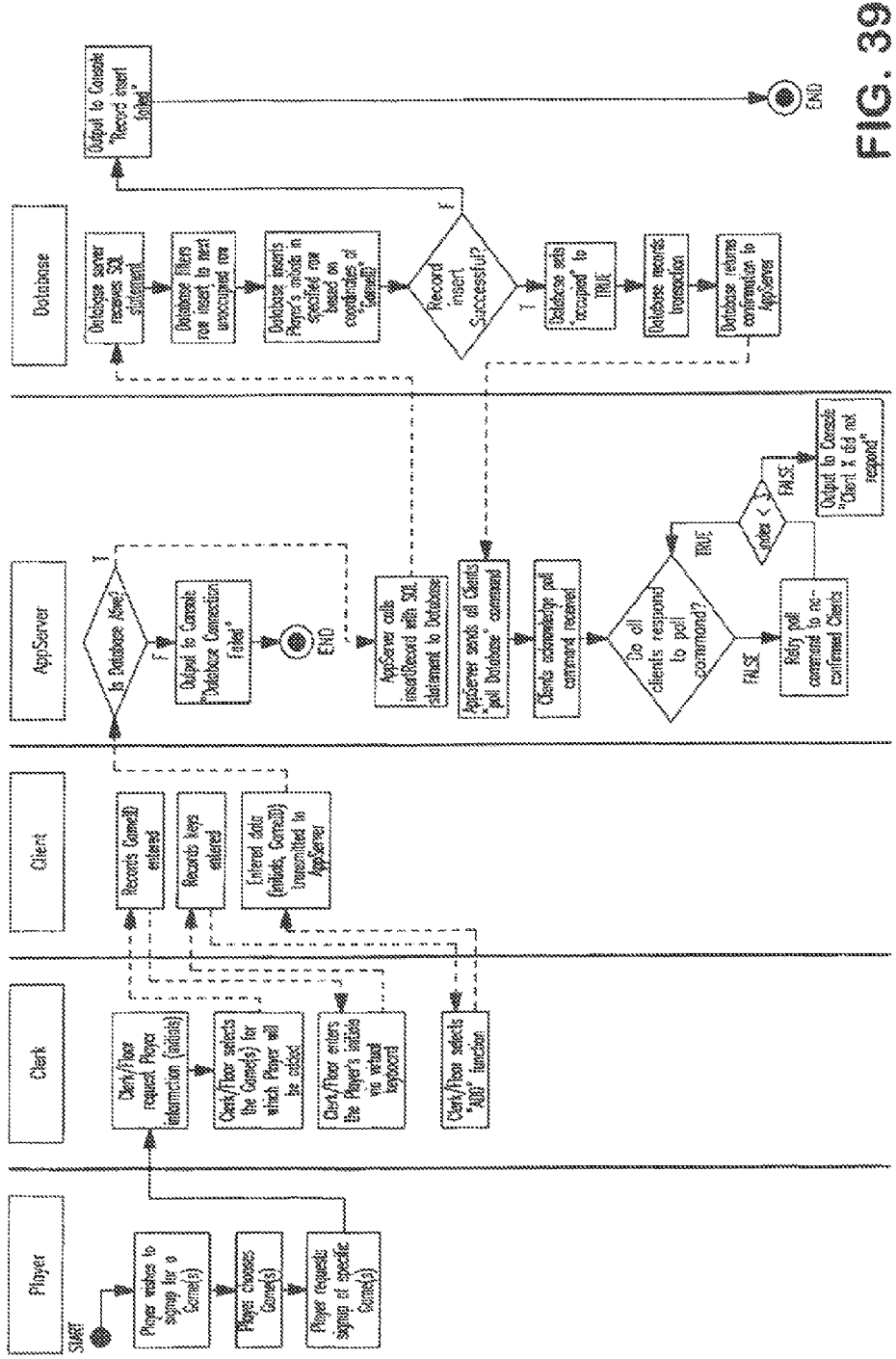
FIG. 39 is an Activity Diagram for an embodiment of a process for an Add Player operation.

Adds the player information to the list under the specified game of choice. The "Add" function records player information, date and time, and type of list addition. The system correctly places the addition on the list in the next available position with a unique system and queue identifier. Additions are color-coded on the visual representation of the queue/list, permitting various information to be easily understood by users viewing the displayed data. FIG. 36 shows a use case diagram of various actors invoking the "Add" (also "Add Player") function. FIGS. 37-39 describe in detail the process for adding a player.

"Modify"

Modify allows the modification of player information in the queue or on the list. The player's position in the queue remains the same.

"Delete"

Figure 40:
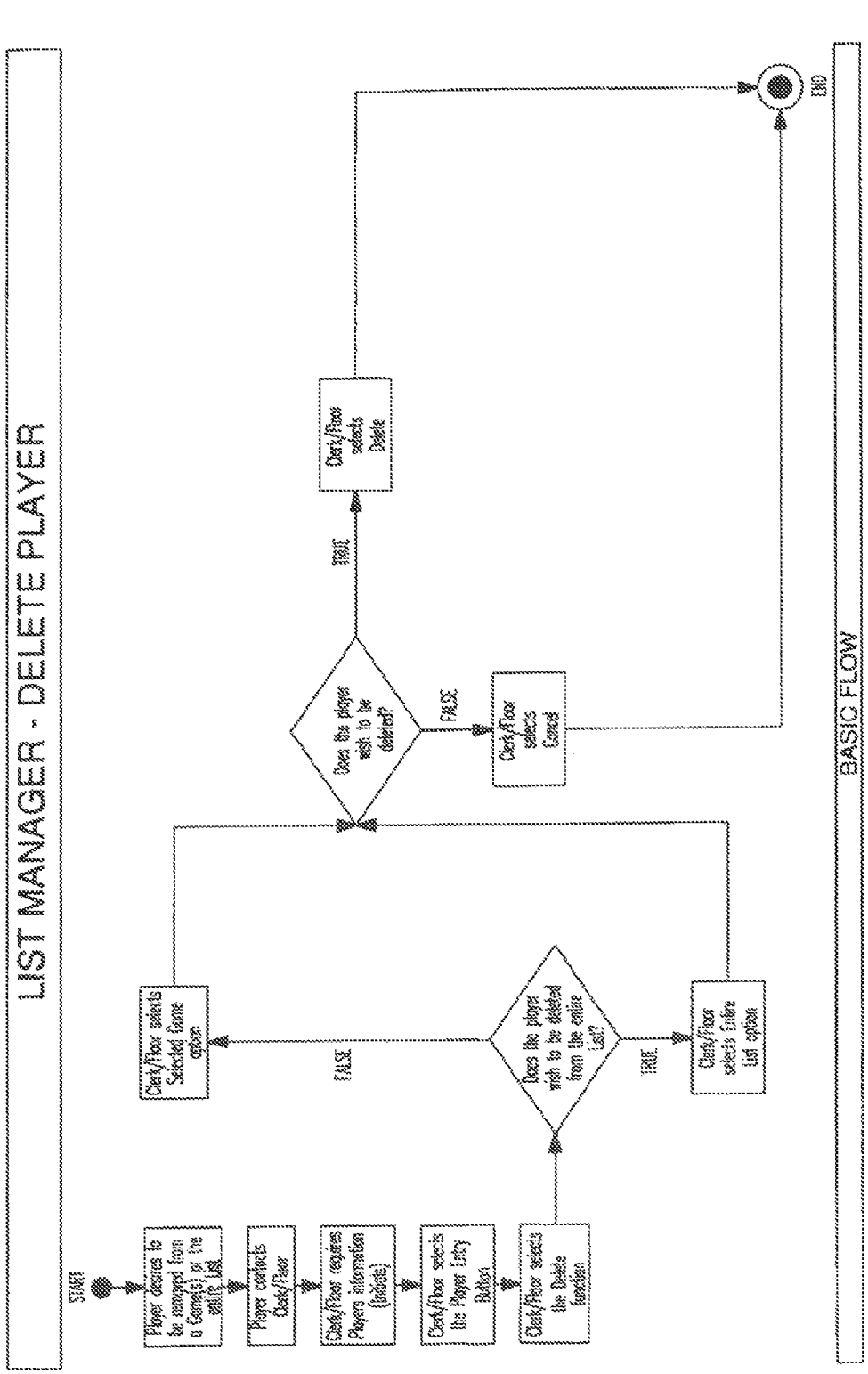
FIG. 40 is a flowchart illustrating an embodiment of a process for a Delete Player operation.
Figure 41:
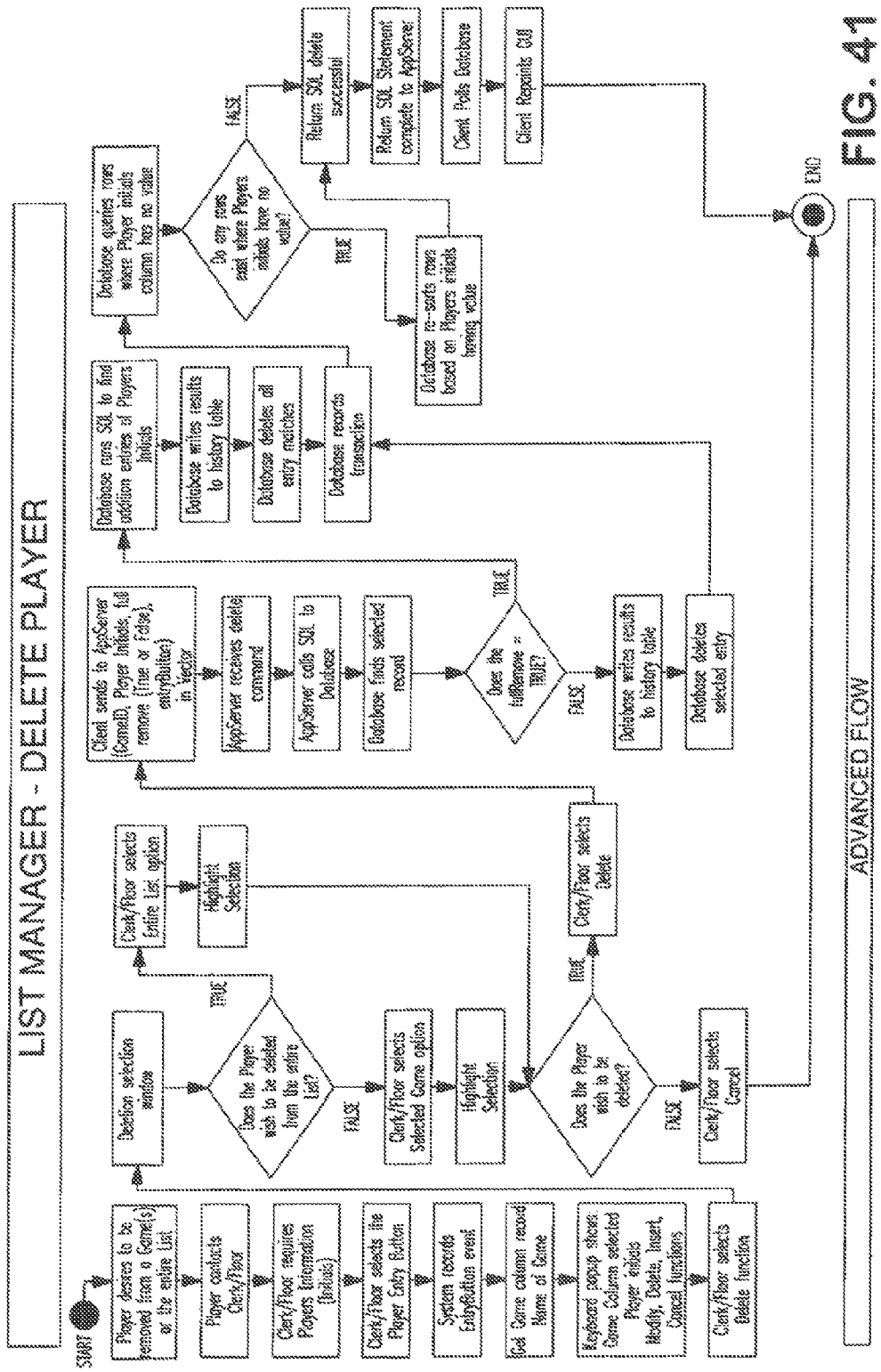
FIG. 41 is another flowchart illustrating an embodiment of a process for a Delete Player operation.
Figure 42:
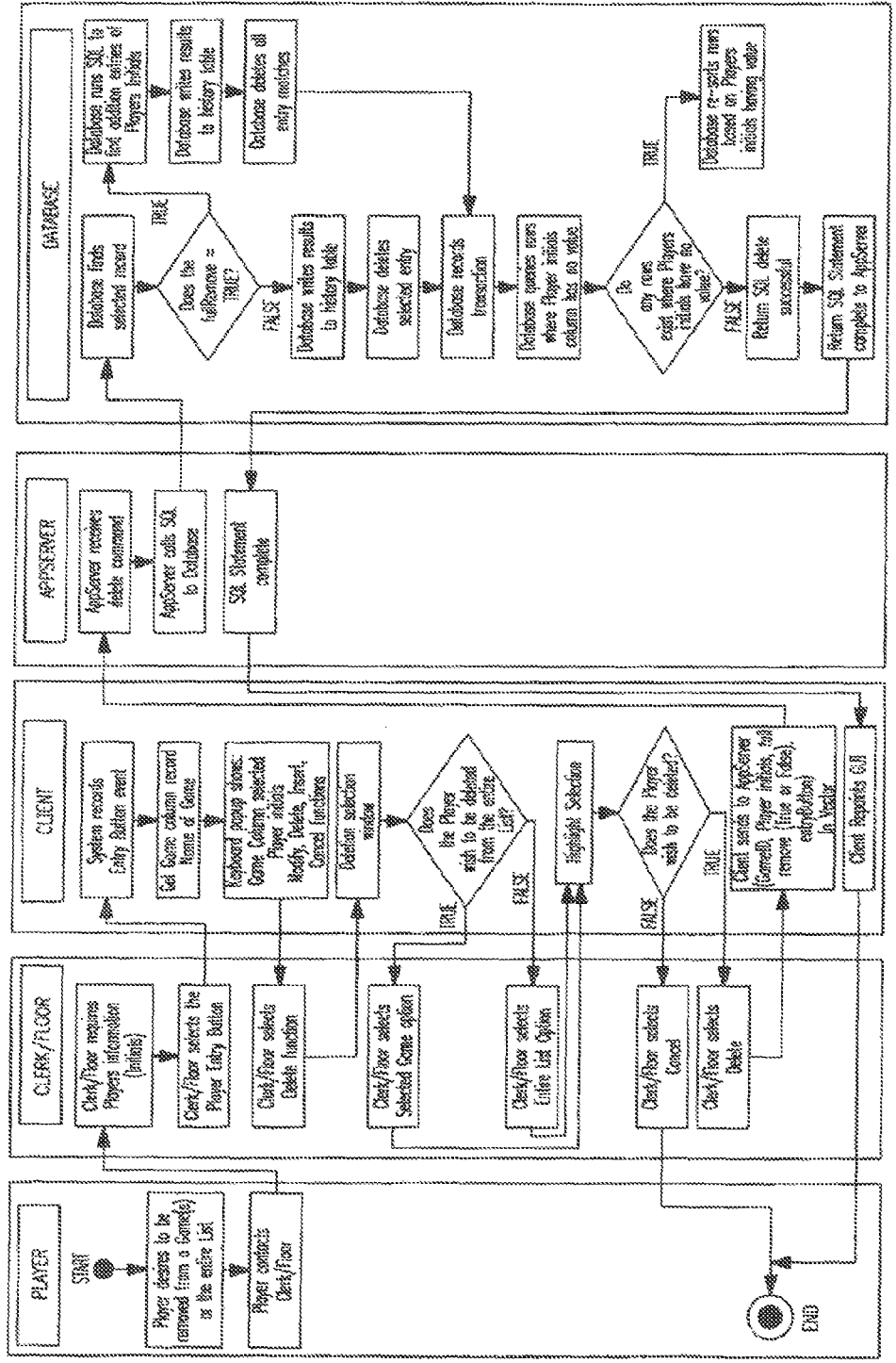
FIG. 42 is an Activity Diagram for an embodiment of a process for a Delete Player operation.
Figure 43:
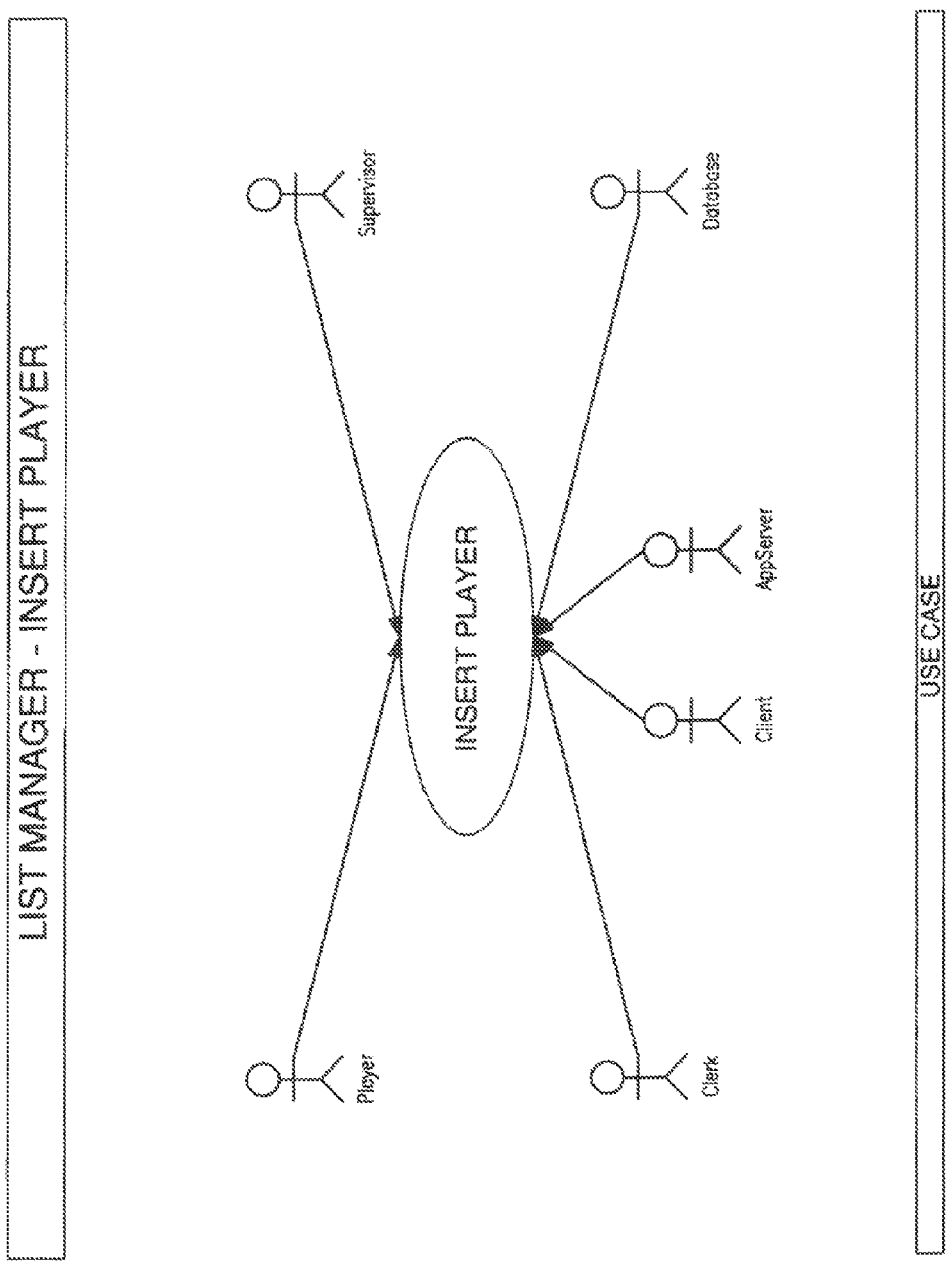
FIG. 43 is a Use Case Diagram of an Insert Player operation.
Figure 44:
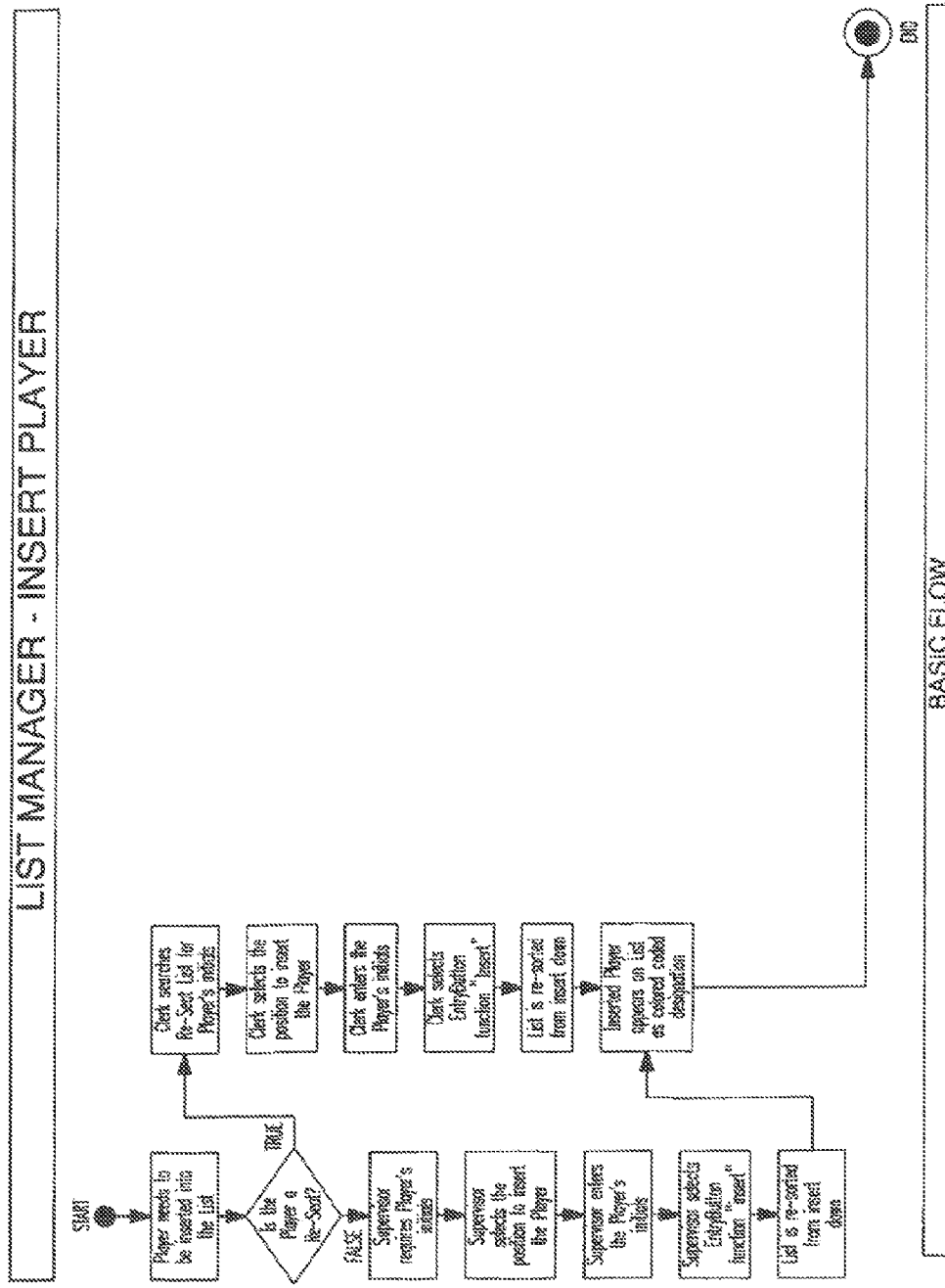
FIG. 44 is a flowchart illustrating an embodiment of a process for an Insert Player operation.
Figure 45:
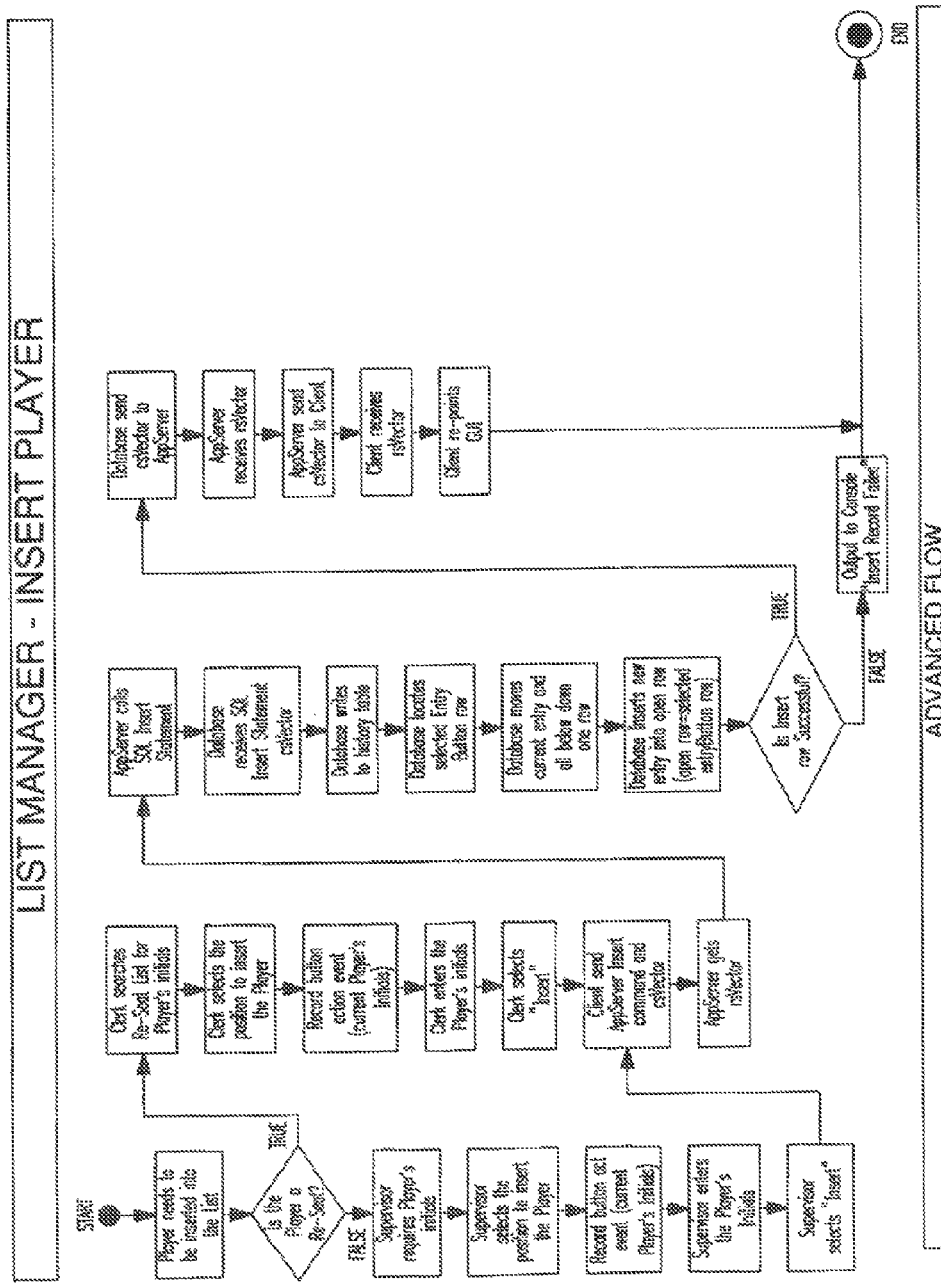
FIG. 45 is another flowchart illustrating an embodiment of a process for an Insert Player operation.
Figure 46A:
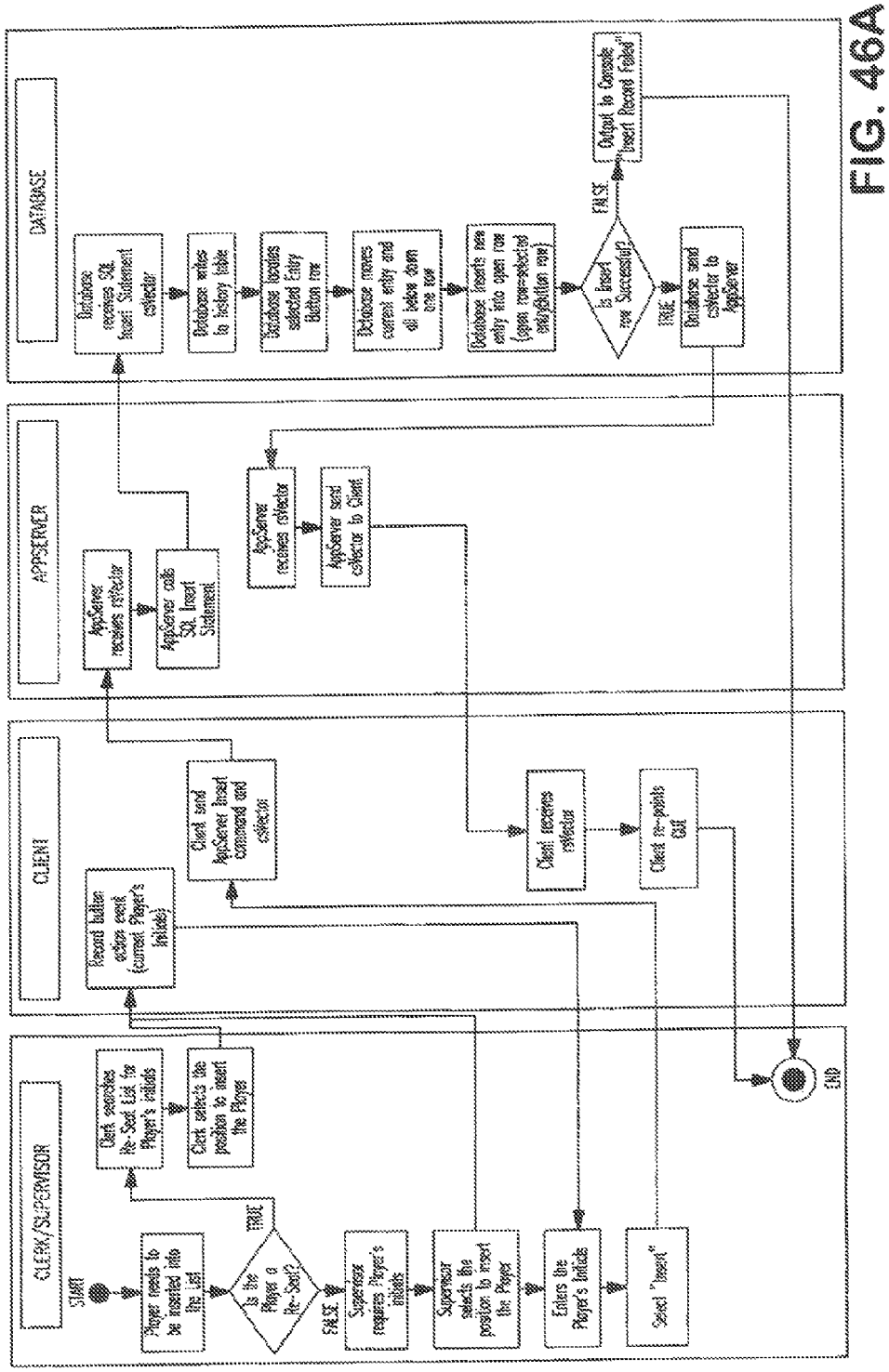
FIG. 46A is an Activity Diagram for an embodiment of a process for an Insert Player operation.
Figure 46B:
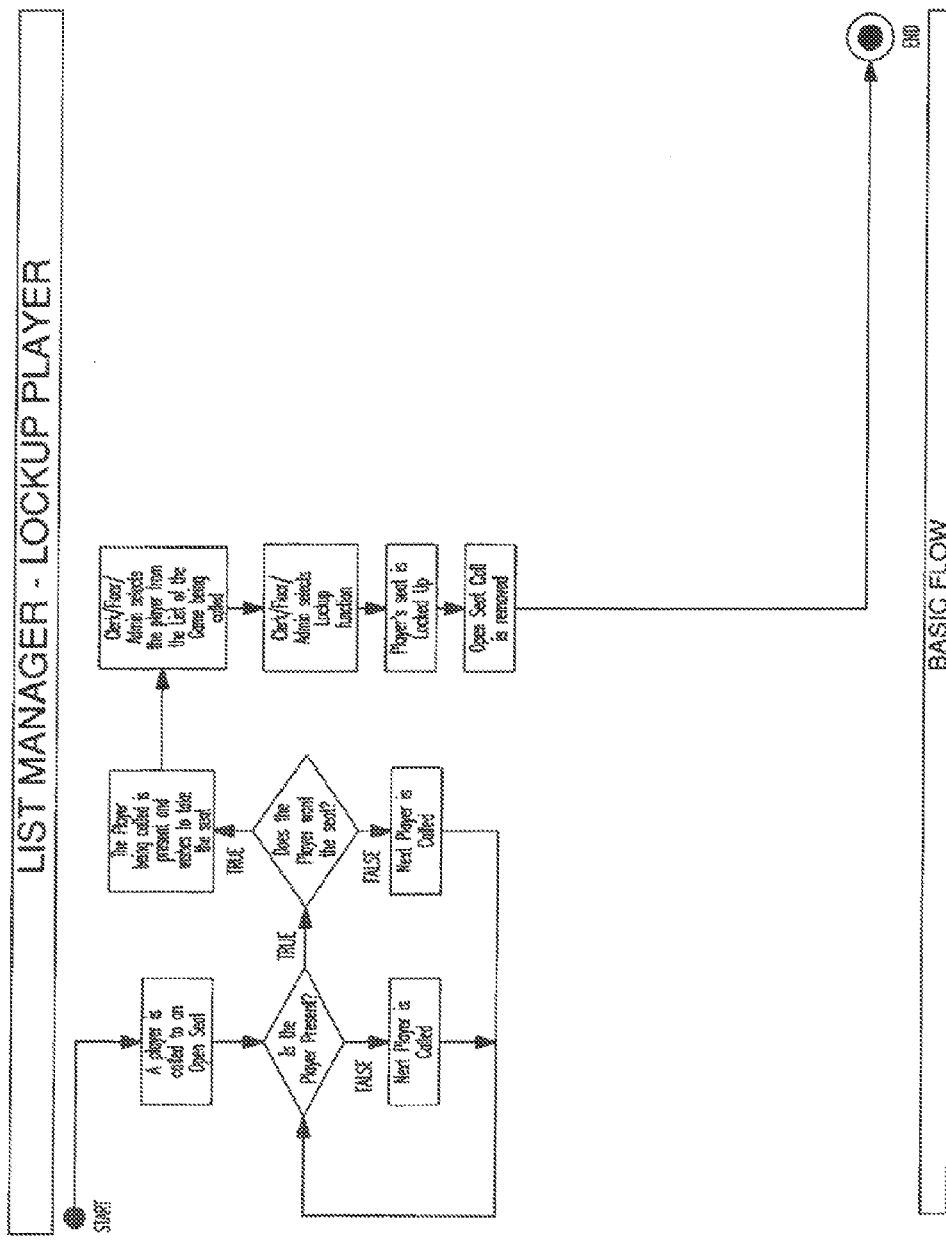
FIG. 46B is a flowchart illustrating an embodiment of a process for a Lockup Player operation.
Figure 46C:
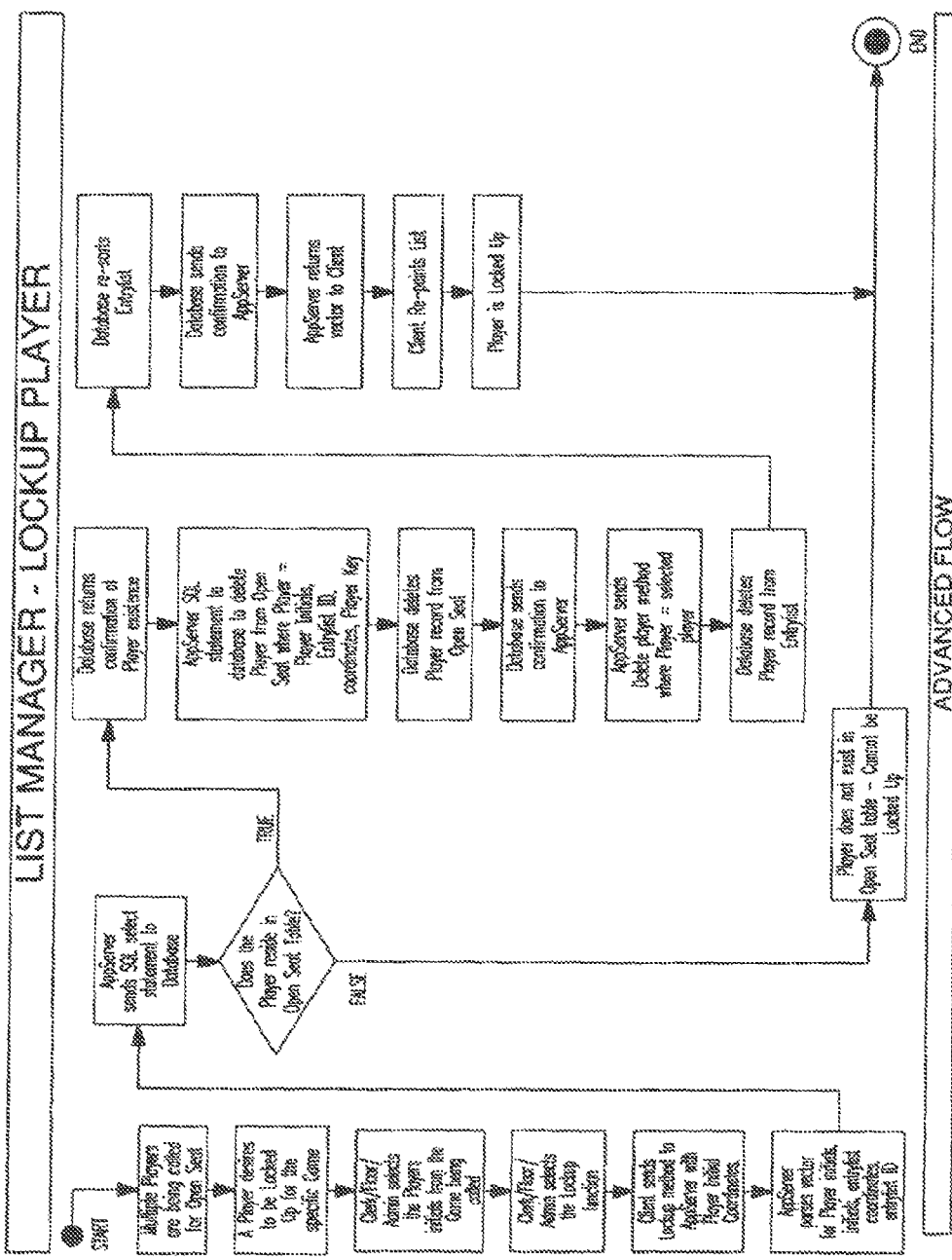
FIG. 46C is another flowchart illustrating an embodiment of a process for a Lockup Player operation.
Figure 46D:
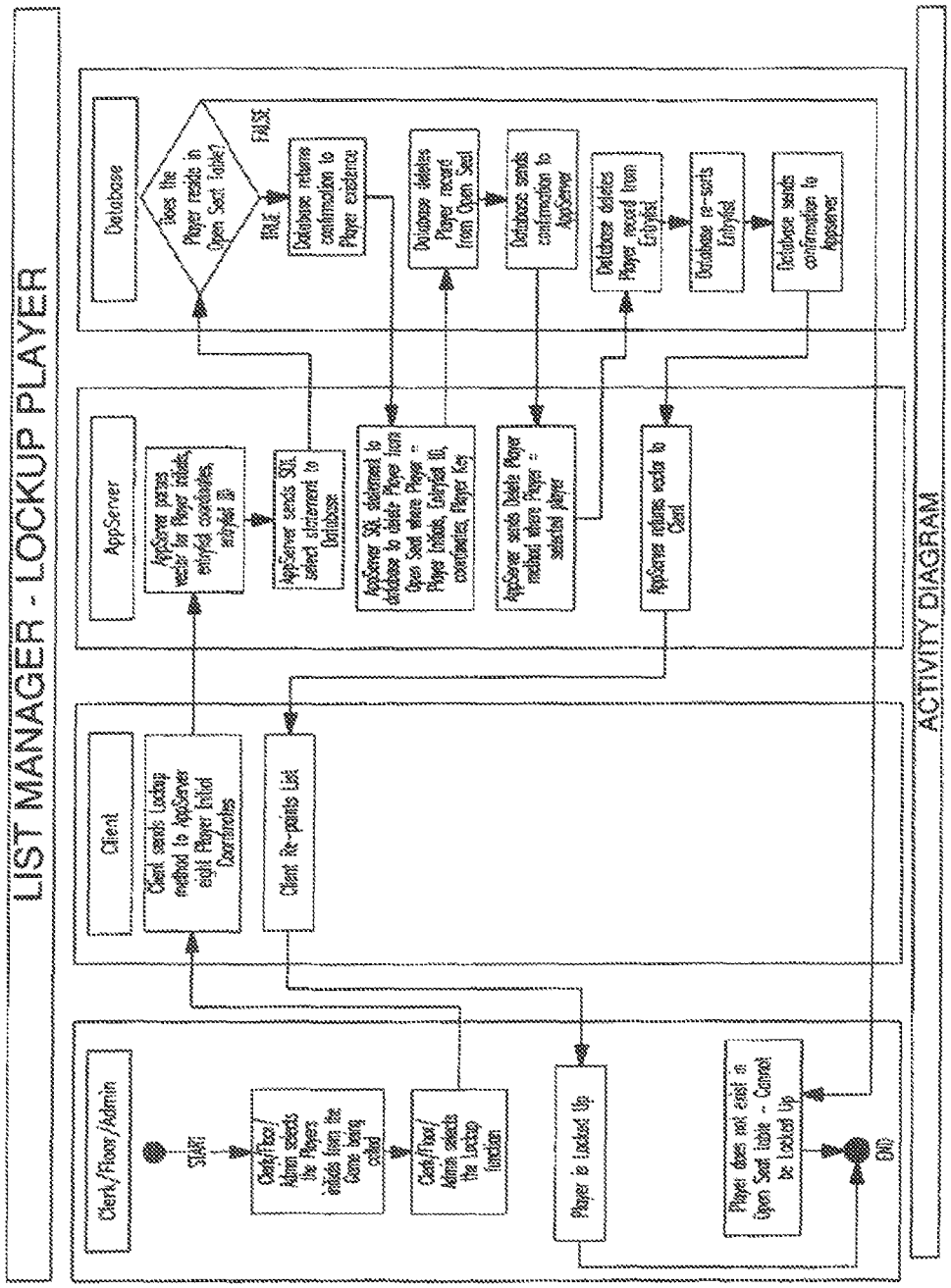
FIG. 46D is an Activity Diagram for an embodiment of a process for a Lockup Player operation.
Figure 46E:
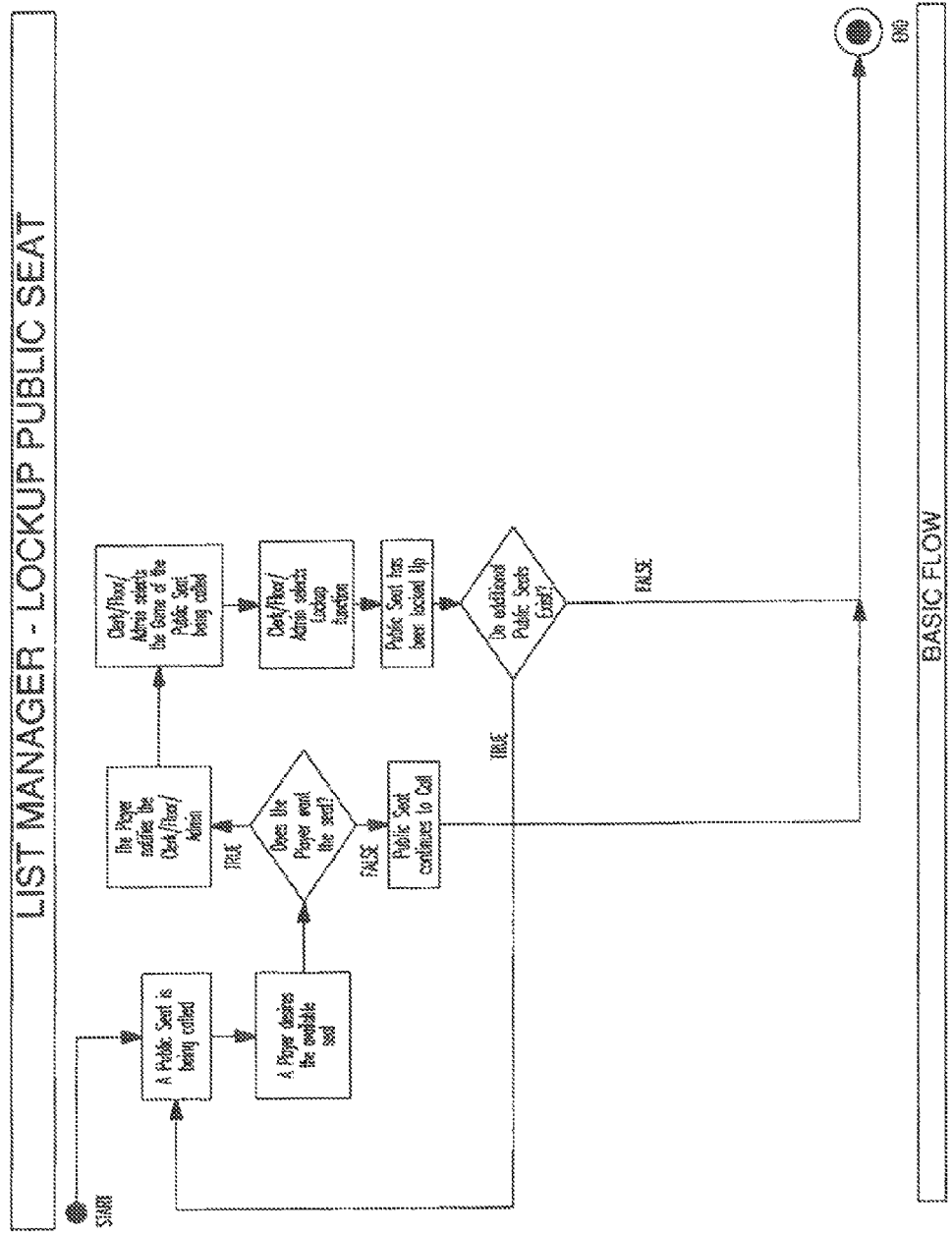
FIG. 46E is a flowchart illustrating an embodiment of a process for a Lockup Public Seat operation.
Figure 46F:
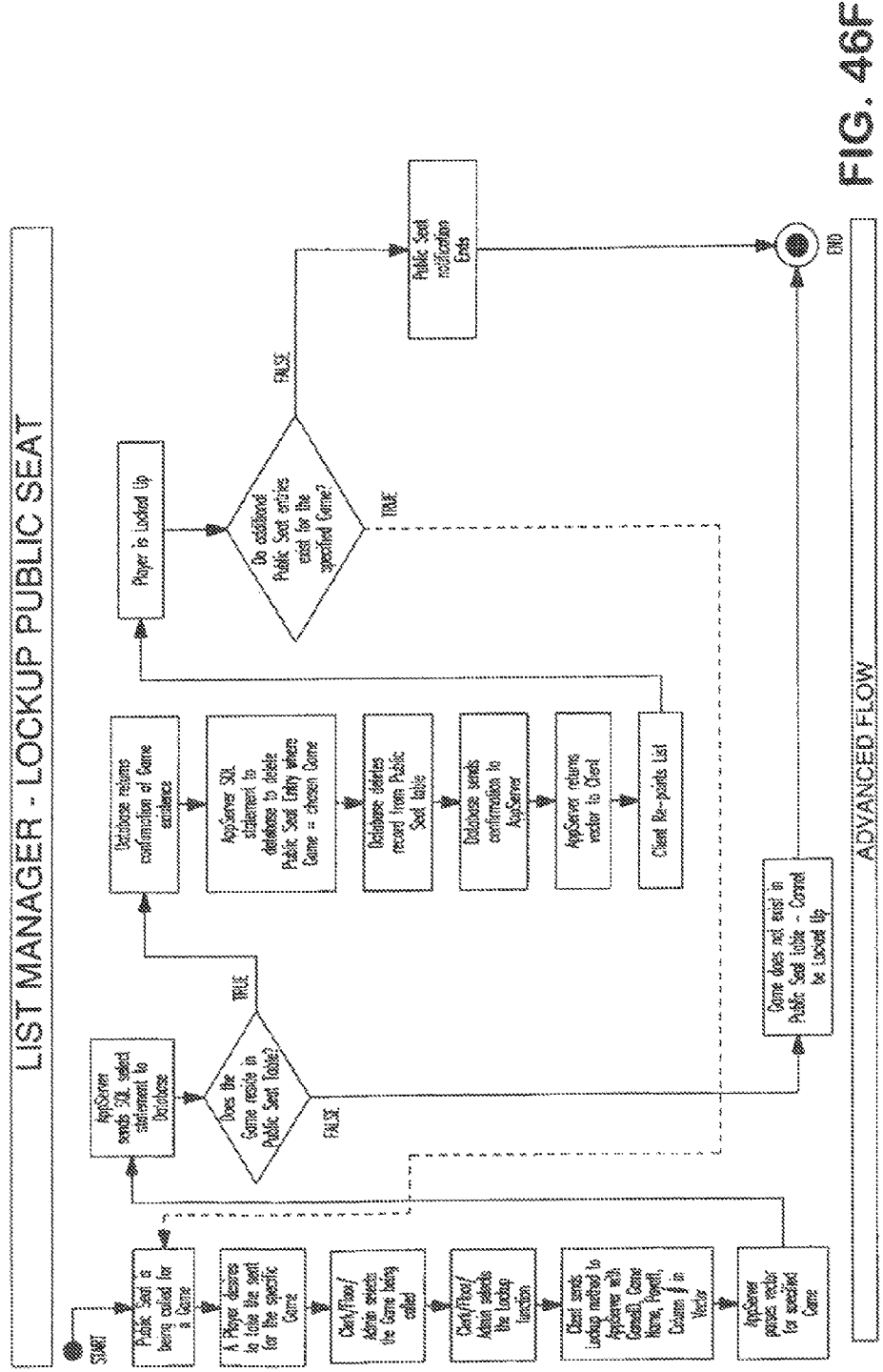
FIG. 46F is another flowchart illustrating an embodiment of a process for a Lockup Public Seat operation.
Figure 46G:
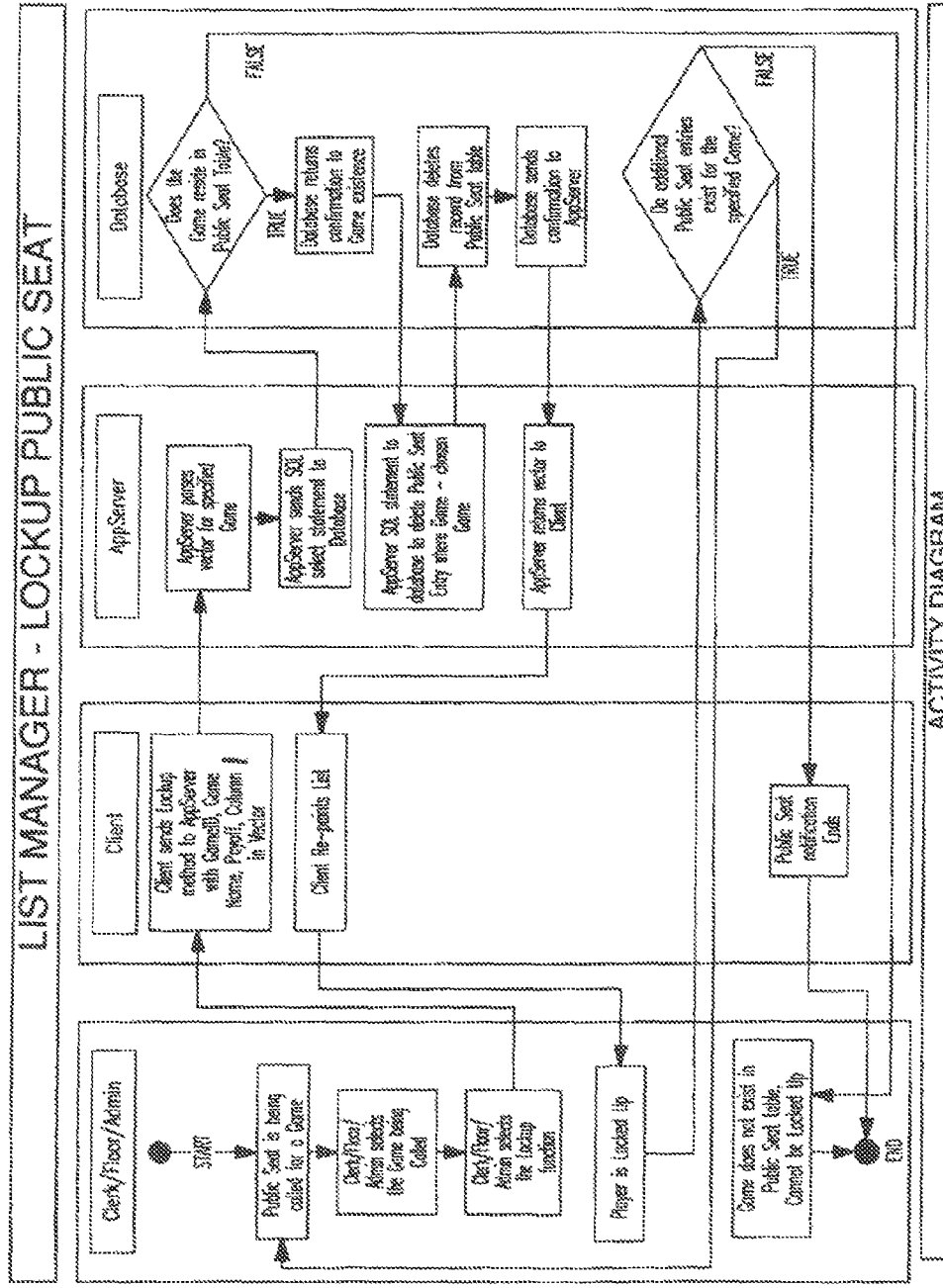
FIG. 46G is an Activity Diagram for an embodiment of a process for a Lockup Public Seat operation.

Delete removes a certain player's registration from the list or queue. Upon deletion the system recalculates the queue/list and updates the remaining entries by resorting them in the appropriate order. FIGS. 40-42 describe in detail the process for deleting a player.

"Insert"

Insert performs a player insertion into the queue or list at a specified location determined by the user. After a player insertion the system resorts the queue/list and updates accordingly. When a player is inserted the system provides date and time stamps as well as a unique system ID. Inserts are color-coded on the visual representation of the queue/list. FIGS. 43-46A describe in detail the process for inserting a player.

"Phone-In"

Phone-In supports the addition of a player to the queue/list via telephone or e-mail requests (e.g., by a player not on site). A Phone-in is added with date and time stamps, unique system ID, and color-coded visual entry.

"Activate"

Activate feature is required to activate a Phone-in entry. Once a phone-in entry is present and available for action, the activate feature updates the system on player availability. Once a phone-in is activated the system removes the color-coded phone-in visual representation.

"Search"

Figure 71:
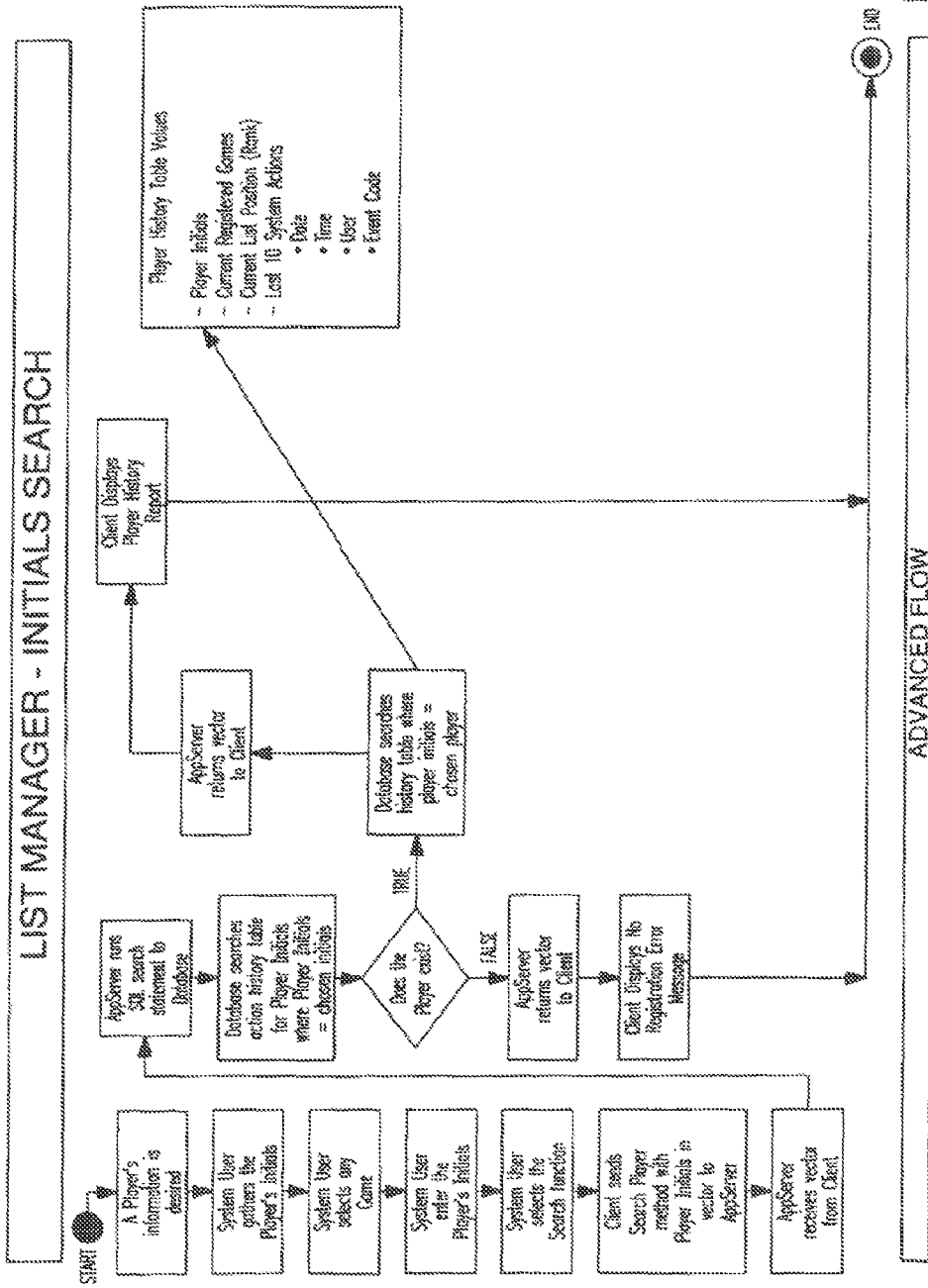
FIG. 71 is a flowchart illustrating an embodiment of a process for an Initials Search operation.
Figure 72:
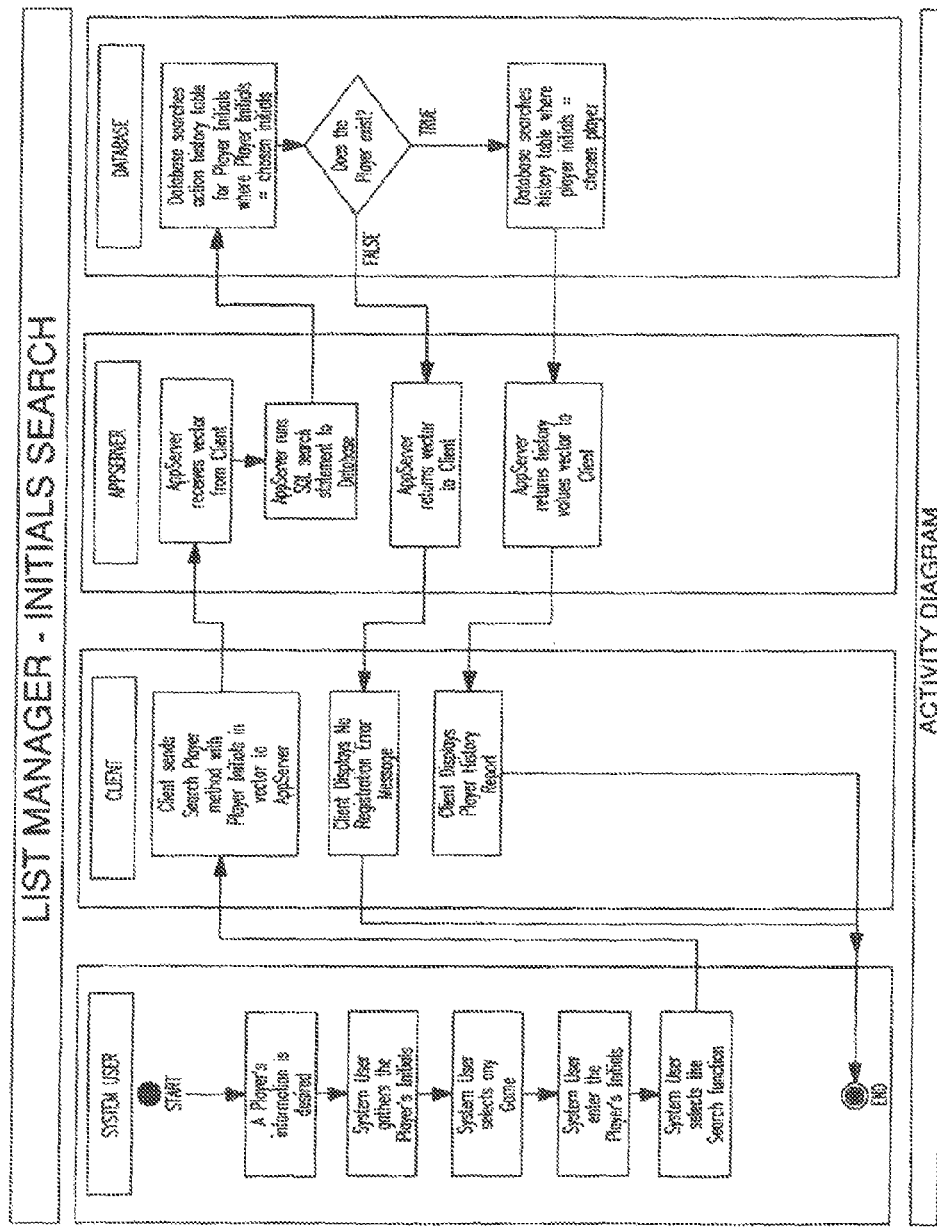
FIG. 72 is an Activity Diagram for an embodiment of a process for an Initials Search operation.
Figure 73:
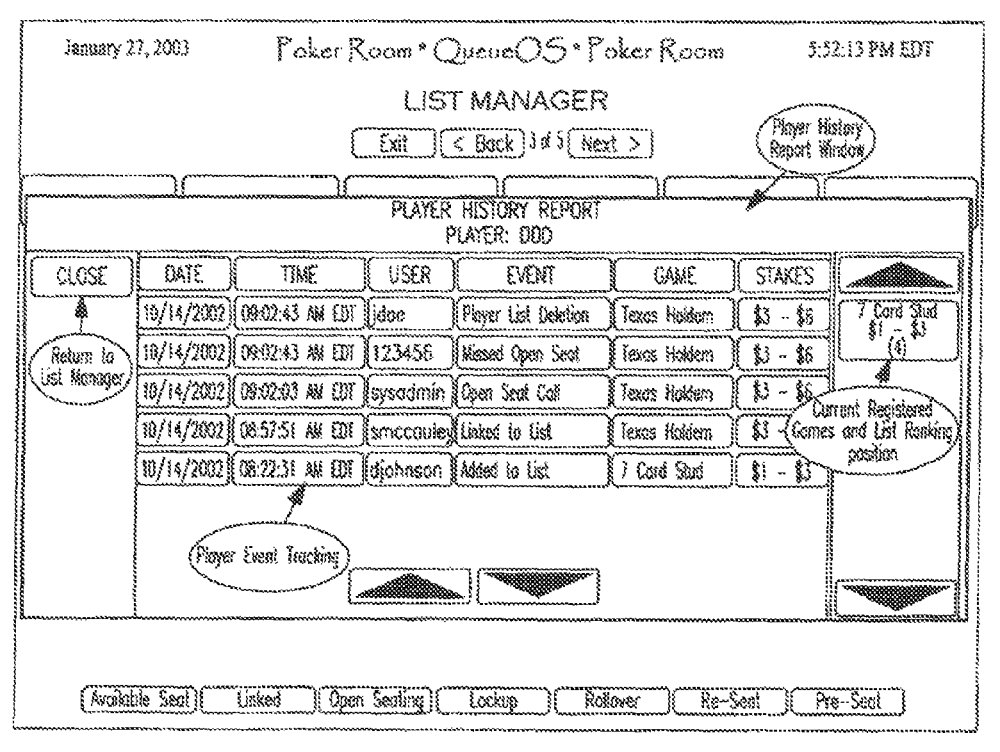

Enables operators to actively search both current and past players and lists to provide comprehensive reporting and information regarding the transaction history. Search can be performed with initials, name, player card, game, or stakes. FIGS. 71-72 describe in detail the process for searching for a user's initials. FIG. 73 illustrates a user interface which displays information about various players and events.

"Open Seat"

Allows users to notify the system and players that an available seat has become open. Once the open seat feature has been initiated the system locates the next name in the queue/list. The system then reads the player's information and using text-to-speech generation and calls out the player via a public announcement system (e.g., speakers in communication with and/or under control of the system) notifying them of the open seat for the particular game. The system can also notify players via e-mail, and pager services.

"Lockup"

The system "lockups" or secures the available seat for a particular player called during the open seat notification. Once a player has been "locked up" their information is removed from the queue/list. The system then updates the queue/list by resorting the players.

FIGS. 46B-46G describe in detail the process of Lockup.

"Rollover"

Moves a player in the queue/list to the bottom of the queue/list. This is done so that the player is not removed from the queue/list but "rolled" over in because of unavailability of the player. The system records the transaction and resorts the queue/list accordingly.

"Multiple"

Figure 47:
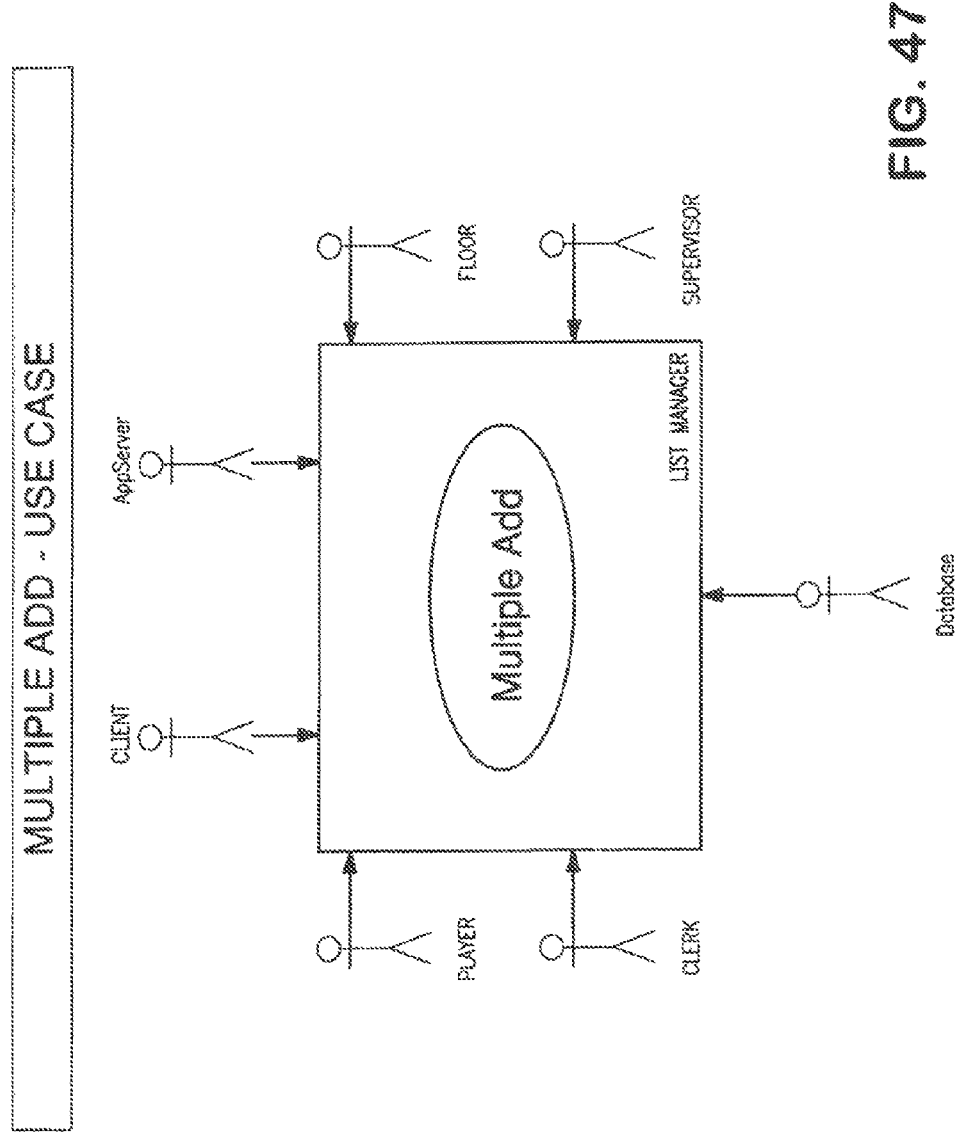
FIG. 47 is a Use Case Diagram of a Multiple Add operation.
Figure 48:
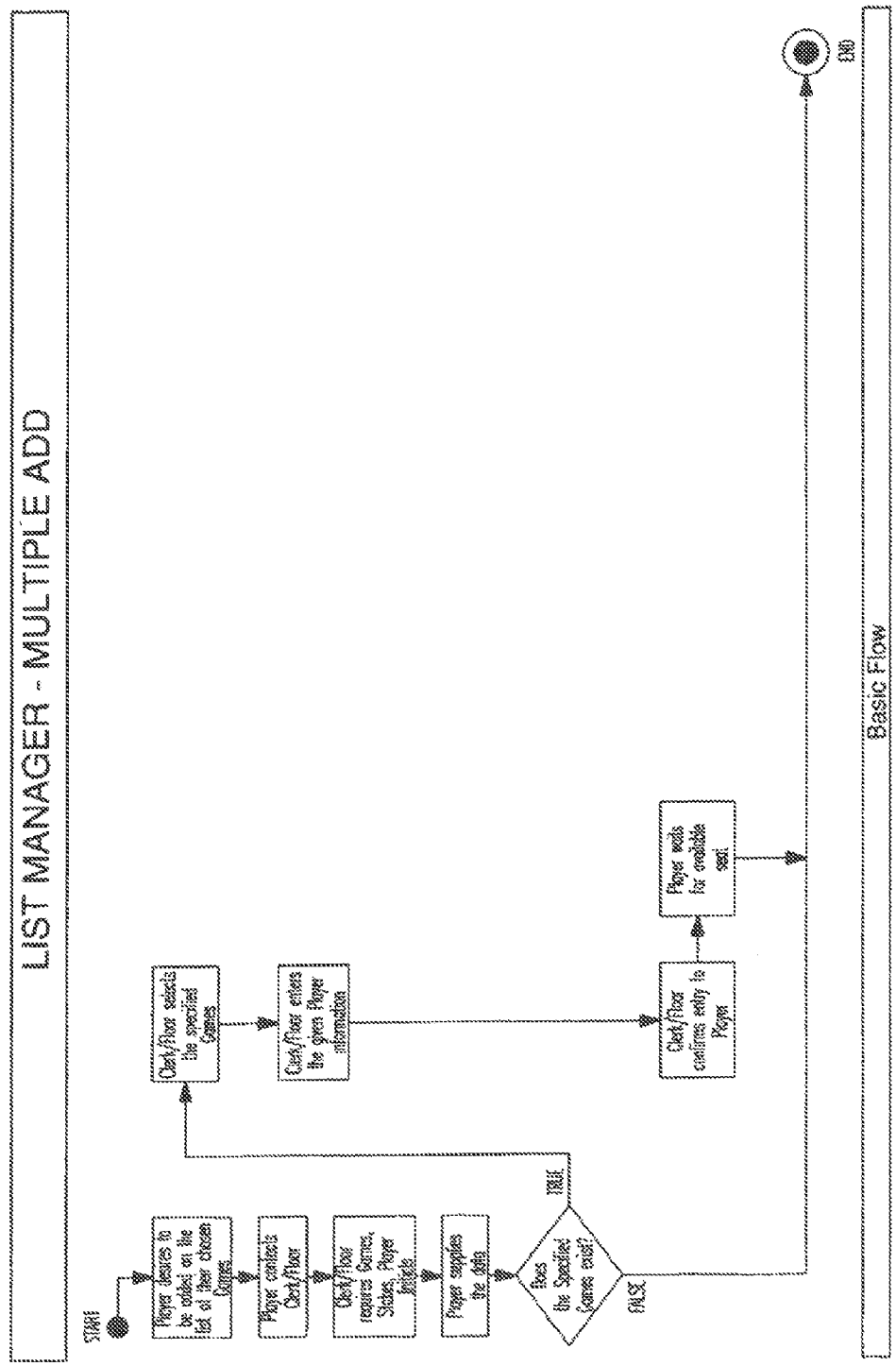
FIG. 48 is a flowchart illustrating an embodiment of a process for a Multiple Add operation.
Figure 49:
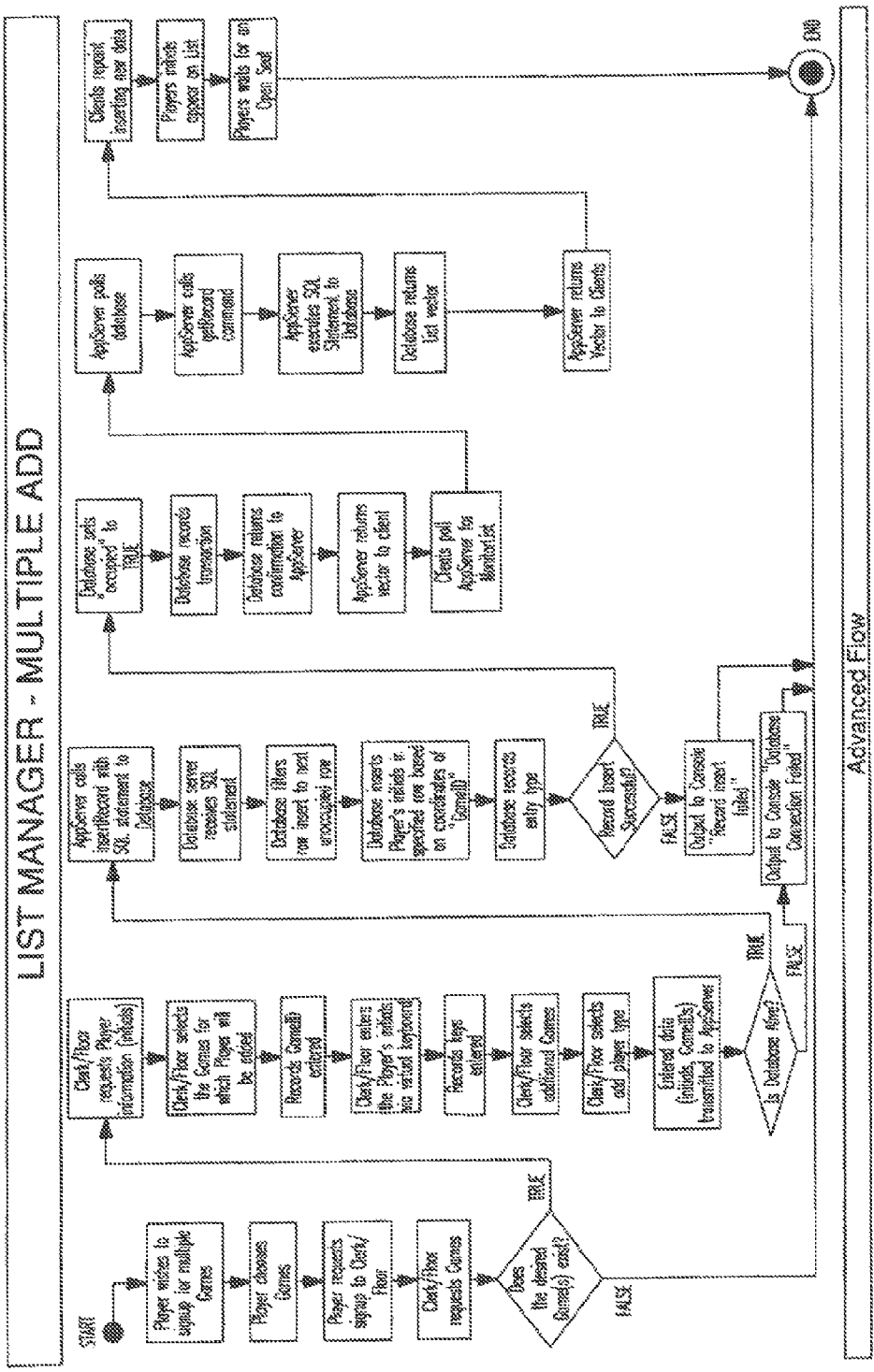
FIG. 49 is another flowchart illustrating an embodiment of a process for a Multiple Add operation.
Figure 50:
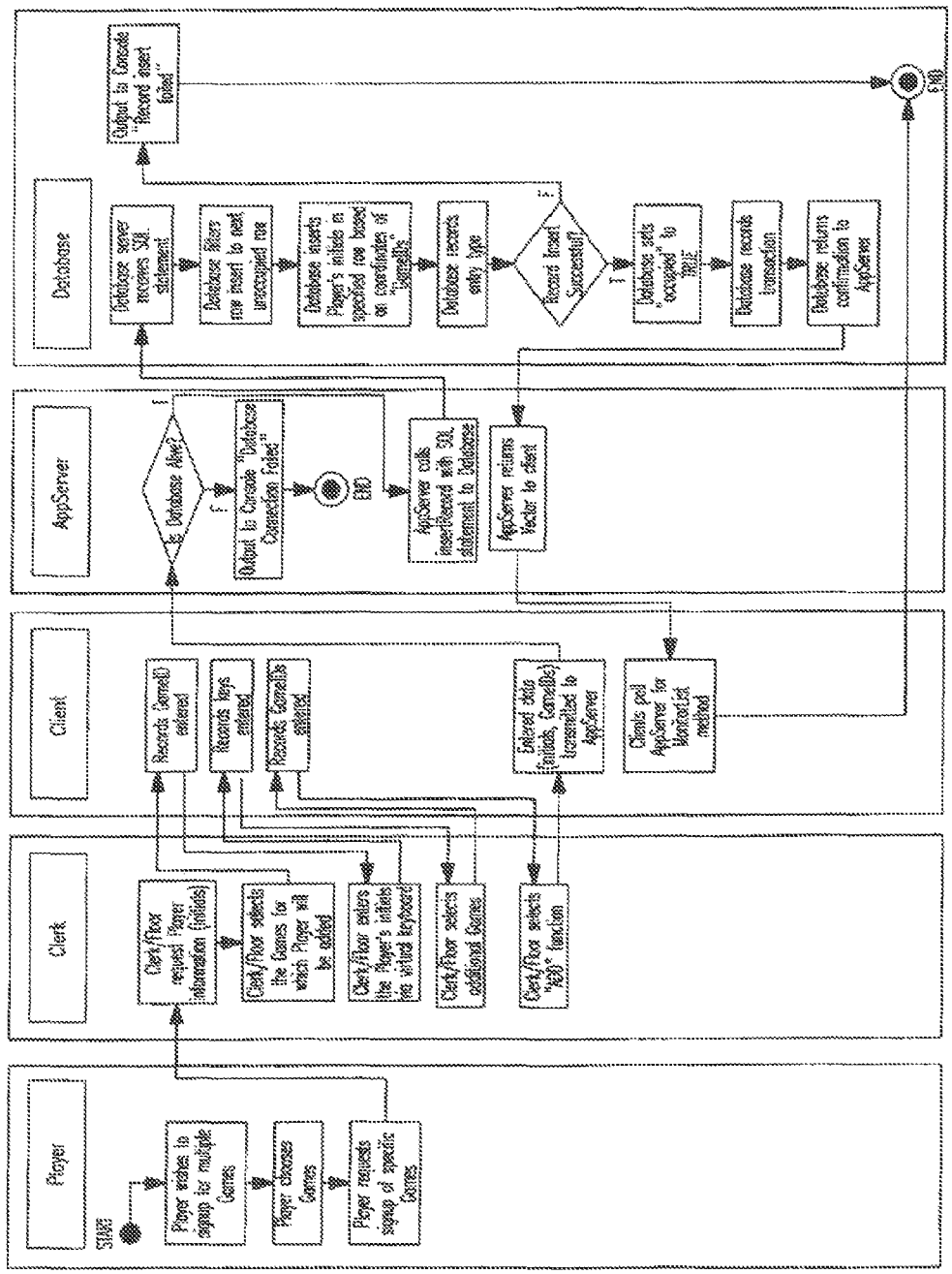
FIG. 50 is an Activity Diagram for an embodiment of a process for a Multiple Add operation.

Allow a user of the system to perform multiple functions during one action. An example of the multiple feature would be to add a player to more than one game at a time. Using the multiple feature a user can add players to multiple games through one action. FIG. 47 is a Use Case Diagram describing actors that may initiate the "Multiple" (Also called "Multiple Add") function. FIGS. 48-50 describe in detail the process of "Multiple".

"Reseat Player"

Determine the correct location in the queue/list to place a player during a reseating procedure. The player is placed on a reseating list of the game of choice and once activated the system manages how and where the player is inserted into the main queue/list.

"Integrated Voice Response"

Use customized text-to-voice process to create sentences and utilizing a speaker or public announcement setup calls out the created sentence in a voice format. The method also handles the ability for players to "call-in" to the system via telephone or e-mail services and gain real-time queue/list status, register for games, verify compensation points, and learn about establishment promotions. The integrated voice response feature can recognized proper names from an internal dictionary (name table) and call the specific player by the own name. Proper Name recognition may be performed through software. For example, prior to calling a name or set of initials, the system parses the string (i.e. "p-e-t-e-r") representing that name or set of initials. The system then determines whether or not the string matches a proper name in the name table. If there is a match, a pre-recorded speech output file corresponding to the proper name is played via the audio output device. If the string does not match a proper name from the name table, each variable (i.e. "p-e-t") is matched to its corresponding pre-recorded sound (e.g., a sound file for each letter). Those sounds are played via the audio output device.

"Promotional Marquee"

Figure 51:
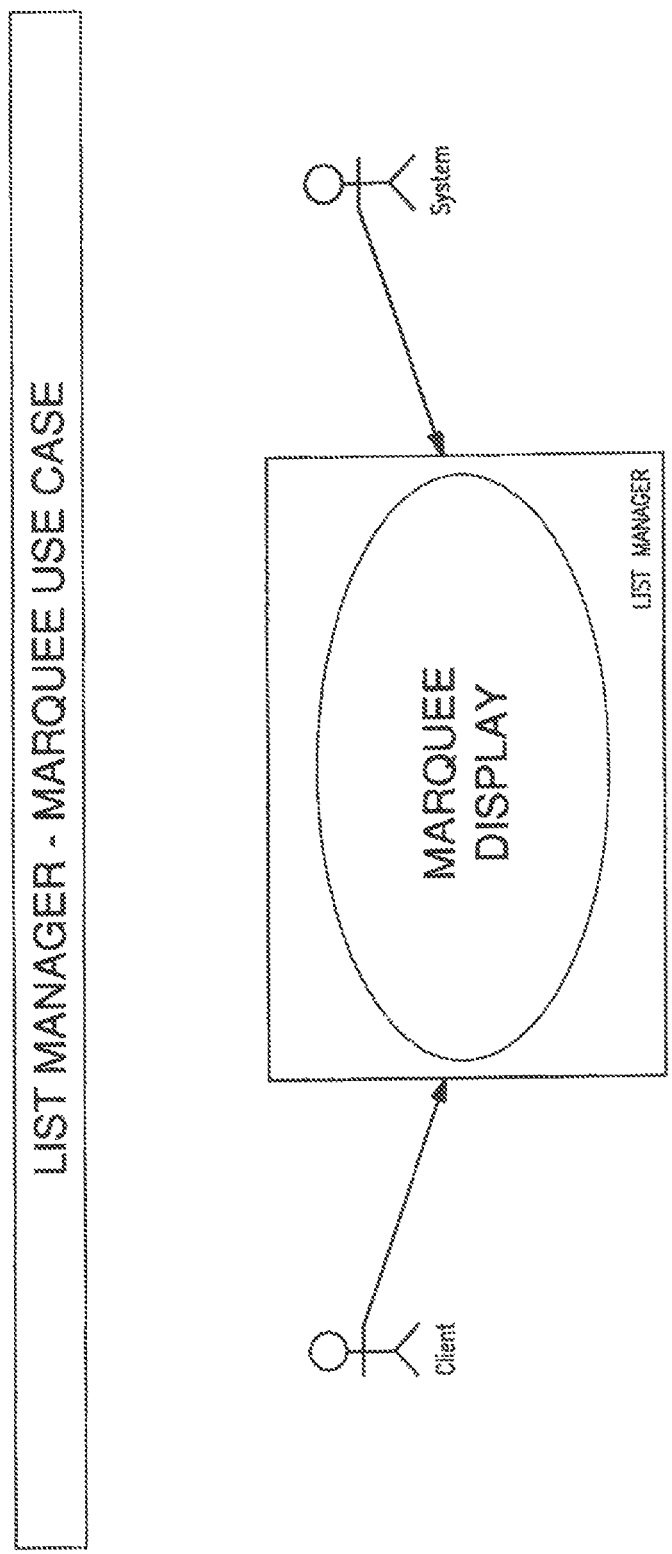
FIG. 51 is a Use Case Diagram of a Marquee Display operation.
Figure 52:
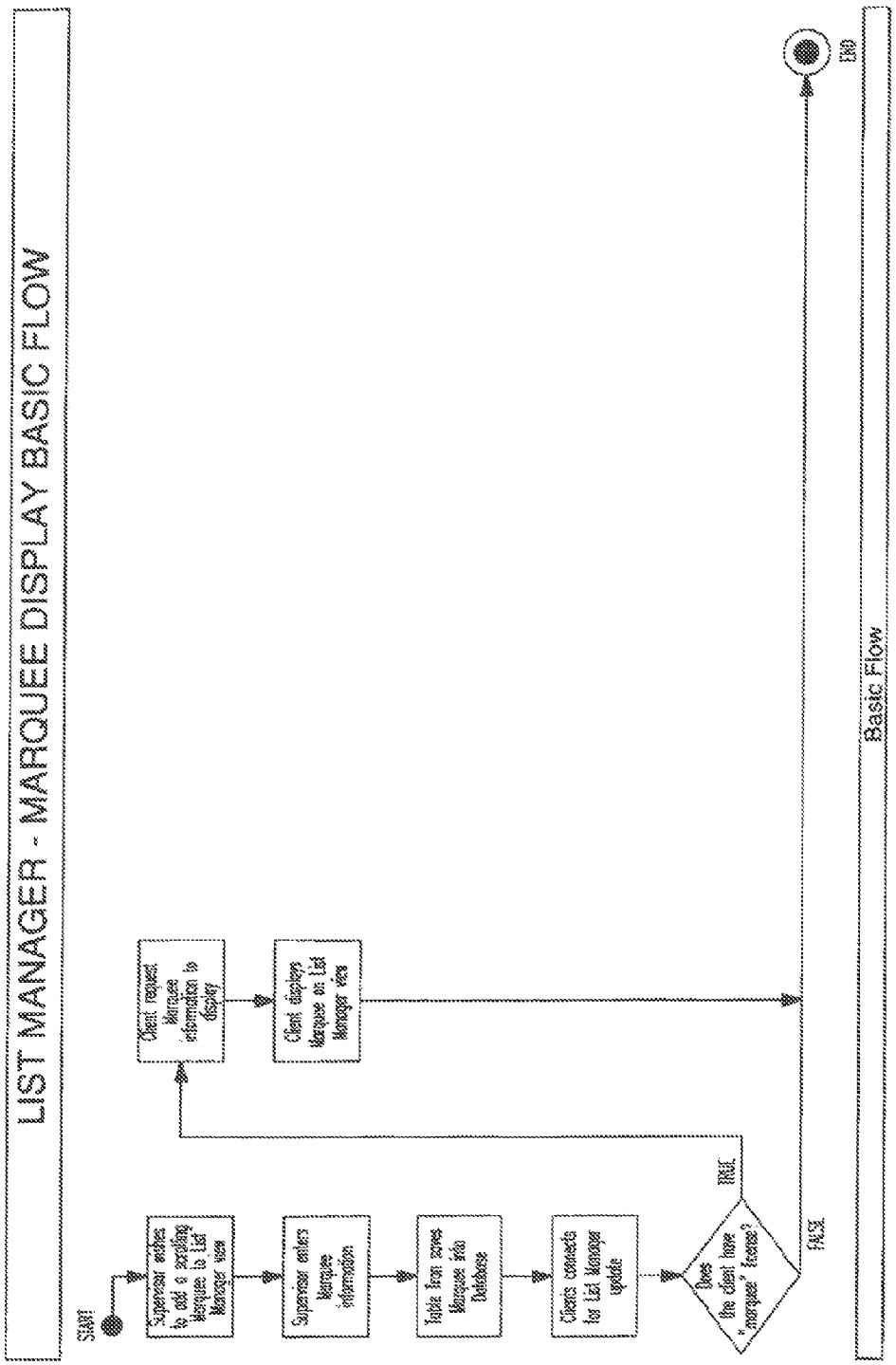
FIG. 52 is a flowchart illustrating an embodiment of a process for a Marquee Display operation.
Figure 53:
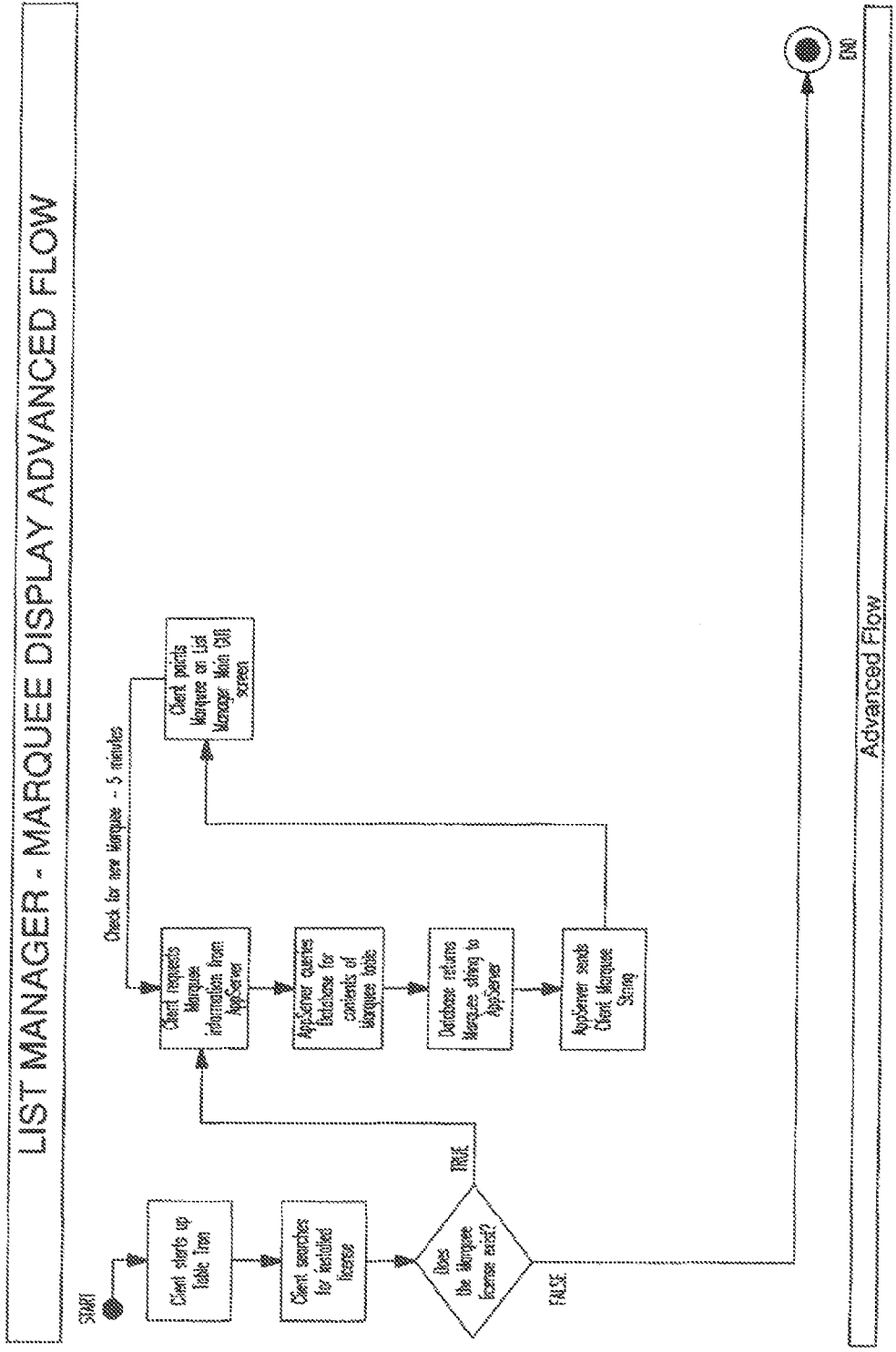
FIG. 53 is another flowchart illustrating an embodiment of a process for a Marquee Display operation.
Figure 54:
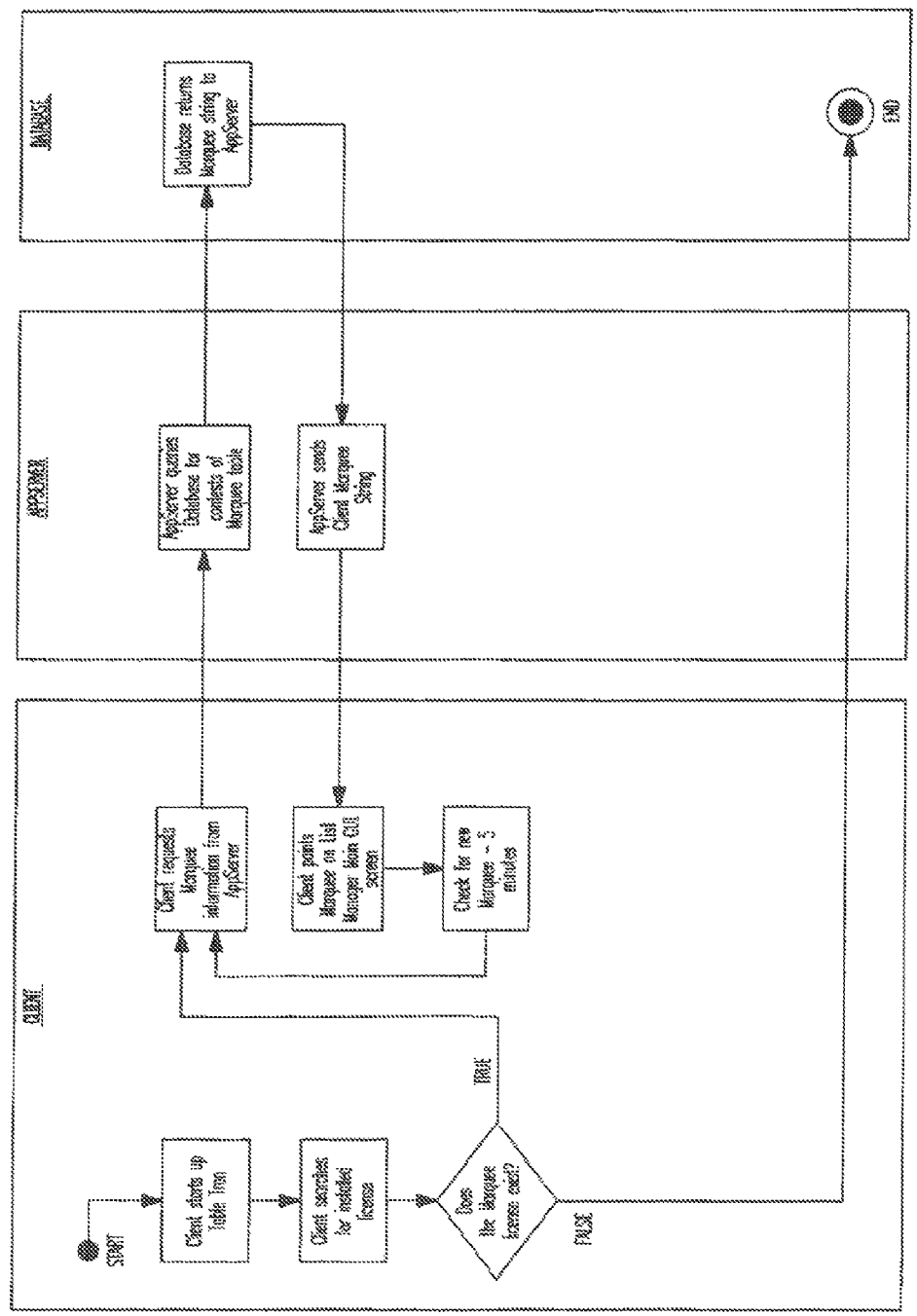
FIG. 54 is an Activity Diagram for an embodiment of a process for a Marquee Display operation.

Enables an establishment to utilize the system to promote special events on a visual display. Many types of appropriate displays include, for example, a large plasma screen capable of a resolution of 1024×768. FIG. 51 is a Use Case Diagram describing actors that may initiate the "Promotional Marquee" (Also called "Marquee") function. FIGS. 52-54 describe in detail the process of "Promotional Marquee".

The program queries a database table where the marquee text, pictures, or voice information is stored. The program then displays this stored information on the designated screens. The marquee runs in real-time, so that upon changing the values or information in the database table the displayed content will be updated without having to re-start the program. The scheduled query intervals, scrolling speed, and location of the marquee can be in customized since these parameters are defined in the database.

"Average Wait Time"

Figure 77:
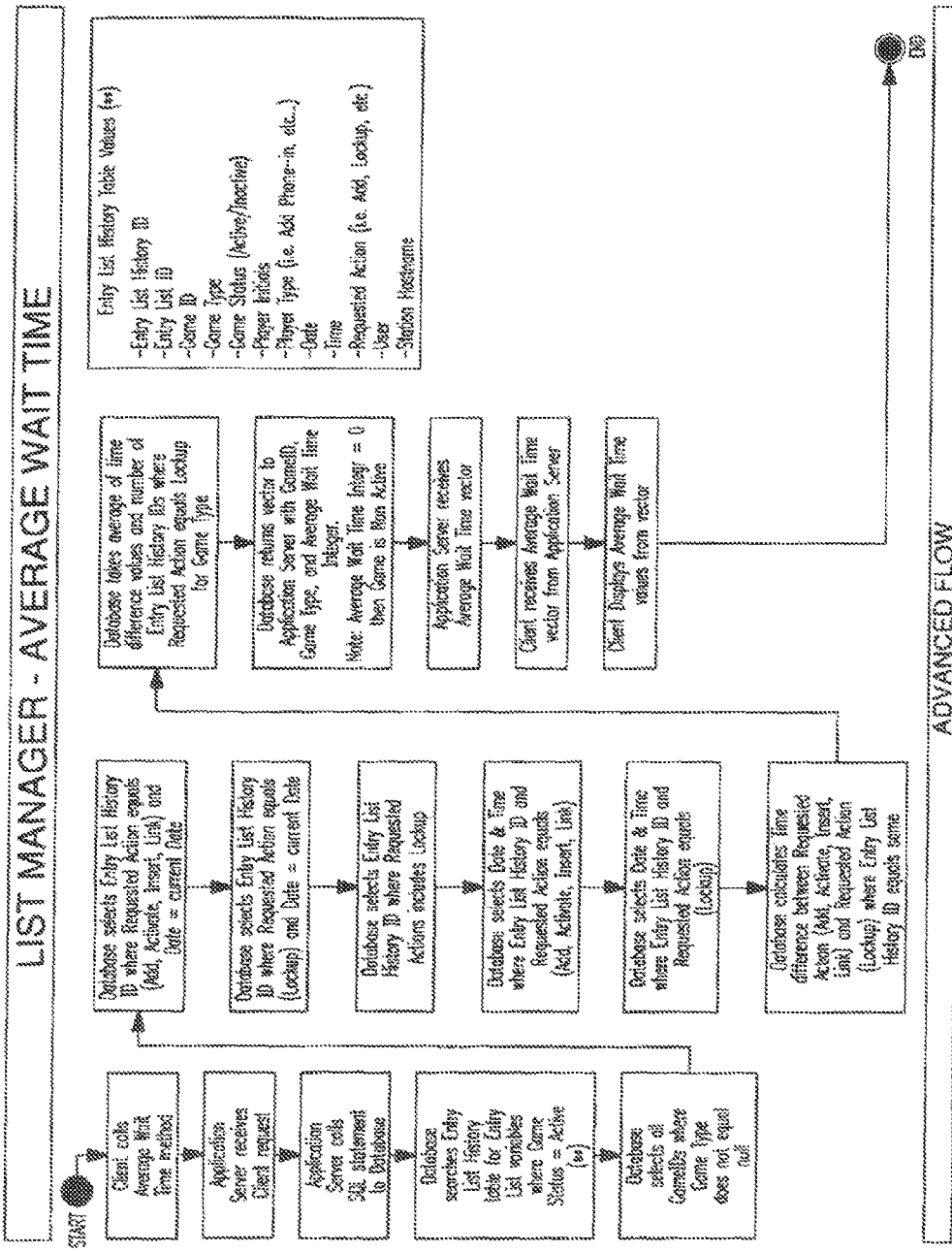
FIG. 77 is a flowchart illustrating an embodiment of a process for Average Wait Time operation.
Figure 78:
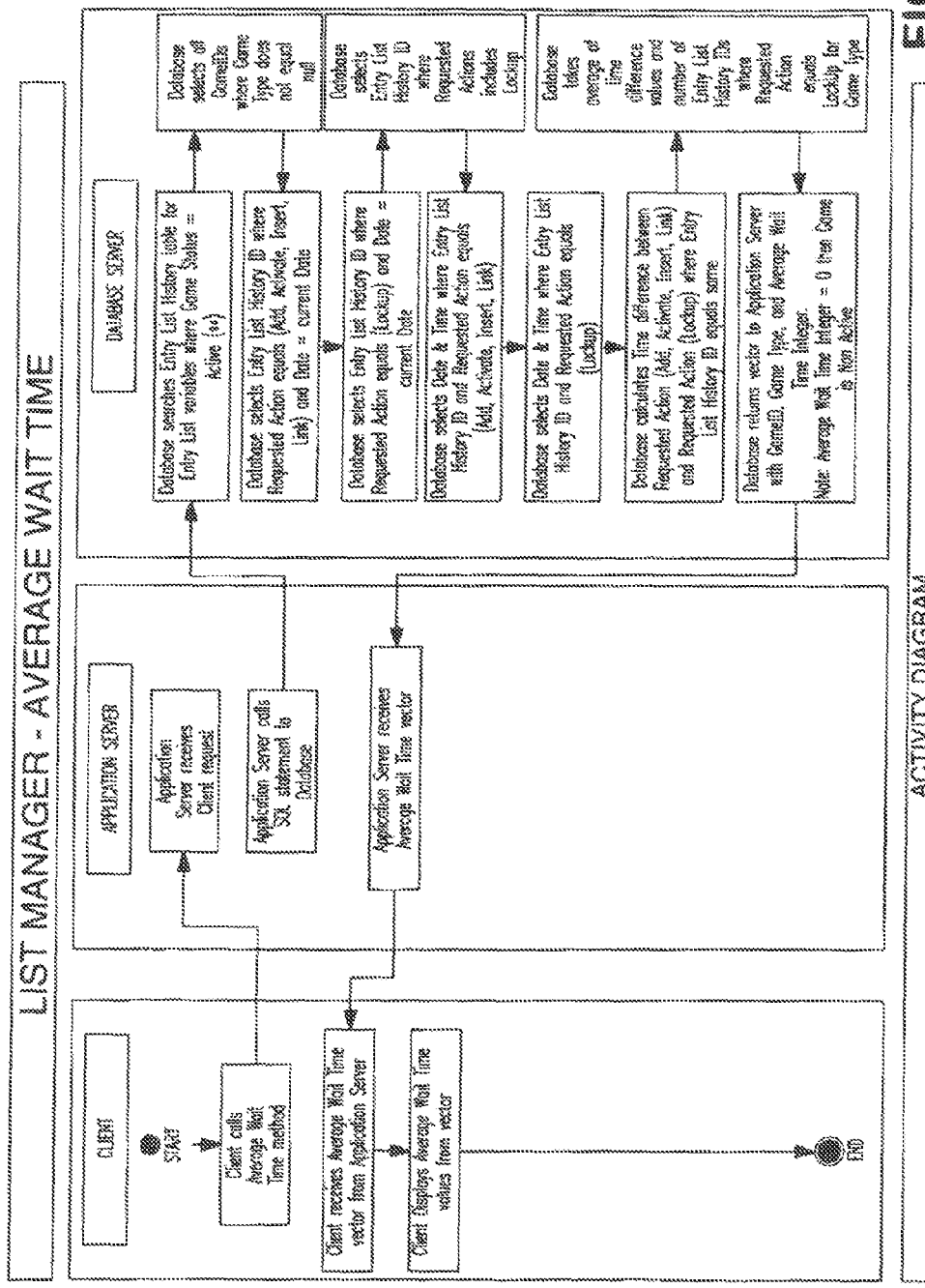
FIG. 78 is an Activity Diagram for an embodiment of a process for Average Wait Time operation.
Figure 79:
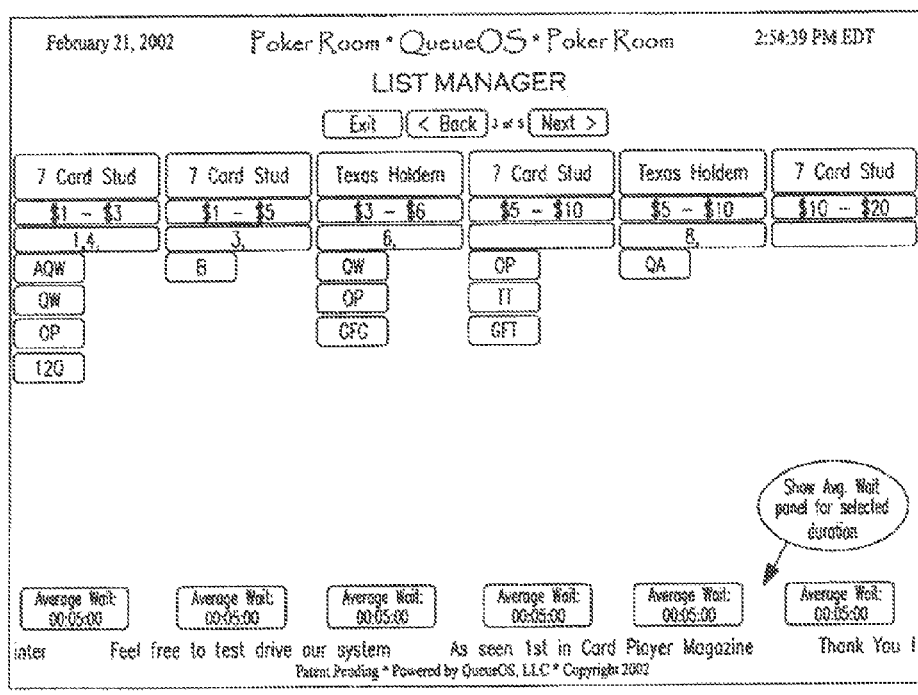
FIG. 79 is an illustration of a graphical user interface, showing Average Wait Time displays.
Figure 80:
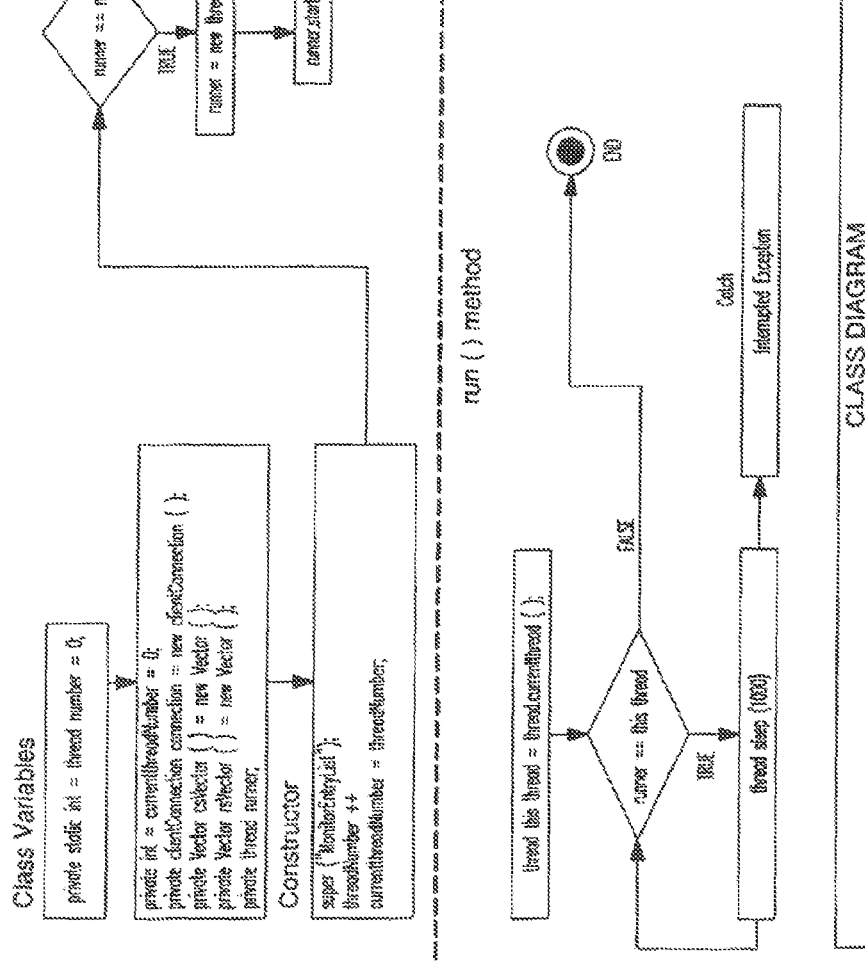
FIG. 80 is a class diagram of the process for Monitoring List & Queue updates.
Figure 81:
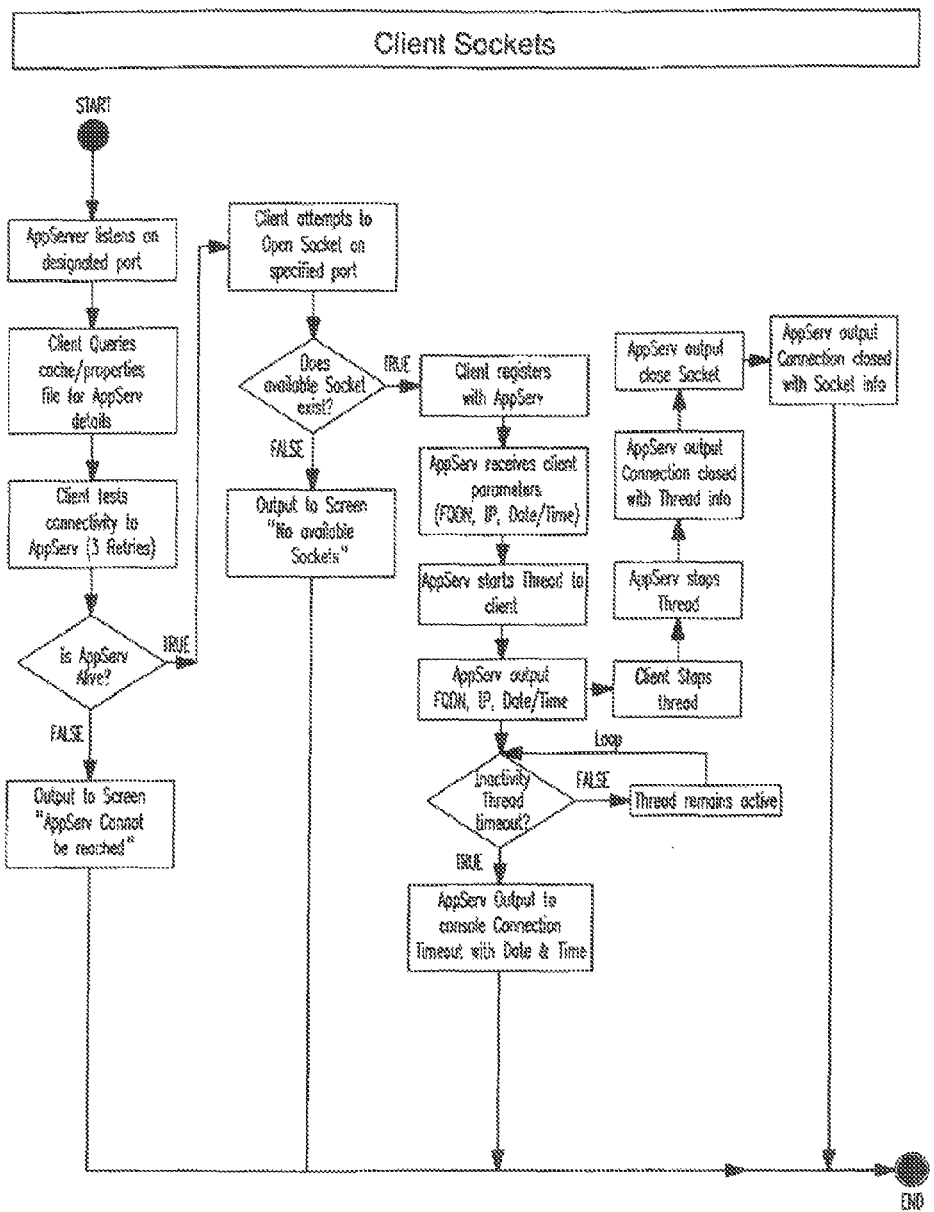
FIG. 81 is a flowchart illustrating the process for client socket communications to the application server.

Calculates historical and real-time data to predict average wait time within a queue/list. FIGS. 77-78 describe in detail the process for "Average Wait Time". FIG. 79 is a user interface that displays average wait time for various games.

"Player Self Registration"

Allows players to utilize the system and register themselves for particular games of choice or tournaments via their player identification card. The system handles the player registration and records the transaction as self-registration for tracking and reporting purposes.

"Profanity Checker"

Figure 55:
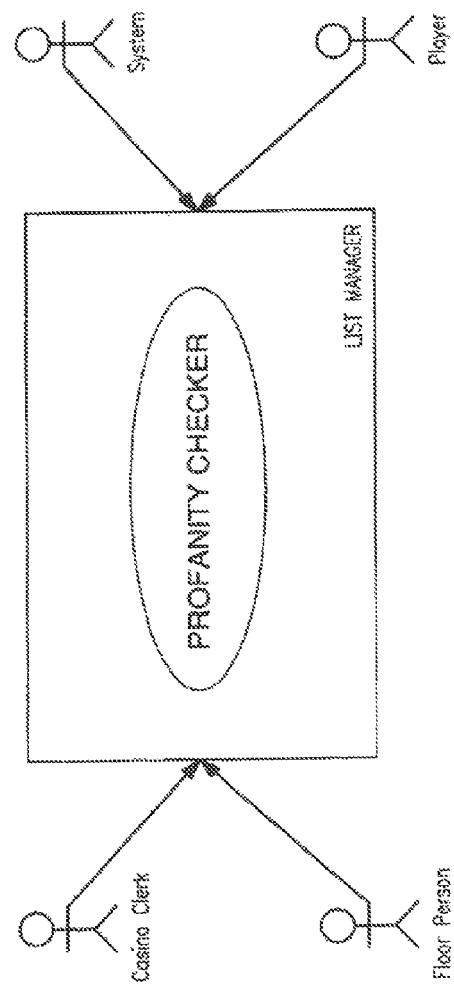
FIG. 55 is a Use Case Diagram of a Profanity Checker operation.
Figure 56:
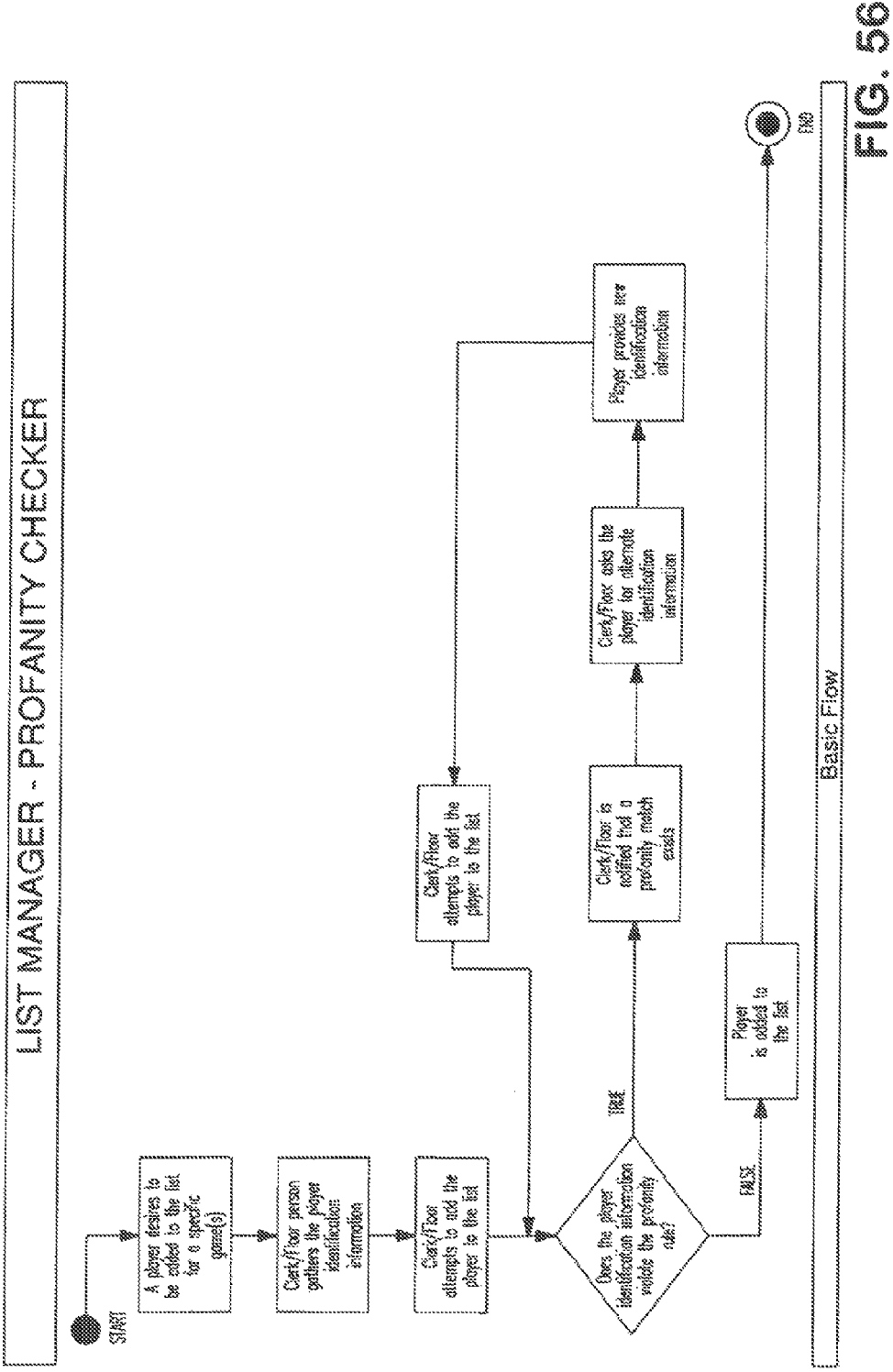
FIG. 56 is a flowchart illustrating an embodiment of a process for a Profanity Checker operation.
Figure 57:
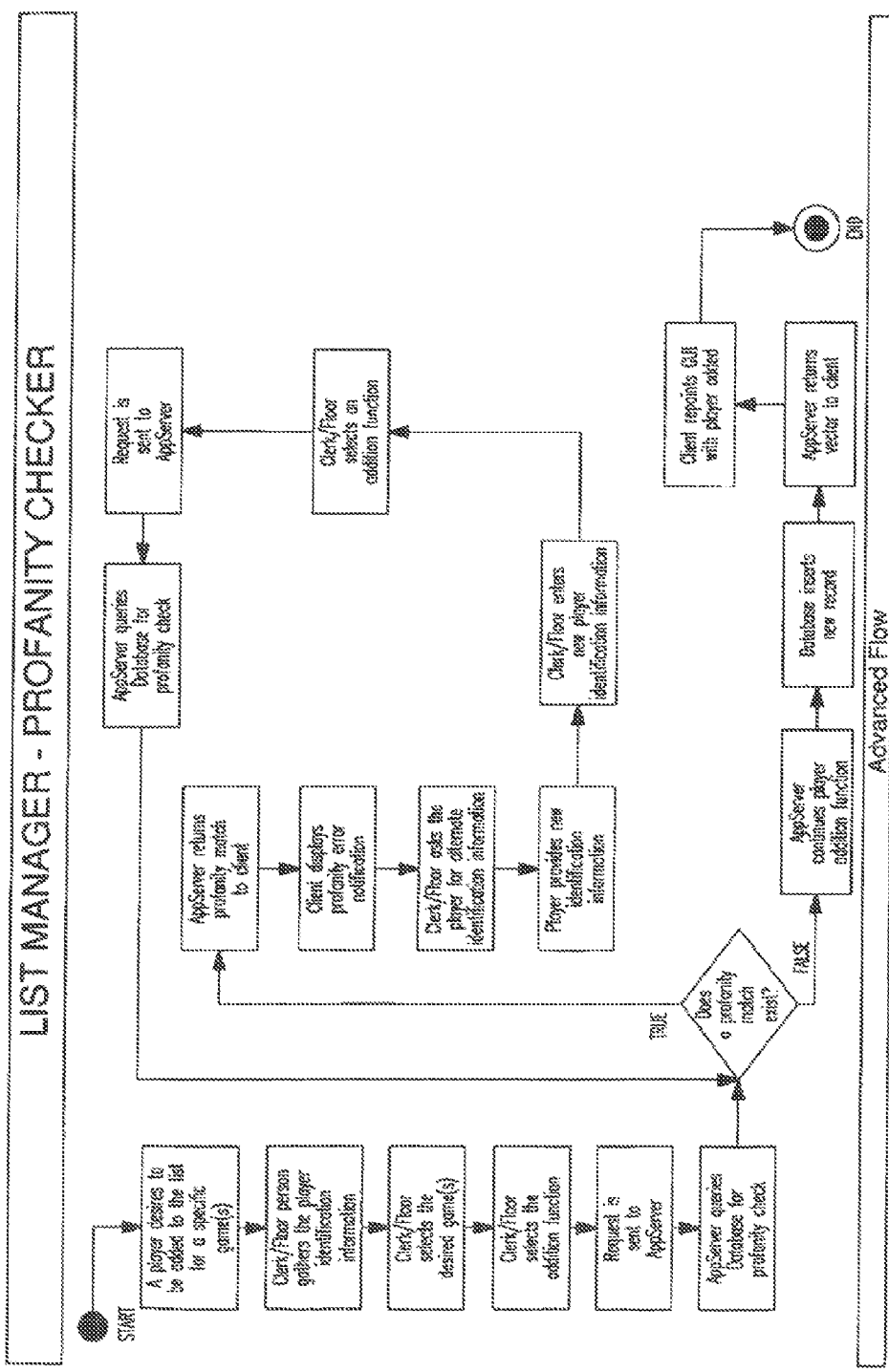
FIG. 57 is another flowchart illustrating an embodiment of a process for a Profanity Checker operation.
Figure 58:
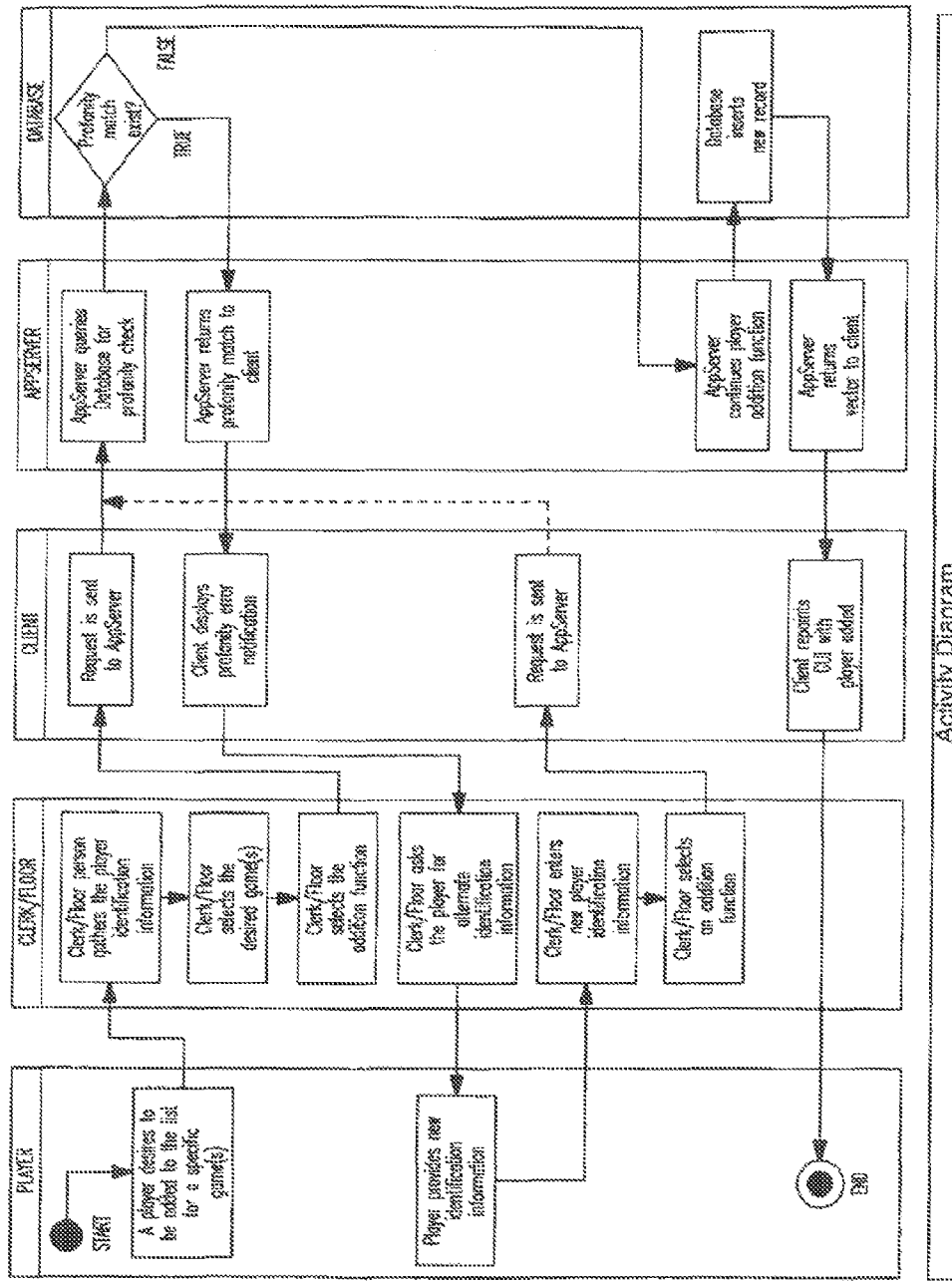
FIG. 58 is an Activity Diagram for an embodiment of a process for a Profanity Checker operation.

Actively compares displayed information against a database dictionary of profanities. If the system detects a possible displayed profanity the system can notify an administrator and automatically disallow the profanity from being displayed. FIG. 55 is a Use Case Diagram describing actors that may initiate the "Profanity Checker" function. FIGS. 56-58 describe in detail the process of "Profanity Checker".

"Duplicate Checker"

A feature that actively checks for duplicate names or the list or in the queue. Duplicate Checker verifies that no duplicate entries may reside so that confusion in regards to list registration is avoided. This is a process of the program's processing engine.

Figure 59:
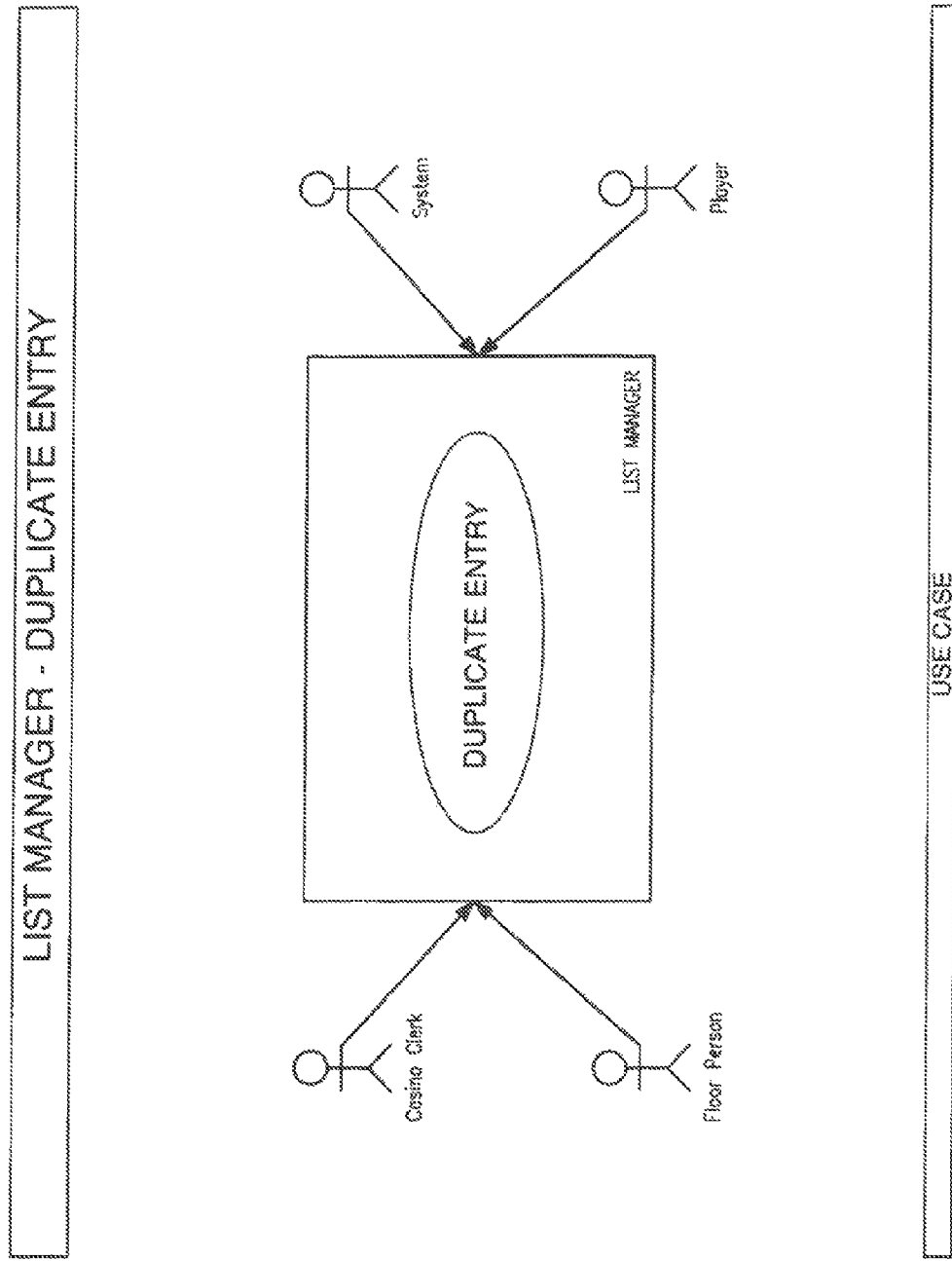
FIG. 59 is a Use Case Diagram of a Duplicate Checker operation.

FIG. 59 is a Use Case Diagram describing actors that may initiate the "Duplicate Checker" (also called "Duplicate Entry") function.

Figure 60:
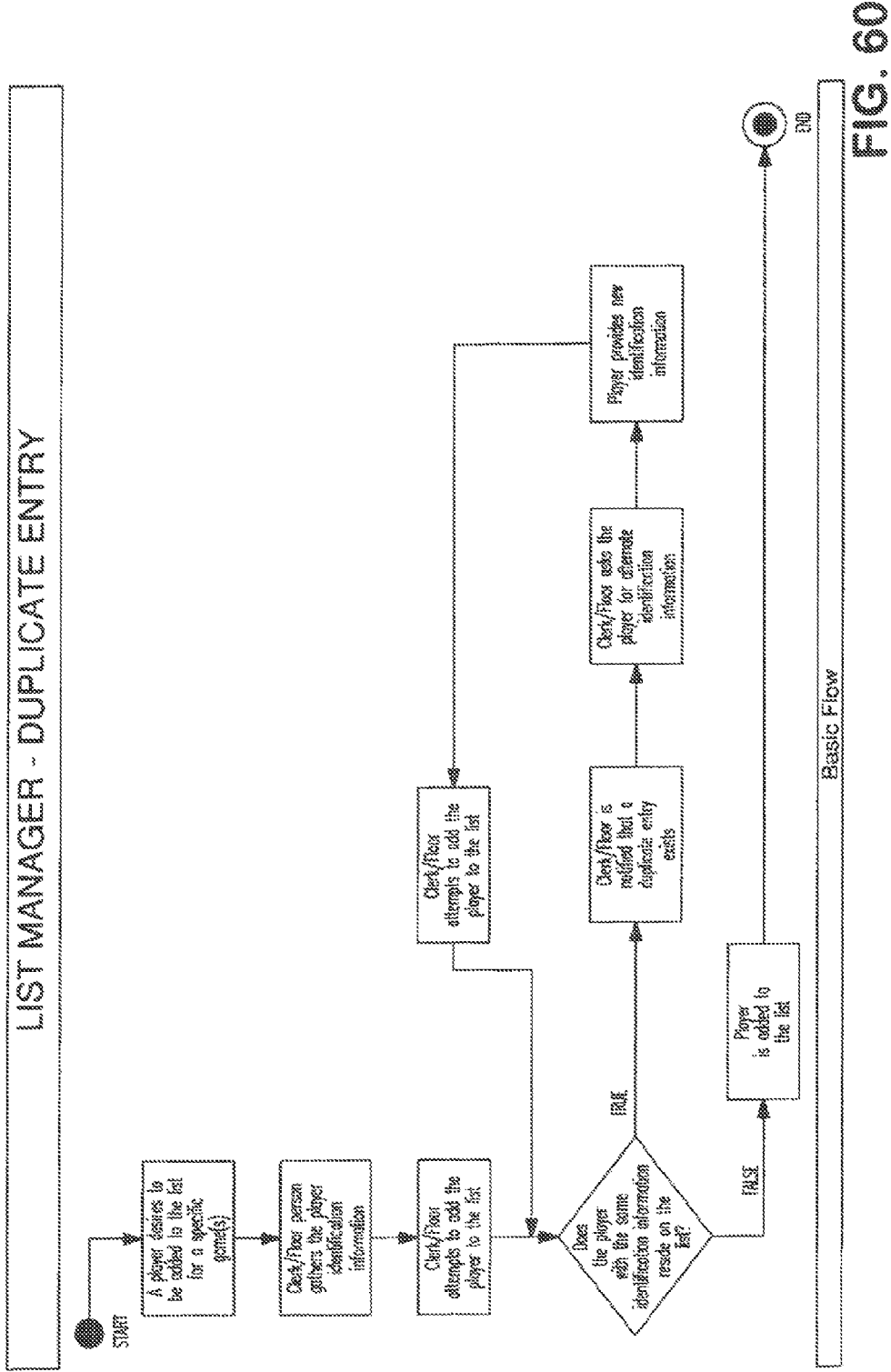
FIG. 60 is a flowchart illustrating an embodiment of a process for a Duplicate Checker operation.
Figure 61:
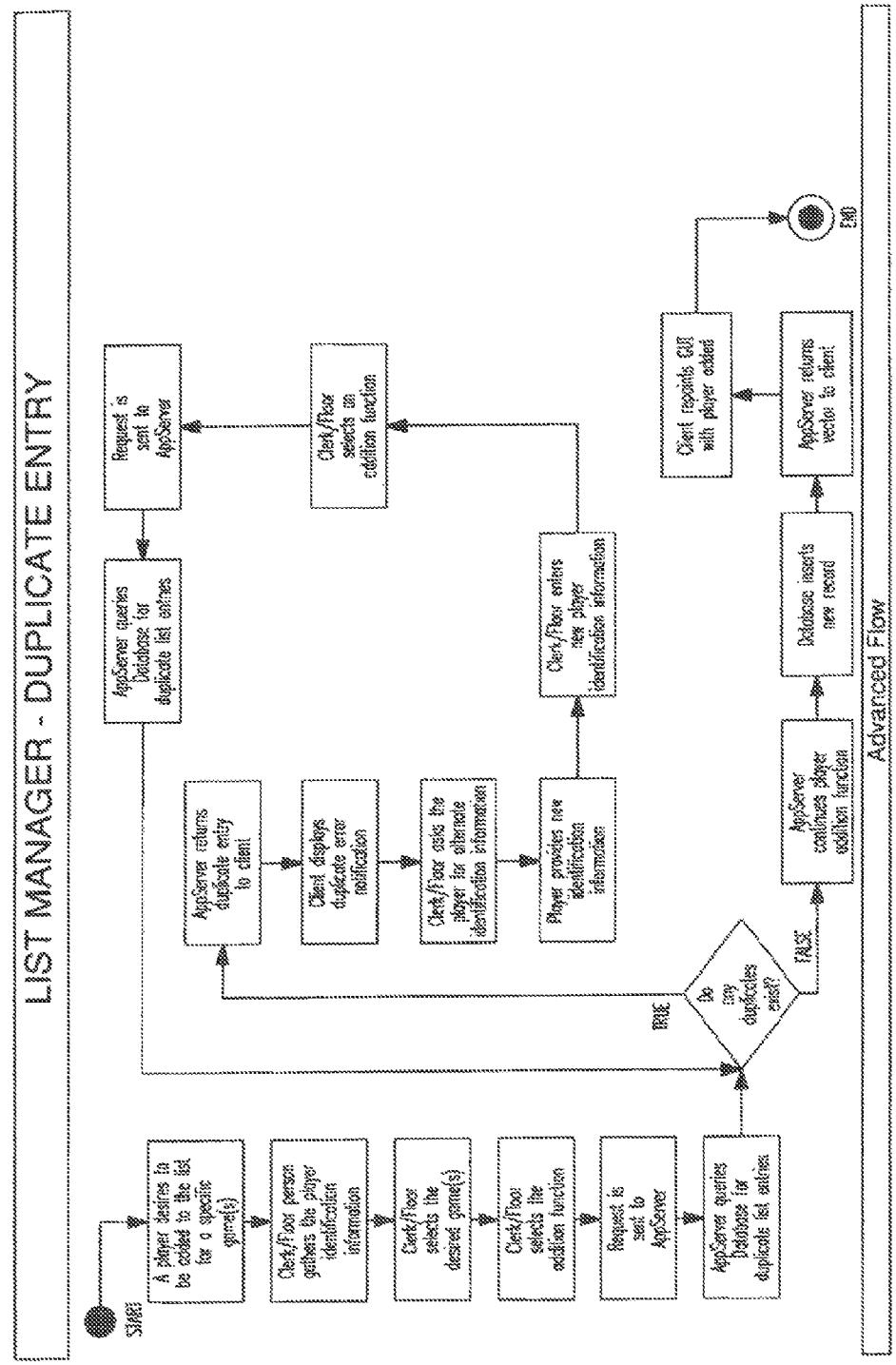
FIG. 61 is another flowchart illustrating an embodiment of a process for a Duplicate Checker operation.
Figure 62:
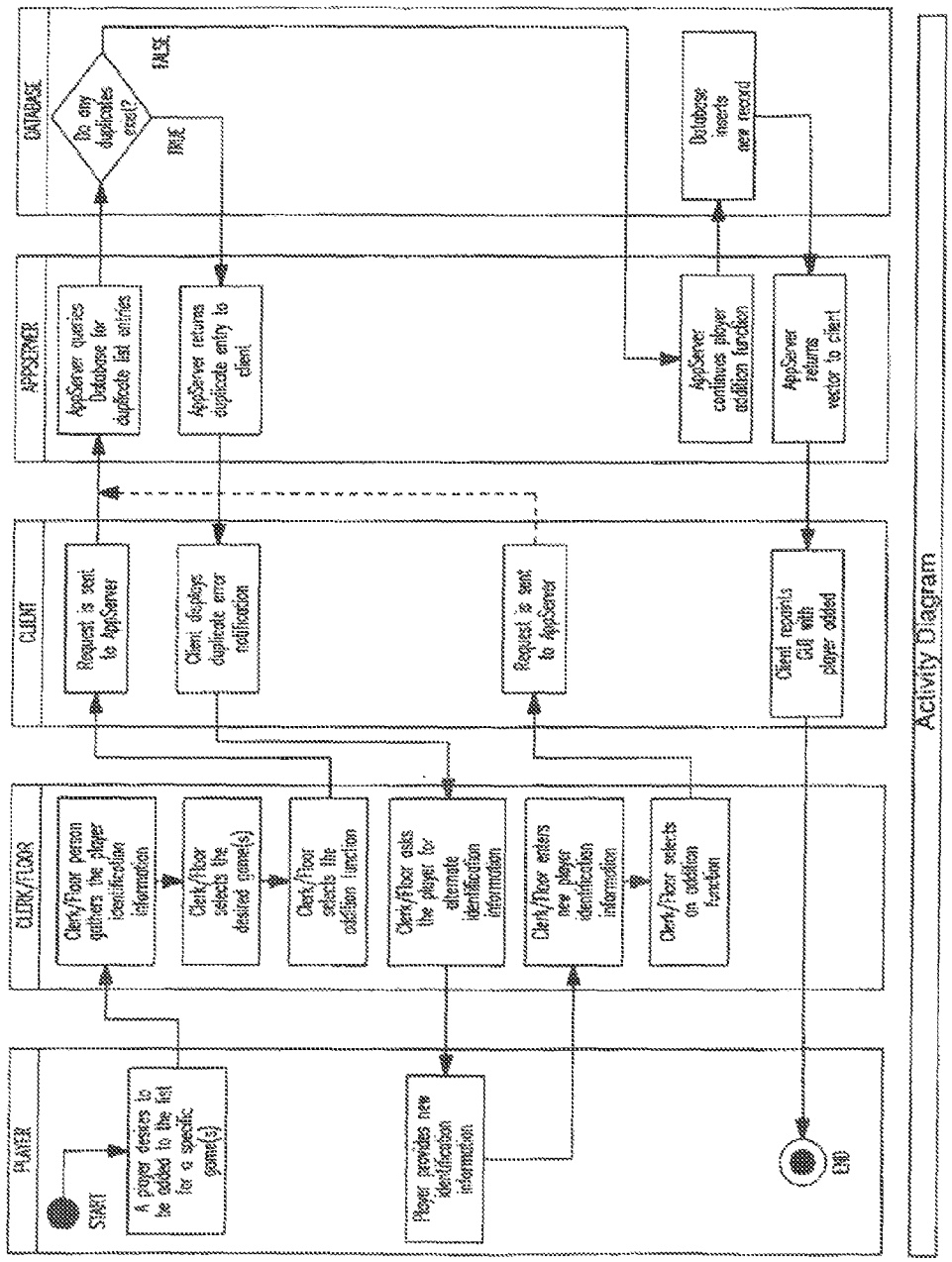
FIG. 62 is an Activity Diagram for an embodiment of a process for a Duplicate Checker operation.

FIGS. 60-62 describe in detail the process of "Duplicate Checker".

"Player Receipt"

Generate a receipt that the player can receive for validation of a gaming session, registration, tournament placement, or compensation redemption. The receipt can be generated by the system with a unique identifier and can contain encrypted barcode or magnetic stripe features.

"Casino Valet List Manager"

Handle the queue/list in the valet area of the establishment. Players or patrons utilize the valet list in the same manner as the game list. The system records the player and vehicle identification and processes the transaction.

"Public Seat"

When an open seat is initiated the system will check to see if there are active entries in the queue/list. If there are not, the system will notify the "Public Seat" function. This function allows the actors of the system to be informed of available seats for the public or walk-in players by a visual color-code of the information.

Figure 63:
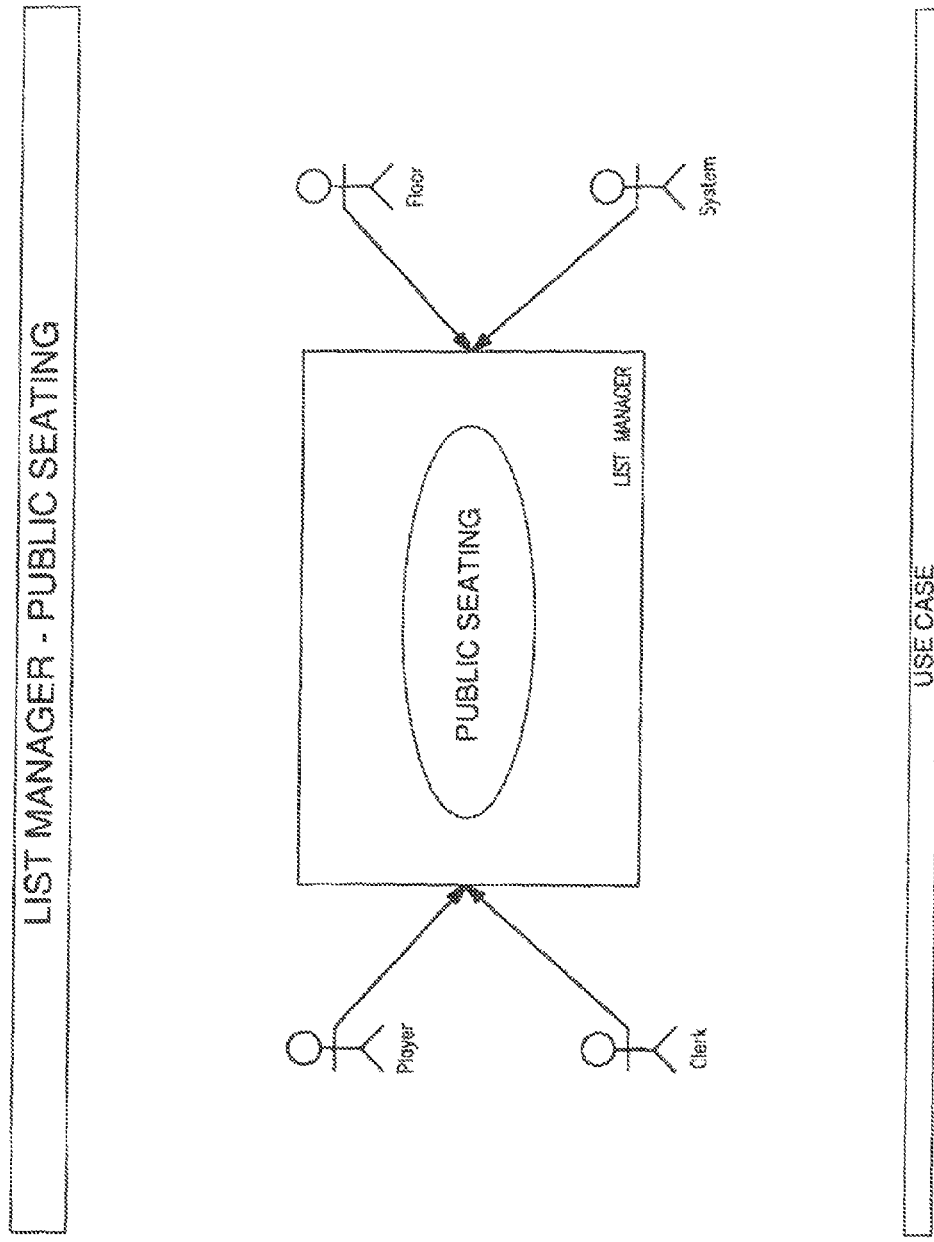
FIG. 63 is a Use Case Diagram of a Public Seating operation.

FIG. 63 is a Use Case Diagram describing actors that may initiate the "Public Seat" (also called "Public Seating") function.

Figure 64:
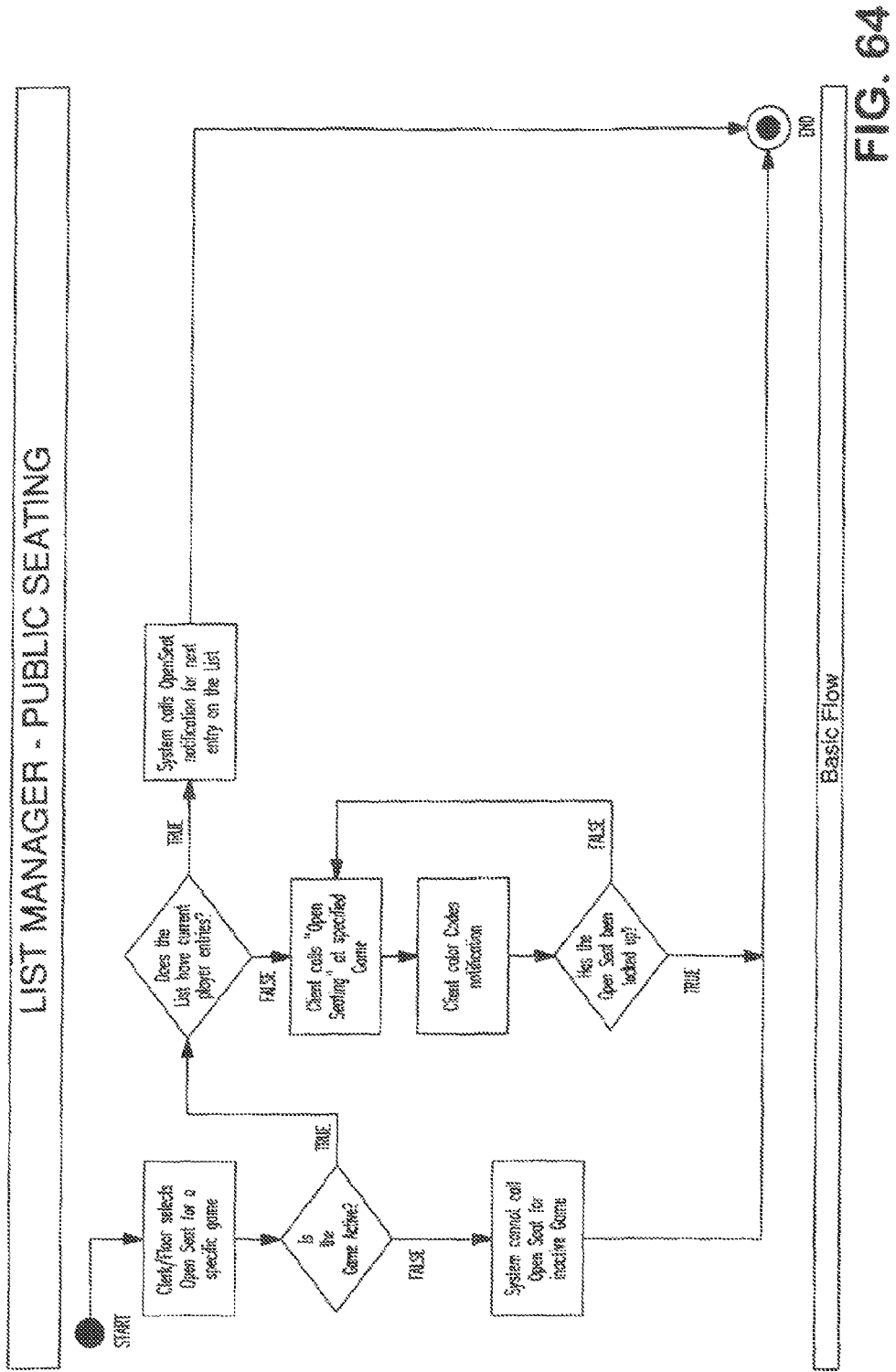
FIG. 64 is a flowchart illustrating an embodiment of a process for a Public Seating operation.
Figure 65:
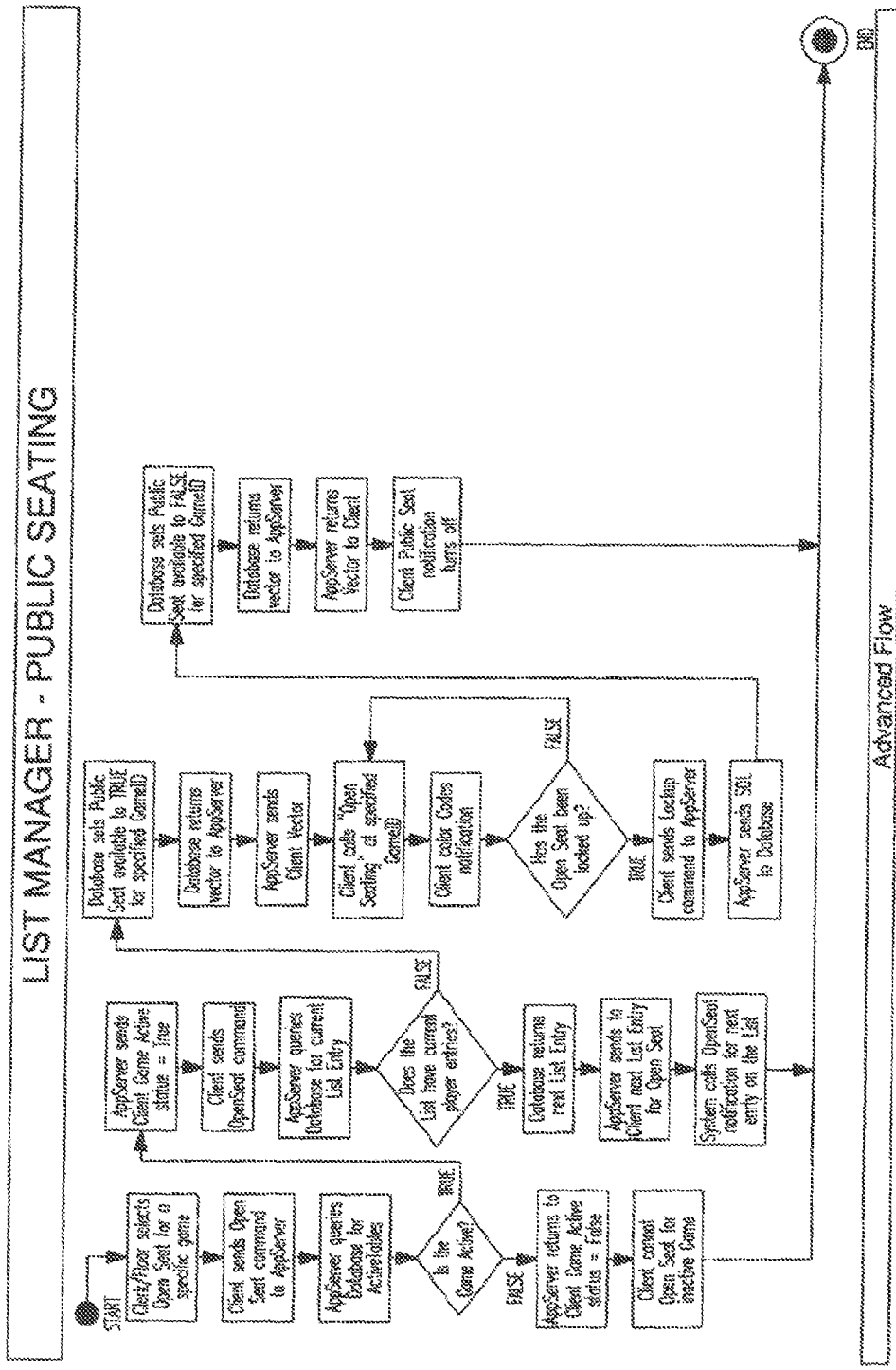
FIG. 65 is another flowchart illustrating an embodiment of a process for a Public Seating operation.
Figure 66:
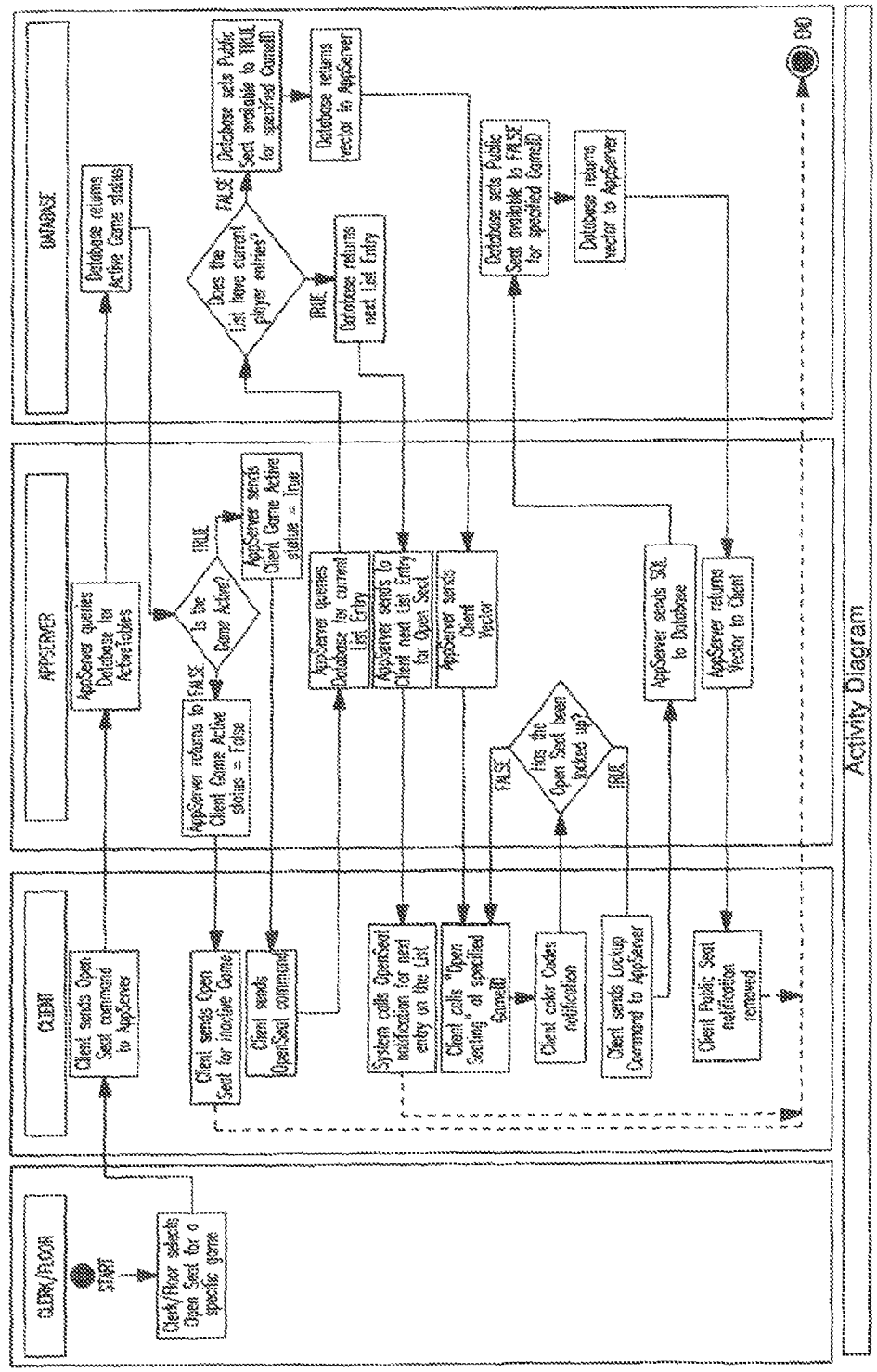
FIG. 66 is an Activity Diagram for an embodiment of a process for a Public Seating operation.

FIGS. 64-66 describe in detail the process of "Public Seat".

"Reserve Player"

When a player requests to be placed at the top of a list or queue, that player can be inserted via the "Reserve Player" function. When an open seat becomes available that player will be next in line to acquire the seat. The reserved player may be represented by a visual color-code. The "Reserve Player" function may be used by management to place a player atop the list or queue for special purposes.

Figure 74:
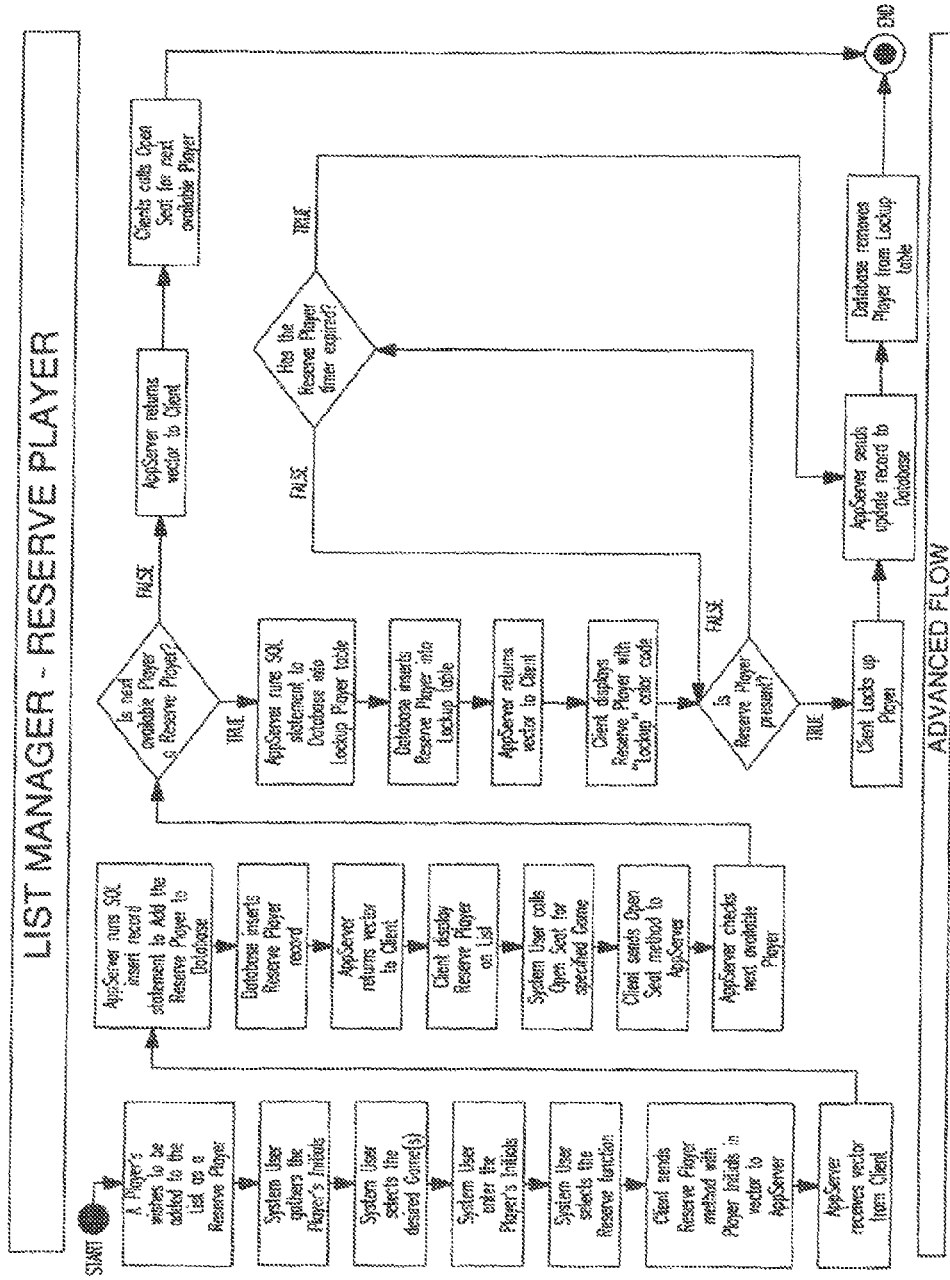
FIG. 74 is a flowchart illustrating an embodiment of a process for a Reserve Player operation.
Figure 75:
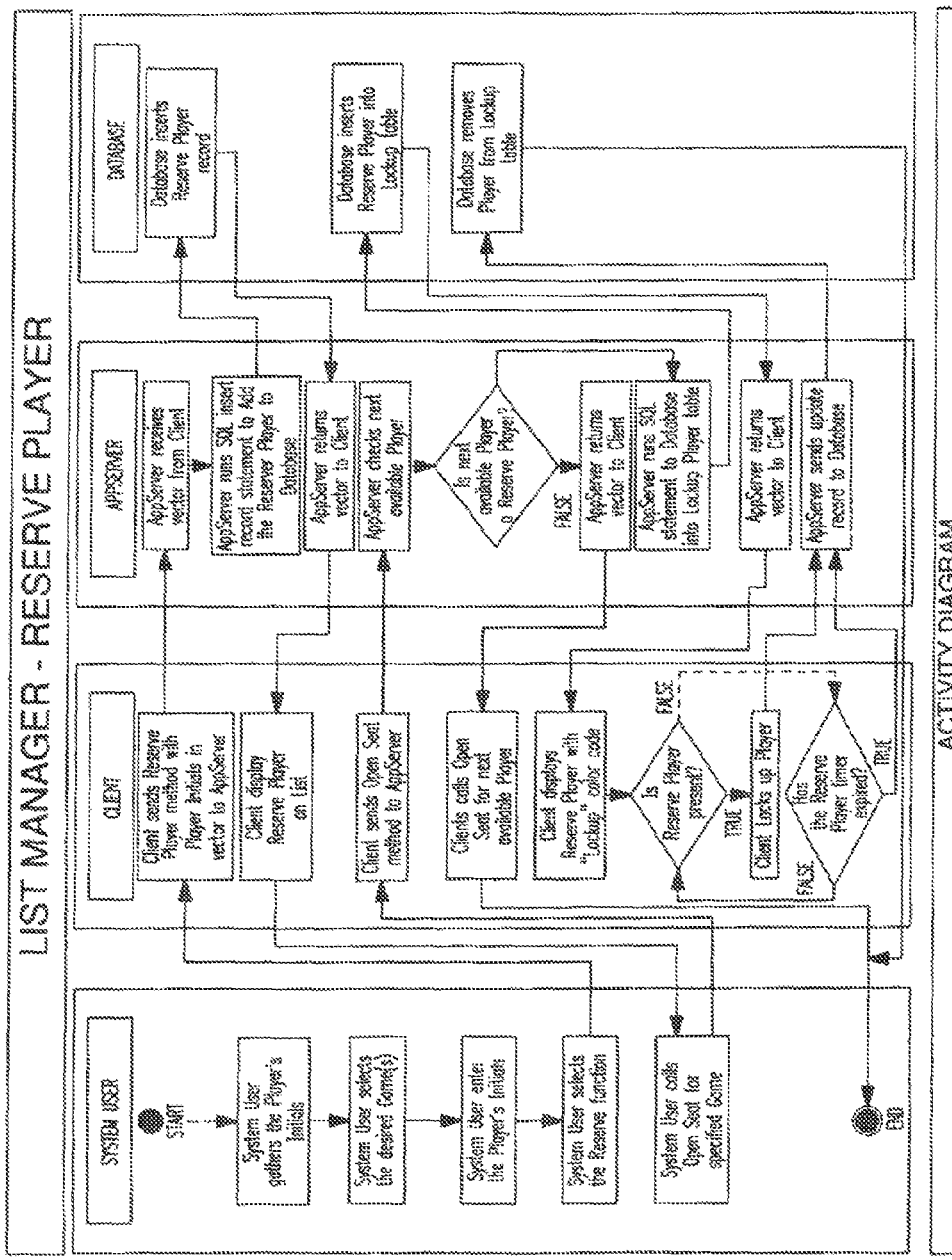
FIG. 75 is an Activity Diagram for an embodiment of a process for a Reserve Player operation.

FIGS. 74-75 describe in detail the "Reserve Player" function.

Figure 76:
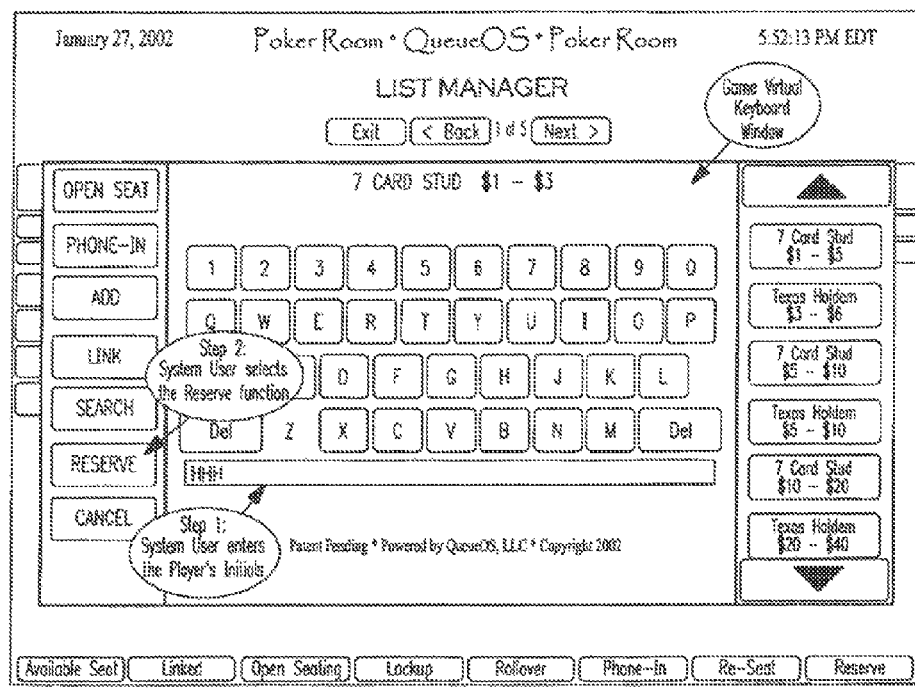
FIG. 76 is an illustration of a graphical user interface, shown at the Reserve Player function screen.

FIG. 76 is a graphical user interface showing a virtual keyboard, which allows data such as players' initials to be entered in conjunction with a particular game at a particular table.

"Jackpot Display"

Allow an establishment to display a running total of a cash payment offered. The system records the parameters of the Jackpot requirements and maintains the Jackpot total based upon the selected criteria.

"Game Qualification"

Decide whether or not to suggest the opening of a new game based upon a set of predefined criteria and algorithms. "Game Qualification" assures that there are enough players or interest in a game prior to that game beginning. Qualifying the game prior to it's start ensures that no resources, time, or administration services continue without some assurance that the game will be played. The criteria for qualifying games may be, for example, number of players, type of game, day of the week, time of day, available dealers and/or available staff. The criteria are business rules that reside in the database and can be changed by an administrator as desired.

An example of game qualification is:

Criteria:

1. A game must have at least three players waiting to play before the table opens for play.
2. Available dealer must be present and currently unassigned.
3. All other games of similar type must be full.

Algorithm:

Check Rule: 1 (Pass) Check Rule: 2 (Pass) Check Rule: 3 (Pass)

Result: Game is opened.

"Pause List"

Allows the users of the system to pause the list or queue at random. Allowing the pausing of the list or queue gives the users the benefit of manipulating, viewing, and analyzing the current list or queue status. Upon a list pause, the system does not stop processing other requests from other users or clients. The system will continue to process requests and update the paused user or client once the list or queue is resumed.

"Undo"

System users may choose to undo already committed actions. The undo feature allows users to undo previously entered actions. The application server and database log every transaction to a history table allowing the rollback of transactions to a desired point.

"Redo"

The opposite of undo, if a system users rolls back a transaction with an undo command and decides to redo the action, the system user may redo the last revoked command.

Figure 89:
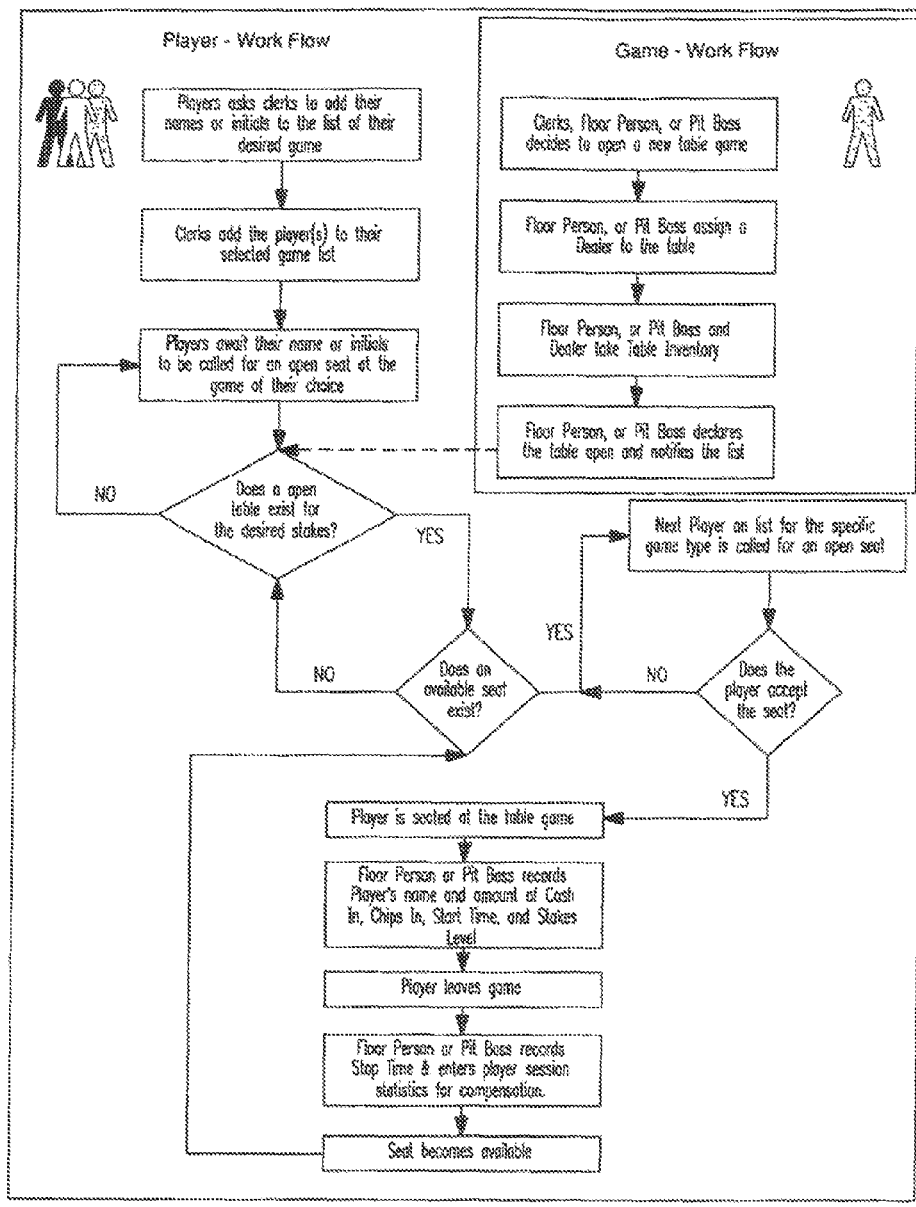
FIG. 89 is an overview of a process according to an embodiment of this invention.

Finally, FIG. 89 describes an example of a player interacting with the system to be added to a desired game.

The invention has been described with respect to a number of embodiments. However it will be apparent that many modifications and variations may be made within the scope of the invention.

What is claimed is:

1. A real time computerized system for live poker room operations with poker tables and poker players in a physical casino including player self-registration functionality over the internet while seamlessly intergrating player data in a system database located within the physical casino with another database of player data outside the physical casino, comprising:

(a) at least one application software program server;

(b) specialized hardware located at the poker tables to identify physical player card equipped players by a recognition of said physical player cards and conversion of stored data from those cards into computerized data for use in the system;

(c) at least one computer memory with instructions executable by the application program server to configure the server to access the system database, the system database containing player information, the instructions being executable to access a suite of poker room software applications, the suite of poker room software applications also stored on said server and comprising at least:

(d) player self-registration tournament functionality, or player self-registration poker game waitlist functionality including the ability to allow the placement of players on prioritized waitlists for poker games of their choice, (e) player seating functionality including use of said specialized hardware at the poker tables and the ability to assign seats to poker players based upon their preferences when seats become available at poker tables, (f) player tracking functionality including the ability to compute the playing time of the poker players;

(g) user interface functionality including the ability for a poker room staff users to operate the suite of poker room software on or from at least one user interface on a computing device with a display;

(h) user interface functionality including the ability for a poker player to interact with the system via a web page, which has real time information unique to the physical casino poker room integrated with stored player data on the same web page;

wherein the software is enabled to synchronize the software functions so that those functions that need to be synchronized at specific times, and/or in specific ways, are synchronized in order to provide operational efficiencies to the poker room and inclusive of database synchronization of player data over the internet.

2. The system of claim 1 wherein the instructions when executed by said serve configure the server to allow for the assignment and tracking of players to and at particular seats at the assigned tables.

3. The system of claim 1, wherein the instructions when executed by said server configure the server to provide Poker Tournament functionality.

4. The system of claim 1, wherein the instructions when executed by said server configure the server to provide functionality to allow players to pay their tournament fees via the internet.

5. The system of claim 1 including functionality to allow players to receive wireless, real-time alerts on their mobile devices.

6. The system of claim 1 wherein the functionality also includes allowing dealers to be assigned to the poker tables based upon selected criteria.

7. The system of claim 1 including 'away status button' functionality at the tables.

8. The system of claim 1, wherein the instructions when executed by said server configure said server to provide functionality which also enables integration of poker tournament information with any other database used by the poker room of the physical casino.

9. The system of claim 1 wherein the player self-registration occurs via hardware functionality included in the players mobile devices.

10. The system of claim 1 wherein the player self-registration occurs via the internet and requires passwords.

11. The system of claim 1, which also allows for player self registration via a hardware based kiosk device with the ability to read data from the physical player cards or player mobile devices and transform that data into a format that the system can use.

12. A real time computerized system for live poker room operations with poker tables and poker players in a physical casino including player self-registration functionality over the internet and with poker room software applications enabled via application service provider internet functionality comprising;

(a) at least one application software program server located at an application service provider location;

(b) specialized hardware at the poker tables to identify physical player and equipped players by a recognition of said physical player cards and conversion of stored data from those cards into computerized data for use in the system;

(c) at least one computer memory with instructions executable by said application program server to configure the server at the application service provider location to access a system database containing player information and to access a suite of poker room software applications, said suite of poker room software applications comprising at least;

(d) player self-registration tournament functionality or player self-registration poker game waitlist functionality, including the ability to allow the placement of players on prioritized waitlists for poker games of their choice, (e) player seating functionality including use of said specialized hardware at the poker tables the ability to assign seats to poker players based upon their preferences when seats become available at poker tables, (f) player tracking functionality including the ability to compute the playing time of the poker players;

(g) user interface functionality including the ability for poker room staff to operate the suite of application service provider internet based poker room software on or from at least one user interface on a computing device with a display;

(h) user interface functionality including the ability for a poker player to interact with the system via a web page, which has real time information unique to the physical casino poker room integrated with stored player data on the same web page;

wherein said poker room software is enabled to synchronize the software functions so that those functions that need to be synchronized at specific times, and/or in specific ways, are synchronized in order to provide operational efficiencies to the poker room and inclusive of database synchronization of player data over the internet.

13. The system of claim 1, also including active dealer display functionality.

14. The system of claim 1 including functionality to allow players to receive wireless, real-time alerts on their mobile devices relative to the status of the poker room.

15. The system of claim 12 wherein the instructions to allow dealers to he assigned to the poker tables based upon the selected criteria.

16. The system of claim 12, wherein the instructions when executed by the server configure the server to provide functionality which also enables integration of poker tournament information with any player database used by the poker room of the physical casino.

17. The system of claim 12 wherein player self-registration via players mobile devices.

18. The system of claim 12 wherein the player self-registration occurs via the internet and requires passwords.

19. The system of claim 12, wherein player self-registration is also enabled to occur via a hardware based kiosk device with the ability to read data from the physical player cards or player mobile devices and transform that data into a format that the system can use.

* * * * *